United States Patent
Adams et al.

(10) Patent No.: US 12,520,857 B1
(45) Date of Patent: Jan. 13, 2026

(54) MULTI-STAGE DISPENSER ASSEMBLY

(71) Applicant: SharkNinja Operating LLC, Needham, MA (US)

(72) Inventors: Max Adams, Brookline, MA (US); Andrew Hamroff, Boston, MA (US); Alireza Hooshanginejad, Medway, MA (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 19/015,133

(22) Filed: Jan. 9, 2025

(51) Int. Cl.
*A23G 9/28* (2006.01)
*A23G 9/04* (2006.01)
*A23G 9/08* (2006.01)

(52) U.S. Cl.
CPC ............. *A23G 9/283* (2013.01); *A23G 9/045* (2013.01); *A23G 9/08* (2013.01)

(58) Field of Classification Search
CPC .......... A23G 9/283; A23G 9/045; A23G 9/08; B65D 47/0823; B65D 47/08; B65D 47/0866

See application file for complete search history.

(56) References Cited

U.S. PATENT DOCUMENTS

| | | | |
|---|---|---|---|
| 531,718 A | 1/1895 | Detwiler et al. | |
| 718,319 A | 1/1903 | Cunningham | |
| 789,599 A | 5/1905 | Flatau | |
| 970,823 A | 9/1910 | Hopkins | |
| 975,380 A | 11/1910 | Berntson | |
| 1,425,814 A | 8/1922 | Valerius et al. | |
| 1,685,189 A | 9/1928 | Cover | |
| 1,818,896 A | 8/1931 | Kohr | |
| 1,896,081 A | 2/1933 | Hampson | |
| 1,953,766 A | 4/1934 | McMath et al. | |
| 2,064,861 A | 12/1936 | Stroud | |

(Continued)

FOREIGN PATENT DOCUMENTS

| | | |
|---|---|---|
| CN | 3029700 | 1/1995 |
| CN | 3032479 | 6/1995 |

(Continued)

OTHER PUBLICATIONS

Pending U.S. Appl. No. 18/817,545, filed Aug. 28, 2024; Cameron John Auger, Joyce Tu, Michael Lerman, Alexander Mularski, Macrae Benziger, Ryan Michienzi.

(Continued)

*Primary Examiner* — Donnell A Long
(74) *Attorney, Agent, or Firm* — The Webb Law Firm

(57) ABSTRACT

A dispenser assembly is provided with a lever, a cam, and a seal. The lever is configured to be pulled by a user a first distance to a first position. The lever is further configured to be pulled by the user a second distance to a second position. The cam is configured to provide a first resistance to pulling the lever when the lever is pulled over the first distance to the first position. The cam is further configured to provide a second resistance to pulling the lever when the lever is pulled over the second distance to the second position. The seal is configured to be moved in response to movement of the lever and the cam. The seal partly opens a spout of the drink maker when the lever is in the first position and fully opens the spout when the lever is in the second position.

20 Claims, 53 Drawing Sheets

(56) References Cited

U.S. PATENT DOCUMENTS

| | | | |
|---|---|---|---|
| 2,134,261 A | 10/1938 | Oswell et al. | |
| 2,136,224 A | 11/1938 | Weinreich | |
| 2,141,045 A | 12/1938 | Ruttiman | |
| 2,188,551 A | 1/1940 | Kaltenbach et al. | |
| 2,252,205 A | 8/1941 | Reynolds | |
| 2,278,125 A | 3/1942 | Landgraf | |
| 2,284,155 A | 5/1942 | Landgraf | |
| 2,316,165 A | 4/1943 | Howser | |
| 2,352,205 A | 6/1944 | Karlson | |
| 2,352,232 A | 6/1944 | Strauss | |
| 2,411,081 A | 11/1946 | Carothers | |
| 2,541,814 A | 2/1951 | Gaddini | |
| 2,794,627 A | 6/1957 | Rodwick | |
| 2,896,421 A | 7/1959 | Rader | |
| 2,897,862 A | 8/1959 | Malz et al. | |
| 2,972,239 A | 2/1961 | Vasby | |
| 3,155,053 A | 11/1964 | Vito et al. | |
| 3,175,594 A | 3/1965 | Jepson et al. | |
| 3,191,398 A | 6/1965 | Rader | |
| 3,228,203 A | 1/1966 | Swenson | |
| 3,292,911 A | 12/1966 | Paul | |
| 3,300,094 A | 1/1967 | Rockola | |
| 3,319,436 A | 5/1967 | Wilch | |
| 3,400,551 A | 9/1968 | Booth et al. | |
| 3,460,716 A | 8/1969 | Thomas | |
| 3,460,717 A | 8/1969 | Thomas | |
| 3,465,540 A | 9/1969 | Carpigiani | |
| 3,517,524 A * | 6/1970 | Fiedler | A23G 9/281 62/135 |
| 3,580,812 A | 5/1971 | Bender et al. | |
| 3,632,245 A | 1/1972 | Getman | |
| 3,822,565 A | 7/1974 | Arzberger | |
| 3,939,667 A | 2/1976 | Halverson | |
| 3,988,902 A | 11/1976 | Jacobs | |
| 4,078,263 A | 3/1978 | Campbell | |
| 4,084,407 A | 4/1978 | Anhalt | |
| 4,157,017 A | 6/1979 | Reid | |
| 4,162,127 A | 7/1979 | Wakeman et al. | |
| 4,241,590 A | 12/1980 | Martineau | |
| 4,245,680 A | 1/1981 | Greenfield, Jr. et al. | |
| 4,275,567 A | 6/1981 | Schwitters | |
| 4,332,539 A | 6/1982 | Zani | |
| 4,394,938 A | 7/1983 | Frassanito | |
| 4,401,607 A | 8/1983 | Child et al. | |
| 4,429,549 A | 2/1984 | Randolphi | |
| 4,476,146 A | 10/1984 | Manfroni | |
| 4,487,024 A | 12/1984 | Fletcher et al. | |
| 4,521,116 A | 6/1985 | Adsit | |
| 4,528,824 A | 7/1985 | Herbert | |
| 4,637,221 A | 1/1987 | Levine | |
| 4,653,281 A | 3/1987 | Van Der Veer | |
| 4,664,529 A | 5/1987 | Cavalli | |
| 4,681,030 A | 7/1987 | Herbert | |
| 4,681,458 A | 7/1987 | Cavalli | |
| 4,698,984 A | 10/1987 | Manfroni | |
| 4,708,487 A | 11/1987 | Marshall | |
| 4,711,374 A | 12/1987 | Gaunt et al. | |
| 4,711,376 A | 12/1987 | Manfroni | |
| 4,712,920 A | 12/1987 | Ames et al. | |
| 4,725,008 A | 2/1988 | Rebordosa et al. | |
| 4,736,593 A | 4/1988 | Williams | |
| 4,740,088 A | 4/1988 | Kelly, Jr. | |
| 4,900,158 A | 2/1990 | Ugolini | |
| 4,906,486 A | 3/1990 | Young | |
| 4,964,542 A * | 10/1990 | Smith | B67D 1/1466 222/529 |
| 5,020,698 A | 6/1991 | Crossley | |
| 5,158,506 A | 10/1992 | Kusano et al. | |
| 5,205,129 A | 4/1993 | Wright et al. | |
| 5,212,954 A | 5/1993 | Black et al. | |
| 5,363,746 A | 11/1994 | Gordon | |
| 5,389,209 A | 2/1995 | Paquette | |
| 5,419,150 A | 5/1995 | Kaiser et al. | |
| 5,463,878 A | 11/1995 | Parekh et al. | |
| 5,524,451 A | 6/1996 | Tippmann | |
| 5,603,229 A | 2/1997 | Cocchi et al. | |
| 5,644,926 A | 7/1997 | Kress | |
| 5,676,462 A | 10/1997 | Fraczek et al. | |
| 5,692,392 A | 12/1997 | Swier | |
| 5,706,720 A | 1/1998 | Goch et al. | |
| 5,735,602 A | 4/1998 | Salvatore | |
| 5,788,370 A | 8/1998 | Pedrazzi | |
| 5,799,726 A | 9/1998 | Frank | |
| 5,823,672 A | 10/1998 | Barker | |
| 5,906,105 A | 5/1999 | Ugolini | |
| 5,967,226 A | 10/1999 | Choi | |
| 6,010,035 A | 1/2000 | Estruch | |
| 6,055,900 A | 5/2000 | Bunn | |
| 6,058,721 A | 5/2000 | Midden et al. | |
| 6,070,417 A | 6/2000 | Benson | |
| 6,076,371 A * | 6/2000 | McNabb | A23G 9/224 366/311 |
| 6,082,123 A | 7/2000 | Johnson | |
| 6,119,472 A | 9/2000 | Ross | |
| 6,119,905 A * | 9/2000 | Cocchi | A23G 9/283 222/509 |
| 6,176,090 B1 | 1/2001 | Ufema | |
| 6,182,862 B1 | 2/2001 | McGill | |
| 6,220,047 B1 | 4/2001 | Vogel et al. | |
| 6,253,573 B1 | 7/2001 | Schwitters et al. | |
| 6,264,066 B1 | 7/2001 | Vincent et al. | |
| 6,301,918 B1 | 10/2001 | Quartarone et al. | |
| 6,349,852 B1 | 2/2002 | Ford | |
| 6,370,892 B1 | 4/2002 | Ross | |
| 6,438,987 B1 | 8/2002 | Pahl | |
| 6,490,872 B1 | 12/2002 | Beck et al. | |
| 6,513,578 B2 | 2/2003 | Frank | |
| 6,546,843 B2 | 4/2003 | Ugolini | |
| 6,553,779 B1 | 4/2003 | Boyer et al. | |
| 6,557,835 B2 | 5/2003 | Dijk | |
| 6,619,056 B2 | 9/2003 | Midden et al. | |
| 6,622,511 B2 | 9/2003 | Ashworth et al. | |
| 6,637,214 B1 | 10/2003 | Leitzke et al. | |
| 6,679,314 B2 | 1/2004 | Frank | |
| 6,694,752 B2 | 2/2004 | Nomura et al. | |
| 6,705,106 B1 | 3/2004 | Cunha et al. | |
| 6,735,967 B1 | 5/2004 | Bischel et al. | |
| 6,761,036 B2 | 7/2004 | Teague et al. | |
| 6,766,650 B2 | 7/2004 | Cunha et al. | |
| 6,772,675 B2 | 8/2004 | Ervin | |
| 6,808,305 B2 | 10/2004 | Sharpe et al. | |
| 6,817,749 B2 | 11/2004 | Saunders et al. | |
| 6,830,239 B1 | 12/2004 | Weber et al. | |
| 6,863,916 B2 | 3/2005 | Henriksen et al. | |
| 6,907,743 B2 | 6/2005 | Cocchi et al. | |
| 6,918,258 B2 | 7/2005 | Cunha et al. | |
| 6,923,010 B2 | 8/2005 | Small et al. | |
| 6,932,503 B2 | 8/2005 | Fallowes | |
| 6,948,327 B2 | 9/2005 | Bischel et al. | |
| 7,028,607 B2 | 4/2006 | Zweben | |
| 7,047,758 B2 | 5/2006 | Ross | |
| 7,100,392 B2 | 9/2006 | Cortese | |
| 7,152,765 B1 | 12/2006 | Midden et al. | |
| 7,165,699 B2 | 1/2007 | McGill | |
| 7,213,965 B2 | 5/2007 | Daniels, Jr. | |
| 7,264,187 B1 | 9/2007 | Kolar | |
| 7,269,960 B2 | 9/2007 | Elsom et al. | |
| 7,270,473 B2 | 9/2007 | Donthnier et al. | |
| 7,275,666 B2 | 10/2007 | Rukavina et al. | |
| 7,278,276 B2 | 10/2007 | Boyer et al. | |
| 7,278,555 B2 | 10/2007 | McGill | |
| 7,393,690 B2 | 7/2008 | Sukavaneshvar et al. | |
| 7,451,613 B2 | 11/2008 | Barraclough et al. | |
| 7,543,717 B2 | 6/2009 | Hinkle | |
| 7,547,135 B2 | 6/2009 | Kocienski | |
| 7,587,972 B2 | 9/2009 | Katz et al. | |
| 7,603,870 B2 | 10/2009 | Mavridis et al. | |
| 7,607,821 B2 | 10/2009 | Schmidt | |
| 7,647,782 B2 | 1/2010 | Bucceri | |
| 7,648,264 B2 | 1/2010 | Breviere et al. | |
| 7,698,899 B2 | 4/2010 | Lewitus et al. | |
| 7,712,321 B2 | 5/2010 | Kadyk | |
| 7,726,136 B2 | 6/2010 | Baxter et al. | |
| 7,754,266 B2 | 7/2010 | Waletzko et al. | |

(56) References Cited

U.S. PATENT DOCUMENTS

| | | | |
|---|---|---|---|
| 7,870,749 B2 | 1/2011 | Franck et al. | |
| 7,878,702 B2 | 2/2011 | Peng | |
| 7,908,871 B2 | 3/2011 | Baxter et al. | |
| 7,942,094 B2 | 5/2011 | Kounlavong et al. | |
| 8,016,168 B2 | 9/2011 | Goulet | |
| 8,123,075 B2* | 2/2012 | Kadyk | A23G 9/045 |
| | | | 222/64 |
| 8,157,435 B2 | 4/2012 | Pryor, Jr. | |
| 8,289,514 B2 | 10/2012 | Sukavaneshvar et al. | |
| 8,297,182 B2 | 10/2012 | Cocchi et al. | |
| 8,323,015 B2 | 12/2012 | Day et al. | |
| 8,434,319 B2 | 5/2013 | Klier et al. | |
| 8,459,043 B2 | 6/2013 | Bertone | |
| 8,479,532 B2 | 7/2013 | Cocchi et al. | |
| 8,485,393 B2 | 7/2013 | Van Zeeland | |
| 8,550,695 B2 | 10/2013 | Conti | |
| 8,561,839 B2 | 10/2013 | Cocchi et al. | |
| 8,572,998 B2 | 11/2013 | Cocchi et al. | |
| 8,584,897 B2 | 11/2013 | Belcham | |
| 8,591,097 B2 | 11/2013 | Cocchi et al. | |
| 8,616,250 B2 | 12/2013 | Herbert | |
| 8,685,477 B2 | 4/2014 | Almblad et al. | |
| 8,701,435 B2 | 4/2014 | Gist et al. | |
| 8,769,973 B2 | 7/2014 | Leaver et al. | |
| 8,770,093 B2 | 7/2014 | Cahen et al. | |
| 8,876,366 B2 | 11/2014 | Saubert | |
| 8,887,522 B2 | 11/2014 | Grampassi | |
| 8,899,063 B2 | 12/2014 | Ugolini | |
| 8,998,037 B2 | 4/2015 | Cahen et al. | |
| 9,016,077 B2 | 4/2015 | Cho et al. | |
| 9,066,529 B2 | 6/2015 | Fassberg et al. | |
| 9,089,821 B2 | 7/2015 | Seidler et al. | |
| 9,127,881 B2 | 9/2015 | Anderson et al. | |
| 9,131,709 B2 | 9/2015 | Hammonds et al. | |
| 9,198,536 B2 | 12/2015 | Lardelli et al. | |
| 9,233,829 B2 | 1/2016 | Grampassi | |
| 9,301,537 B2 | 4/2016 | Cocchi et al. | |
| 9,314,043 B2 | 4/2016 | Grampassi | |
| 9,326,529 B2 | 5/2016 | Sipp et al. | |
| 9,326,530 B2 | 5/2016 | Ugolini | |
| 9,326,531 B1 | 5/2016 | Reich et al. | |
| 9,328,948 B2 | 5/2016 | Billman et al. | |
| 9,364,114 B2 | 6/2016 | Claesson et al. | |
| 9,398,774 B2 | 7/2016 | Grampassi | |
| 9,402,408 B2 | 8/2016 | Cocchi et al. | |
| 9,420,915 B2 | 8/2016 | Dickson, Jr. et al. | |
| 9,457,386 B2 | 10/2016 | Gates et al. | |
| 9,462,826 B2 | 10/2016 | Cocchi et al. | |
| 9,528,740 B1 | 12/2016 | Gist et al. | |
| 9,565,868 B2 | 2/2017 | D'Agostino | |
| 9,591,871 B2 | 3/2017 | Ugolini | |
| 9,648,896 B2 | 5/2017 | Ugolini | |
| 9,656,227 B2 | 5/2017 | Paget | |
| 9,681,778 B2 | 6/2017 | Pendleton et al. | |
| 9,723,857 B2 | 8/2017 | Endo et al. | |
| 9,725,228 B2 | 8/2017 | Py et al. | |
| 9,763,462 B2 | 9/2017 | He et al. | |
| 9,765,891 B2 | 9/2017 | Bischel | |
| 9,833,109 B2 | 12/2017 | Farrell et al. | |
| 9,845,982 B2 | 12/2017 | Knatt | |
| 9,854,820 B2 | 1/2018 | Cocchi et al. | |
| 9,867,387 B2 | 1/2018 | Davis et al. | |
| 9,894,912 B2 | 2/2018 | Jacobsen et al. | |
| 9,895,028 B2 | 2/2018 | Gerard et al. | |
| 9,986,748 B2 | 6/2018 | Lazzarini et al. | |
| 9,993,016 B1 | 6/2018 | Dyer | |
| 10,004,250 B2 | 6/2018 | Ugolini | |
| 10,039,297 B2 | 8/2018 | Grampassi | |
| 10,039,298 B2 | 8/2018 | Noth et al. | |
| 10,094,607 B2 | 10/2018 | Broadbent | |
| 10,123,551 B2 | 11/2018 | Beth Halachmi | |
| 10,137,032 B2 | 11/2018 | Williamson et al. | |
| 10,151,523 B2 | 12/2018 | Sadot et al. | |
| 10,159,270 B2 | 12/2018 | Cocchi et al. | |
| 10,238,129 B2 | 3/2019 | Cocchi et al. | |
| 10,306,905 B2 | 6/2019 | Cocchi | |
| 10,306,906 B2 | 6/2019 | Elsom et al. | |
| 10,321,699 B2* | 6/2019 | Gates | F25D 11/022 |
| 10,321,700 B2 | 6/2019 | Cocchi et al. | |
| 10,327,455 B2* | 6/2019 | Gates | A23G 9/045 |
| 10,334,868 B2 | 7/2019 | Fonte | |
| 10,357,131 B2 | 7/2019 | Dickson, Jr. et al. | |
| 10,375,973 B2 | 8/2019 | Noth et al. | |
| 10,405,562 B2 | 9/2019 | Cocchi et al. | |
| 10,463,059 B2 | 11/2019 | Bush | |
| 10,477,878 B2 | 11/2019 | Cocchi et al. | |
| 10,492,513 B1 | 12/2019 | Sullivan | |
| 10,548,336 B2 | 2/2020 | Tuchrelo et al. | |
| 10,555,545 B2 | 2/2020 | Bischel | |
| 10,570,897 B2 | 2/2020 | Cocchi et al. | |
| 10,571,041 B2 | 2/2020 | Bischel | |
| 10,588,330 B2 | 3/2020 | Cocchi et al. | |
| 10,624,364 B2 | 4/2020 | Cocchi et al. | |
| 10,638,774 B2 | 5/2020 | Grampassi | |
| 10,645,947 B2 | 5/2020 | Versteeg et al. | |
| 10,660,348 B2 | 5/2020 | Cheung | |
| 10,660,349 B2 | 5/2020 | Cocchi et al. | |
| 10,674,743 B2 | 6/2020 | Ugolini | |
| 10,674,744 B2 | 6/2020 | Cocchi et al. | |
| 10,712,063 B2 | 7/2020 | Cobabe et al. | |
| 10,712,087 B2 | 7/2020 | Cui et al. | |
| 10,712,094 B2 | 7/2020 | Cocchi et al. | |
| 10,721,944 B2 | 7/2020 | Dong et al. | |
| 10,736,336 B2 | 8/2020 | Cocchi et al. | |
| 10,736,337 B2 | 8/2020 | Seiler et al. | |
| 10,743,563 B2 | 8/2020 | Mohammed et al. | |
| 10,788,246 B2 | 9/2020 | Frank et al. | |
| 10,806,163 B2 | 10/2020 | Dong et al. | |
| 10,834,940 B2* | 11/2020 | Elsom | A23G 9/28 |
| 10,856,697 B2 | 12/2020 | Boozer et al. | |
| 10,865,459 B2 | 12/2020 | Latva-Kokko | |
| 10,894,705 B2 | 1/2021 | Cocchi et al. | |
| 10,952,455 B2 | 3/2021 | Cocchi et al. | |
| 10,952,456 B2 | 3/2021 | Cocchi et al. | |
| 11,027,300 B2 | 6/2021 | Crossdale et al. | |
| 11,051,531 B2 | 7/2021 | Cocchi et al. | |
| 11,064,715 B2 | 7/2021 | Herbert et al. | |
| 11,118,841 B2 | 9/2021 | Minard | |
| 11,122,816 B2 | 9/2021 | Yang et al. | |
| 11,134,703 B2 | 10/2021 | Cocchi et al. | |
| 11,140,911 B2 | 10/2021 | Cocchi et al. | |
| 11,147,289 B2 | 10/2021 | San Miguel et al. | |
| 11,154,074 B2 | 10/2021 | Greenberg et al. | |
| 11,154,163 B1 | 10/2021 | He et al. | |
| 11,185,091 B2 | 11/2021 | Koehl et al. | |
| 11,187,443 B2 | 11/2021 | Cocchi et al. | |
| 11,213,046 B2 | 1/2022 | Cocchi et al. | |
| 11,278,040 B2 | 3/2022 | Newton et al. | |
| 11,291,218 B2 | 4/2022 | Soffientini et al. | |
| 11,297,850 B2* | 4/2022 | Popov | B67D 1/1204 |
| 11,337,549 B2 | 5/2022 | Tuchrelo et al. | |
| 11,344,045 B2 | 5/2022 | Tuchrelo et al. | |
| 11,399,552 B2 | 8/2022 | Cocchi et al. | |
| 11,406,119 B2 | 8/2022 | Cocchi et al. | |
| 11,412,757 B2 | 8/2022 | Velez et al. | |
| 11,412,884 B2 | 8/2022 | Herbert et al. | |
| 11,470,855 B2 | 10/2022 | Fonte et al. | |
| 11,484,042 B2 | 11/2022 | Cocchi et al. | |
| 11,490,635 B2 | 11/2022 | Dong | |
| 11,497,228 B2 | 11/2022 | Wadle et al. | |
| 11,503,841 B2 | 11/2022 | Fonte et al. | |
| 11,510,421 B2 | 11/2022 | Mfrach | |
| 11,519,650 B2 | 12/2022 | Rupp | |
| 11,528,922 B2 | 12/2022 | Beth Halachmi | |
| RE49,350 E | 1/2023 | Barniol Gutierrez et al. | |
| 11,540,533 B2 | 1/2023 | Cocchi et al. | |
| 11,571,006 B2 | 2/2023 | Luca et al. | |
| 11,576,398 B2 | 2/2023 | Tassi et al. | |
| 11,582,985 B2 | 2/2023 | Cocchi et al. | |
| 11,590,466 B2 | 2/2023 | Charopoulos et al. | |
| 11,627,747 B2 | 4/2023 | Fonte et al. | |
| 11,634,312 B2 | 4/2023 | Fonte et al. | |
| 11,643,321 B2 | 5/2023 | Bush et al. | |
| 11,696,589 B2 | 7/2023 | Cocchi et al. | |

(56) References Cited

U.S. PATENT DOCUMENTS

| | | |
|---|---|---|
| 11,751,582 B2 | 9/2023 | Lazzarini et al. |
| 11,758,920 B1 | 9/2023 | Frank et al. |
| 11,771,108 B2 | 10/2023 | Lazzarini et al. |
| 11,805,789 B2 | 11/2023 | Springer et al. |
| 11,963,638 B2 | 4/2024 | Eissengarthen et al. |
| 2001/0052239 A1 | 12/2001 | Dorner |
| 2002/0162339 A1 | 11/2002 | Harrison et al. |
| 2003/0000240 A1 | 1/2003 | Pahl |
| 2003/0080644 A1 | 5/2003 | Nelson et al. |
| 2003/0142581 A1 | 7/2003 | Barton et al. |
| 2003/0192325 A1 | 10/2003 | Cocchi et al. |
| 2003/0227817 A1 | 12/2003 | Martel et al. |
| 2004/0187514 A1 | 9/2004 | Franck et al. |
| 2004/0226305 A1 | 11/2004 | Grampassi |
| 2006/0043088 A1 | 3/2006 | Ancona et al. |
| 2006/0044935 A1 | 3/2006 | Benelli et al. |
| 2006/0156754 A1 | 7/2006 | Liu |
| 2006/0169147 A1 | 8/2006 | Cocchi et al. |
| 2006/0169727 A1 | 8/2006 | Cocchi et al. |
| 2006/0196366 A1 | 9/2006 | Jeuch |
| 2006/0213903 A1 | 9/2006 | Lin |
| 2007/0119867 A1 | 5/2007 | Nakato et al. |
| 2007/0151101 A1 | 7/2007 | Cocchi et al. |
| 2008/0073376 A1 | 3/2008 | Gist et al. |
| 2008/0098765 A1 | 5/2008 | Bond |
| 2008/0149655 A1 | 6/2008 | Gist et al. |
| 2008/0202130 A1 | 8/2008 | Kadyk |
| 2008/0282722 A1 | 11/2008 | Edmonds et al. |
| 2009/0052143 A1 | 2/2009 | Chiu |
| 2009/0127295 A1 | 5/2009 | Cocchi et al. |
| 2009/0139257 A1 | 6/2009 | Cocchi et al. |
| 2010/0004109 A1 | 1/2010 | Ballhause |
| 2010/0050655 A1 | 3/2010 | Bravo et al. |
| 2010/0116846 A1 | 5/2010 | Cortese et al. |
| 2010/0147875 A1 | 6/2010 | Santos et al. |
| 2010/0293965 A1 | 11/2010 | Frank et al. |
| 2011/0101039 A1 | 5/2011 | Cocchi et al. |
| 2011/0262600 A1 | 10/2011 | McGill |
| 2012/0096876 A1 | 4/2012 | Ravji et al. |
| 2012/0223094 A1 | 9/2012 | Rickard, Jr. et al. |
| 2012/0298690 A1 | 11/2012 | Skobel et al. |
| 2012/0312049 A1 | 12/2012 | Downs, III et al. |
| 2013/0077433 A1 | 3/2013 | Conti |
| 2013/0098098 A1 | 4/2013 | Ugolini |
| 2013/0263747 A1 | 10/2013 | Ugolini |
| 2014/0043931 A1 | 2/2014 | Figueroa |
| 2014/0134299 A1 | 5/2014 | Guidorzi et al. |
| 2014/0209635 A1 | 7/2014 | Gates et al. |
| 2014/0212566 A1 | 7/2014 | Herbert et al. |
| 2014/0263340 A1 | 9/2014 | Audette |
| 2014/0263415 A1 | 9/2014 | San Miguel et al. |
| 2015/0150408 A1 | 6/2015 | Schlee |
| 2015/0191685 A1 | 7/2015 | Kyle |
| 2015/0245636 A1 | 9/2015 | Forrester, Jr. |
| 2015/0264959 A1 | 9/2015 | Colwell et al. |
| 2016/0015217 A1 | 1/2016 | Rojas Restrepo et al. |
| 2016/0016129 A1 | 1/2016 | Vermeulen et al. |
| 2016/0262422 A1 | 9/2016 | Biglari et al. |
| 2016/0353766 A1 | 12/2016 | Jacobsen et al. |
| 2017/0027188 A1 | 2/2017 | Raybin et al. |
| 2017/0160007 A1 | 6/2017 | Liptak et al. |
| 2017/0304784 A1 | 10/2017 | Kasprzycki |
| 2017/0332658 A1 | 11/2017 | Mitchell et al. |
| 2017/0367370 A1 | 12/2017 | Frisque et al. |
| 2018/0014553 A1 | 1/2018 | Ugolini |
| 2018/0020875 A1 | 1/2018 | Kolar et al. |
| 2018/0184682 A1 | 7/2018 | Bertone |
| 2018/0206519 A1 | 7/2018 | Noth et al. |
| 2018/0216875 A1 | 8/2018 | Caswell et al. |
| 2018/0228180 A1 | 8/2018 | Cocchi et al. |
| 2018/0231318 A1 | 8/2018 | Cocchi et al. |
| 2019/0056182 A1 | 2/2019 | Bischel et al. |
| 2019/0070643 A1 | 3/2019 | Wong et al. |
| 2019/0110496 A1 | 4/2019 | Cocchi et al. |
| 2019/0124944 A1 | 5/2019 | Caiano |
| 2019/0125122 A1 | 5/2019 | Feola |
| 2019/0166873 A1 | 6/2019 | Grampassi |
| 2019/0313664 A1 | 10/2019 | Haas et al. |
| 2019/0357562 A1 | 11/2019 | San Miguel et al. |
| 2020/0107559 A1 | 4/2020 | Deshpande et al. |
| 2020/0156019 A1 | 5/2020 | Sawyer et al. |
| 2020/0173697 A1 | 6/2020 | Resnick |
| 2020/0288746 A1 | 9/2020 | Luca et al. |
| 2020/0288747 A1 | 9/2020 | Greenberg et al. |
| 2020/0339407 A1 | 10/2020 | Caiano |
| 2021/0000133 A1 | 1/2021 | Meldrum et al. |
| 2021/0003549 A1 | 1/2021 | Ino et al. |
| 2021/0022364 A1 | 1/2021 | Meldrum et al. |
| 2021/0084930 A1 | 3/2021 | Fonte |
| 2021/0085129 A1 | 3/2021 | Boozer et al. |
| 2021/0152649 A1 | 5/2021 | Ciepiel |
| 2021/0161182 A1 | 6/2021 | Stoenescu et al. |
| 2021/0186267 A1 | 6/2021 | Hammond et al. |
| 2021/0354100 A1 | 11/2021 | Sapire et al. |
| 2021/0360979 A1 | 11/2021 | Leb et al. |
| 2021/0368821 A1 | 12/2021 | Tassi et al. |
| 2021/0371265 A1 | 12/2021 | Fonte et al. |
| 2022/0001344 A1 | 1/2022 | Zdanow et al. |
| 2022/0030906 A1 | 2/2022 | Springer et al. |
| 2022/0073336 A1 | 3/2022 | Savioz |
| 2022/0087284 A1 | 3/2022 | Savioz |
| 2022/0110339 A1 | 4/2022 | Beth Halachmi et al. |
| 2022/0117255 A1 | 4/2022 | Lazzarini et al. |
| 2022/0117256 A1 | 4/2022 | Wang |
| 2022/0174978 A1 | 6/2022 | Douer |
| 2022/0205712 A1 | 6/2022 | Fonte |
| 2022/0211072 A1 | 7/2022 | Tran et al. |
| 2022/0225636 A1 | 7/2022 | Minard et al. |
| 2022/0240533 A1 | 8/2022 | Dees et al. |
| 2022/0273141 A1 | 9/2022 | Atinaja |
| 2022/0295822 A1 | 9/2022 | Lazzarini et al. |
| 2022/0394996 A1 | 12/2022 | Lazzarini et al. |
| 2023/0000289 A1 | 1/2023 | Kolar et al. |
| 2023/0038281 A1 | 2/2023 | Gee, II et al. |
| 2023/0040750 A1 | 2/2023 | Ciepiel et al. |
| 2023/0055322 A1 | 2/2023 | Griffiths et al. |
| 2023/0074503 A1 | 3/2023 | Kanellos et al. |
| 2023/0107530 A1 | 4/2023 | Kadyk et al. |
| 2023/0180785 A1 | 6/2023 | Feola |
| 2023/0292785 A1 | 9/2023 | Collins et al. |
| 2023/0413851 A1 | 12/2023 | Resnick et al. |
| 2024/0074453 A1 | 3/2024 | Herbert et al. |
| 2024/0292979 A1 | 9/2024 | Weinstock et al. |
| 2024/0292980 A1 | 9/2024 | Weinstock et al. |

FOREIGN PATENT DOCUMENTS

| | | |
|---|---|---|
| CN | 2681650 Y | 3/2005 |
| CN | 2719037 Y | 8/2005 |
| CN | 101035719 B | 9/2010 |
| CN | 101897379 A | 12/2010 |
| CN | 101953631 A | 1/2011 |
| CN | 102395280 A | 3/2012 |
| CN | 1981590 B | 7/2012 |
| CN | 202287939 U | 7/2012 |
| CN | 101073373 B | 9/2012 |
| CN | 102869269 A | 1/2013 |
| CN | 101433257 B | 3/2013 |
| CN | 202773994 U | 3/2013 |
| CN | 101263838 B | 6/2013 |
| CN | 203194450 U | 9/2013 |
| CN | 101842022 B | 5/2014 |
| CN | 102802432 B | 9/2014 |
| CN | 104222447 A | 12/2014 |
| CN | 102791142 B | 2/2015 |
| CN | 103052324 B | 2/2015 |
| CN | 104351455 A | 2/2015 |
| CN | 104839419 A | 8/2015 |
| CN | 103727718 B | 5/2016 |
| CN | 104146140 B | 6/2016 |
| CN | 105685363 A | 6/2016 |
| CN | 105767441 A | 7/2016 |
| CN | 105876067 A | 8/2016 |
| CN | 104349681 B | 12/2016 |

(56) References Cited

FOREIGN PATENT DOCUMENTS

| | | |
|---|---|---|
| CN | 106472801 A | 3/2017 |
| CN | 106472802 A | 3/2017 |
| CN | 103619187 B | 5/2017 |
| CN | 103796562 B | 5/2017 |
| CN | 106720895 A | 5/2017 |
| CN | 106720899 A | 5/2017 |
| CN | 206137910 U | 5/2017 |
| CN | 103190521 B | 6/2017 |
| CN | 106900971 A | 6/2017 |
| CN | 106998739 A | 8/2017 |
| CN | 206480820 U | 9/2017 |
| CN | 105636681 B | 2/2018 |
| CN | 105928284 B | 3/2018 |
| CN | 107799959 A | 3/2018 |
| CN | 108471774 A | 8/2018 |
| CN | 108967640 A | 12/2018 |
| CN | 109068679 A | 12/2018 |
| CN | 109152386 A | 1/2019 |
| CN | 305037389 S | 2/2019 |
| CN | 109497252 A | 3/2019 |
| CN | 305239624 S | 7/2019 |
| CN | 106414244 B | 8/2019 |
| CN | 110168296 A | 8/2019 |
| CN | 105142417 B | 10/2019 |
| CN | 105517448 B | 11/2019 |
| CN | 110432373 A | 11/2019 |
| CN | 110477182 A | 11/2019 |
| CN | 104782875 B | 12/2019 |
| CN | 105992518 B | 12/2019 |
| CN | 110573023 A | 12/2019 |
| CN | 110604206 A | 12/2019 |
| CN | 104543313 B | 3/2020 |
| CN | 111011572 A | 4/2020 |
| CN | 111096388 A | 5/2020 |
| CN | 111386045 A | 7/2020 |
| CN | 111887338 A | 11/2020 |
| CN | 111903828 A | 11/2020 |
| CN | 111918557 A | 11/2020 |
| CN | 111918558 A | 11/2020 |
| CN | 112262910 A | 1/2021 |
| CN | 105767440 B | 3/2021 |
| CN | 105795089 B | 3/2021 |
| CN | 212872077 U | 4/2021 |
| CN | 111609640 B | 5/2021 |
| CN | 213095924 U | 5/2021 |
| CN | 106562677 B | 6/2021 |
| CN | 112911941 A | 6/2021 |
| CN | 105028886 B | 7/2021 |
| CN | 105580972 B | 7/2021 |
| CN | 109689530 B | 9/2021 |
| CN | 214223471 U | 9/2021 |
| CN | 214284224 U | 9/2021 |
| CN | 306833593 S | 9/2021 |
| CN | 106234750 B | 10/2021 |
| CN | 107279447 B | 10/2021 |
| CN | 113483505 A | 10/2021 |
| CN | 214316889 U | 10/2021 |
| CN | 214841943 U | 11/2021 |
| CN | 113729494 A | 12/2021 |
| CN | 113776237 A | 12/2021 |
| CN | 215176200 U | 12/2021 |
| CN | 113892544 A | 1/2022 |
| CN | 113892551 A | 1/2022 |
| CN | 113907172 A | 1/2022 |
| CN | 113925109 A | 1/2022 |
| CN | 216088684 U | 3/2022 |
| CN | 108471775 B | 5/2022 |
| CN | 114424796 A | 5/2022 |
| CN | 114760847 A | 7/2022 |
| CN | 114760848 A | 7/2022 |
| CN | 216906702 U | 7/2022 |
| CN | 114868828 A | 8/2022 |
| CN | 114870688 A | 8/2022 |
| CN | 217284664 U | 8/2022 |
| CN | 115348822 A | 11/2022 |
| CN | 115397250 A | 11/2022 |
| CN | 108402274 B | 12/2022 |
| CN | 218495421 U | 2/2023 |
| CN | 109414034 B | 3/2023 |
| CN | 109463523 B | 3/2023 |
| CN | 107788200 B | 6/2023 |
| CN | 109090329 B | 6/2023 |
| CN | 110269127 B | 7/2023 |
| CN | 116473154 A | 7/2023 |
| CN | 113892548 B | 8/2023 |
| CN | 113925107 B | 8/2023 |
| CN | 113892544 B | 9/2023 |
| CN | 113728208 B | 10/2023 |
| CN | 114009573 B | 10/2023 |
| CN | 114009574 B | 10/2023 |
| CN | 220287817 U | 1/2024 |
| CN | 308416570 S | 1/2024 |
| CN | 308422196 S | 1/2024 |
| CN | 117928143 A | 4/2024 |
| CN | 117958344 A | 5/2024 |
| CN | 221059481 U | 6/2024 |
| CN | 308671658 S | 6/2024 |
| CN | 118383446 A | 7/2024 |
| CN | 118383447 A | 7/2024 |
| CN | 118383448 A | 7/2024 |
| CN | 308729489 S | 7/2024 |
| CN | 118415268 A | 8/2024 |
| CN | 118442732 A | 8/2024 |
| CN | 118463436 A | 8/2024 |
| CN | 118489792 A | 8/2024 |
| CN | 118645963 A | 9/2024 |
| CN | 221881850 U | 10/2024 |
| CN | 118873002 A | 11/2024 |
| CN | 118912748 A | 11/2024 |
| CN | 118949740 A | 11/2024 |
| CN | 119097039 A | 12/2024 |
| CN | 119111683 A | 12/2024 |
| CN | 222278939 U | 12/2024 |
| CN | 119344398 A | 1/2025 |
| CN | 309149866 S | 3/2025 |
| CN | 119744961 A | 4/2025 |
| CN | 222692687 U | 4/2025 |
| CN | 309228156 S | 4/2025 |
| DE | 1981857 U | 3/1968 |
| DE | 2225460 | 12/1973 |
| DE | 19701379 A1 | 6/1998 |
| DE | 102016219197 A1 | 4/2018 |
| EM | 001766817 | 10/2010 |
| EP | 0022090 A2 | 1/1981 |
| EP | 0133844 A1 | 3/1985 |
| EP | 0250245 B1 | 3/1991 |
| EP | 0793535 B1 | 6/1999 |
| EP | 0861597 A3 | 11/1999 |
| EP | 0827480 B1 | 9/2002 |
| EP | 0876765 B1 | 10/2002 |
| EP | 0910269 B1 | 10/2002 |
| EP | 1132007 A3 | 9/2003 |
| EP | 0893070 B1 | 9/2005 |
| EP | 1787526 A1 | 5/2007 |
| EP | 1808622 A1 | 7/2007 |
| EP | 1635682 B1 | 8/2007 |
| EP | 1787524 A3 | 11/2008 |
| EP | 1738652 B1 | 5/2009 |
| EP | 2266416 A1 | 12/2010 |
| EP | 2332450 A1 | 6/2011 |
| EP | 1980156 B1 | 6/2012 |
| EP | 2062481 B1 | 6/2012 |
| EP | 2342997 B1 | 6/2012 |
| EP | 2478774 A1 | 7/2012 |
| EP | 2064957 B1 | 1/2013 |
| EP | 2446750 B1 | 1/2013 |
| EP | 2578119 A1 | 4/2013 |
| EP | 2267340 B1 | 3/2014 |
| EP | 2613643 B1 | 4/2014 |
| EP | 2508080 B1 | 5/2015 |
| EP | 2708169 B1 | 6/2015 |
| EP | 2680708 B1 | 1/2016 |
| EP | 2550869 B1 | 2/2017 |
| EP | 2805620 B1 | 2/2017 |

(56) References Cited

FOREIGN PATENT DOCUMENTS

| | | |
|---|---|---|
| EP | 2269469 B1 | 4/2017 |
| EP | 2277386 B1 | 4/2017 |
| EP | 2713765 B1 | 8/2017 |
| EP | 2653808 A3 | 1/2018 |
| EP | 2863777 B1 | 6/2018 |
| EP | 3348516 A1 | 7/2018 |
| EP | 3360422 A1 | 8/2018 |
| EP | 3172970 B1 | 1/2019 |
| EP | 3399865 B1 | 7/2019 |
| EP | 3324804 B1 | 3/2020 |
| EP | 3245430 B1 | 5/2020 |
| EP | 3669661 A1 | 6/2020 |
| EP | 3351113 B1 | 12/2020 |
| EP | 3340844 B1 | 10/2022 |
| EP | 3473950 B1 | 3/2023 |
| EP | 3519347 B1 | 3/2023 |
| EP | 3554252 B1 | 5/2023 |
| EP | 3793416 B1 | 5/2023 |
| EP | 3616528 B1 | 7/2023 |
| FR | 2574253 B1 | 2/1990 |
| FR | 2705550 A1 | 12/1994 |
| GB | 1183551 | 3/1970 |
| GB | 2444979 B | 6/2008 |
| IT | 102010901894460 | 5/2012 |
| IT | 102019000002923 | 8/2020 |
| JP | H11113498 A | 4/1999 |
| JP | H11299429 A | 11/1999 |
| JP | 2001169730 A | 6/2001 |
| KR | 9761081 A | 9/1997 |
| KR | 100214695 B1 | 8/1999 |
| WO | 0125673 A1 | 4/2001 |
| WO | 0197628 A1 | 12/2001 |
| WO | 2004054380 A1 | 7/2004 |
| WO | 2008001520 A1 | 1/2008 |
| WO | 2008119980 A1 | 10/2008 |
| WO | 2011081301 A2 | 7/2011 |
| WO | 2014123842 A1 | 8/2014 |
| WO | 2015063094 A1 | 5/2015 |
| WO | 2016069106 A1 | 5/2016 |
| WO | 2019057130 A1 | 3/2019 |
| WO | 2020163551 A1 | 8/2020 |
| WO | 2020191221 A1 | 9/2020 |
| WO | 2021009788 A1 | 1/2021 |
| WO | 2021250682 A1 | 12/2021 |
| WO | 2022205902 A1 | 10/2022 |
| WO | 2023042084 A1 | 3/2023 |
| WO | 2023091416 A3 | 5/2023 |
| WO | 2023131944 A1 | 7/2023 |
| WO | 2024111011 A1 | 5/2024 |

OTHER PUBLICATIONS

Pending U.S. Appl. No. 29/943,526, filed May 22, 2024; Cameron John Auger, Joyce Chien Tu.
Pending U.S. Appl. No. 18/423,721, filed Jan. 26, 2024; Macrae Benziger, Michael Lerman, Alexander Mularski.
Pending U.S. Appl. No. 18/423,728, filed Jan. 26, 2024; Macrae Benziger, Michael Lerman, Alexander Mularski, Matthew Roberts.
Pending U.S. Appl. No. 19/071,253, filed Mar. 5, 2025; Stephanie Cugini, Elizabeth Pellegrini, Cameron John Auger, Joyce Tu, Yaoming Deng, Bing Yin, Pei Zheng, Jared James Proulx, Michael Lerman, Alexander Mularski, Macrae Benziger, Ryan Michienzi.
Pending U.S. Appl. No. 18/415,817, filed Jan. 18, 2024; Michael Lerman, Macrae Benziger, Alexander Mularski, Ryan Michienzi, Vipul Mone.
Pending U.S. Appl. No. 18/423,899, filed Jan. 26, 2024; Michael Lerman, Macrae Benziger, Alexander Mularski, Vipul Mone.
Pending U.S. Appl. No. 18/423,906, filed Jan. 26, 2024; Michael Lerman, Macrae Benziger, Ryan Michienzi.
Pending U.S. Appl. No. 18/424,517, filed Jan. 26, 2024; Michael Lerman, Macrae Benziger, Alexander Mularski, Derek Lessard.
Pending U.S. Appl. No. 18/424,530, filed Jan. 26, 2024; Michael Lerman, Macrae Benziger, Alexander Mularski, Vipul Mone.
Pending U.S. Appl. No. 18/658,434, filed May 8, 2024; Michael Lerman, Jennifer Andrews, Alexander Mularski.
Pending U.S. Appl. No. 18/816,489, filed Aug. 27, 2024; Michael Lerman, Macrae Benziger, Alexander Mularski, Vipul Mone.
Pending U.S. Appl. No. 18/817,411, filed Aug. 28, 2024; Michael Lerman, Vipul Mone.
Pending U.S. Appl. No. 18/817,424, filed Aug. 28, 2024; Michael Lerman, Vipul Mone.
Pending U.S. Appl. No. 18/817,476, filed Aug. 28, 2024; Michael Lerman, Alexander Mularski, Jared James Proulx, Vipul Mone, Macrae Benziger.
Pending U.S. Application No. 29/944, 388 filed May 28, 2024; Michael Lerman, Alexander Mularski, Macrae Benziger, Yaoming Deng, Pei Zheng, Bing Yin.
Pending U.S. Application No. 63/669, 144 filed Jul. 9, 2024; Michael Lerman, Jared James Proulx, Vipul Mone.
Pending U.S. Appl. No. 18/424,536, filed Jan. 26, 2024; Derek Lessard, Michael Lerman, Lloyd Olson, Ryan Michienzi.
Pending U.S. Appl. No. 18/426,942, filed Jan. 30, 2024; Derek Lessard, Michael Lerman, Lloyd Olson, Ryan Michienzi.
Pending U.S. Appl. No. 18/423,894, filed Jan. 26, 2024; Matthew Roberts, Michael Lerman, Macrae Benziger, Alexander Mularski.
Pending U.S. Appl. No. 18/816,401, filed Aug. 27, 2024; Matthew Roberts, Michael Lerman, Macrae Benziger, Alexander Mularski.
Pending U.S. Appl. No. 19/071,024, filed Mar. 5, 2025; Matthew Roberts, Michael Lerman, Macrae Benziger, Alexander Mularski.
Complaint For Declaratory Judgment, *Foshan Macjerry Technology Co., Ltd.* v. *SharkNinja Operating LLC*, No. 2:25-cv-00954 (W.D. Wash. May 19, 2025), 59 pages.
Complaint For Declaratory Judgment and Other Relief, *Shenzhen Tao Yi an E-Commerce Co., Ltd.* v. *SharkNinja Operating LLC*, No. 5:25-cv-04656 (N.D. Cal. Jun. 3, 2025), 13 pages.
Answer and Affirmative Defenses to Counterclaims, *Foshan Macjerry Technology Co., Ltd.* v. *SharkNinja Operating LLC*, No. 2:25-cv-00954 (W.D. Wash. Jul. 11, 2025) 14 pages.
Answer and Counterclaims, *SharkNinja Operating LLC* v. *RJ Brands, LLC*, No. 1:25-cv-05650 (D.N.J. Aug. 11, 2025) 37 pages.

\* cited by examiner

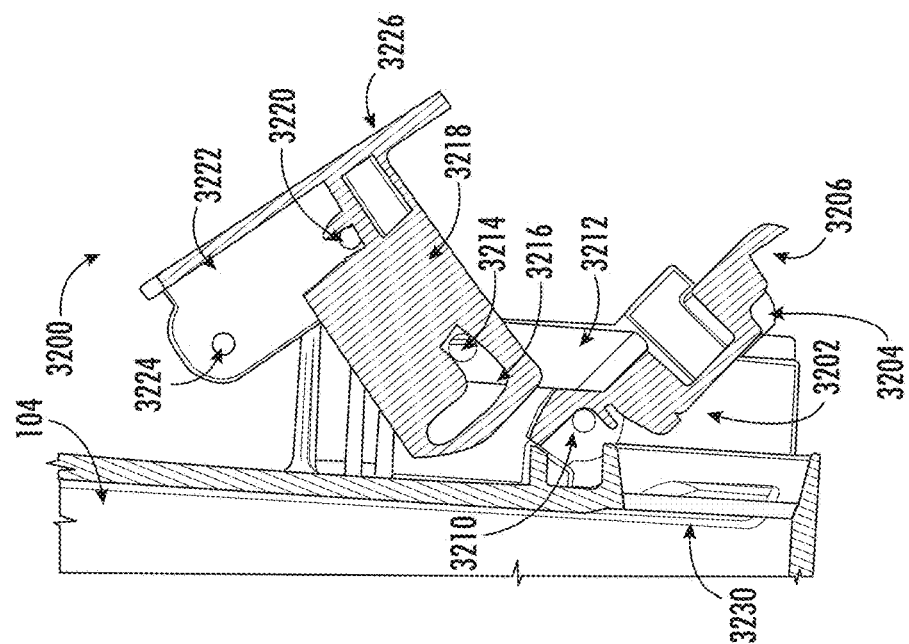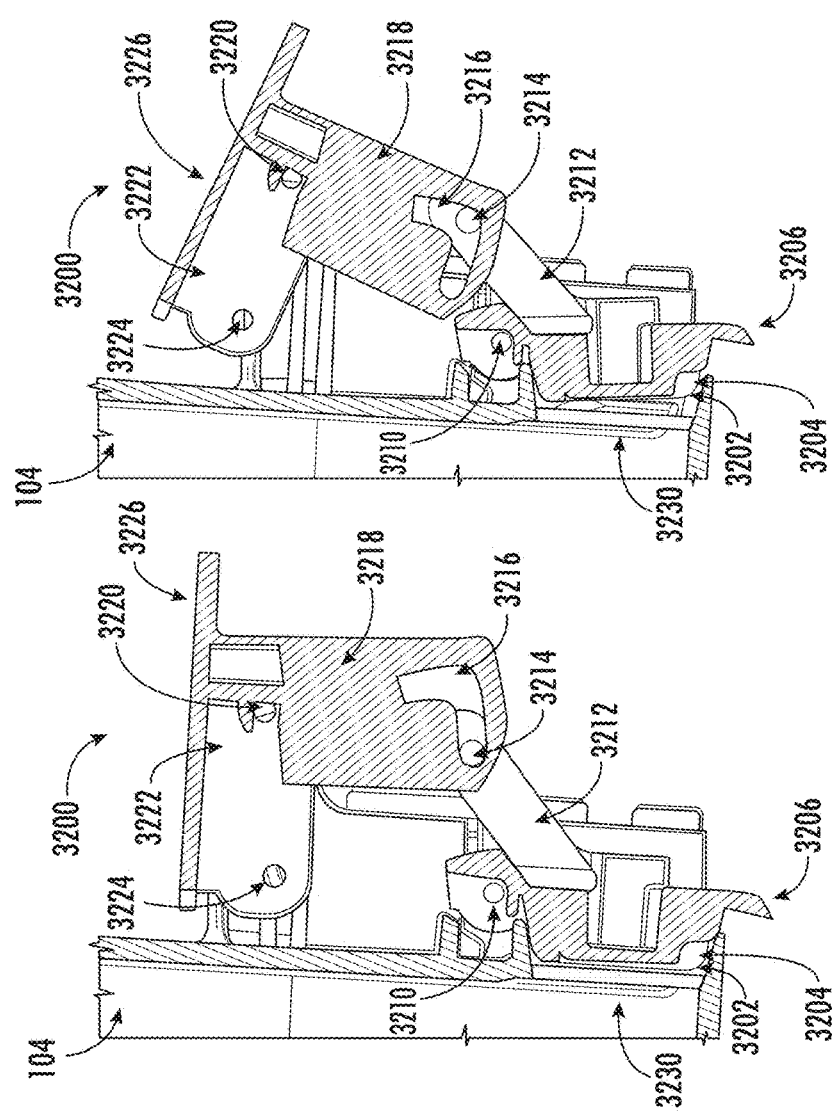

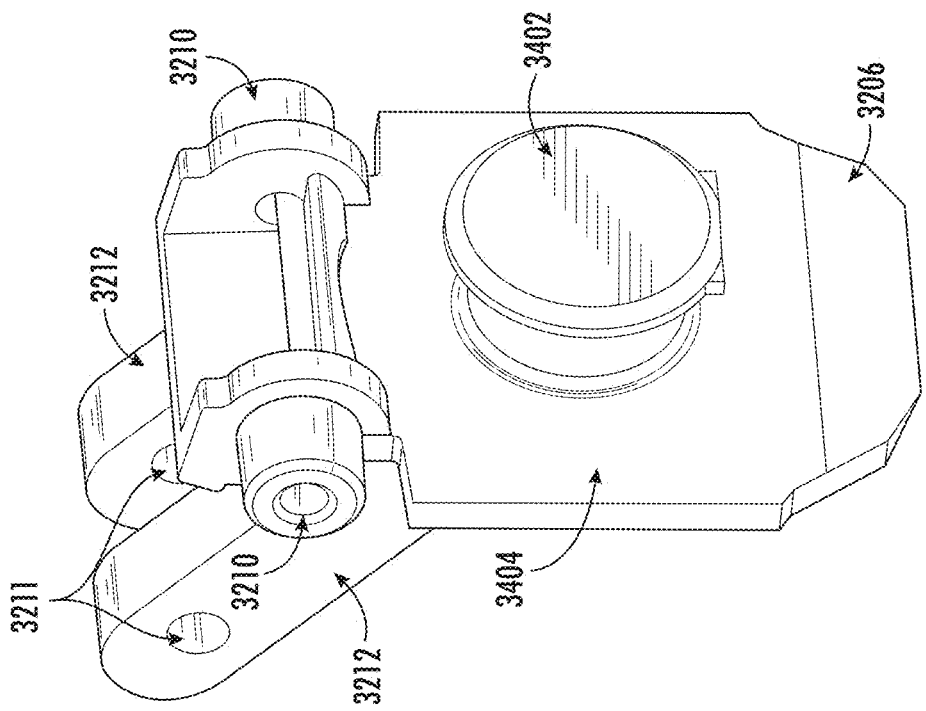
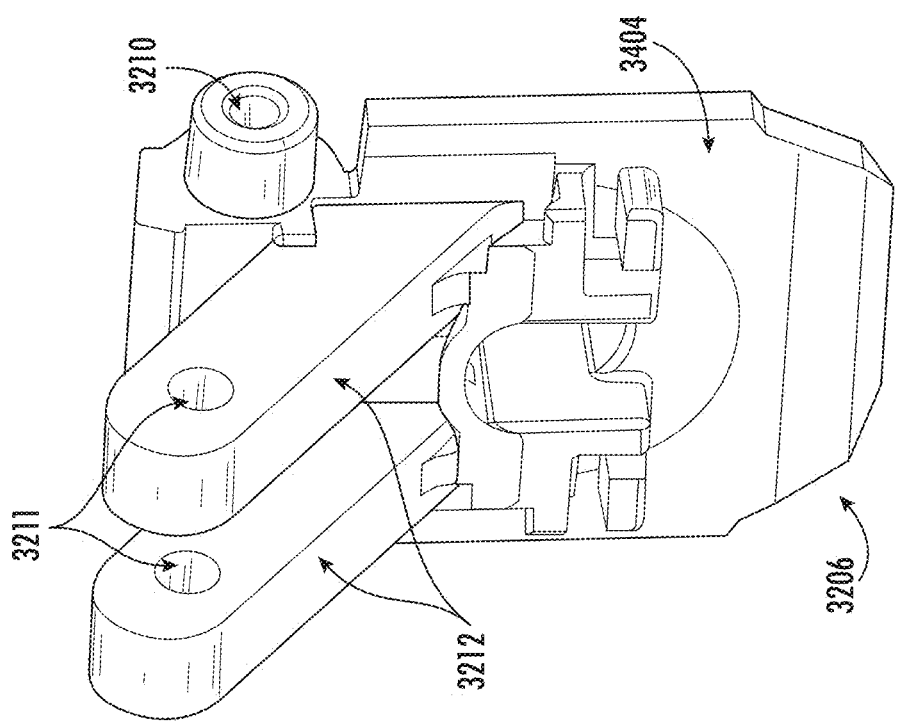
FIG. 34A
FIG. 34B

MULTI-STAGE DISPENSER ASSEMBLY

BACKGROUND

1. Technical Field

The present disclosure relates to drink makers and, more particularly, to a dispenser assembly for a drink maker that is configured to provide multi-stage dispensing operations.

2. Technical Considerations

Frozen drink makers, which may also be referred to as semi-frozen beverage makers, or crushed-ice drink makers typically include a transparent tank or mixing vessel in which a drink product is received and processed, including being cooled, often transforming the drink product from a pure liquid (or a combination of a liquid and portions of ice) to a frozen or semi-frozen product, such as, for example, a granita, slush drink, smoothie, ice cream, or other frozen or semi-frozen product, which is then dispensed. The cooled product is typically dispensed through a tap, spigot, or dispenser located at the front and near the bottom of the vessel. Thus, the term "frozen drink maker" as used herein is not limited to a device that only makes drinks or frozen drinks, but includes devices that cool received drink products to produce cooled outputs in any of a variety of frozen and semi-frozen forms. A drink product typically consists of a mixture of water, juice, or milk, and syrup, flavoring powders, or other additives that give the drink product the desired taste and color.

Drink makers may chill drink product to a cold temperature, to a semi-frozen state, or to a frozen state. Such drink products may have different viscosities based on temperature, in addition to composition. Drink products with low viscosity may flow quickly from a spout of a mixing vessel, increasing the likelihood of splashing or spreading out as it travels to a beverage container. Drink products with high viscosity may flow slowly and require few impediments so that it travels to a beverage container in a timely fashion. There is a need in the art for a dispenser assembly that is configured to accommodate the clean and efficient dispensing of both low-viscosity and high-viscosity drink product.

SUMMARY

Accordingly, provided is an improved dispenser assembly with multi-stage dispensing operation.

According to some non-limiting embodiments or aspects, provided is a dispenser assembly for a drink maker. The dispenser assembly includes a lever, a cam, and a seal. The lever is configured to be pulled by a user a first distance to a first position. The lever is further configured to be pulled by the user a second distance to a second position. The cam is configured to provide a first resistance to pulling the lever when the lever is pulled over the first distance to the first position. The cam is further configured to provide a second resistance to pulling the lever when the lever is pulled over the second distance to the second position. The seal is configured to be moved in response to movement of the lever and the cam. The seal partly opens a spout of the drink maker when the lever is in the first position and fully opens the spout when the lever is in the second position.

In some non-limiting embodiments or aspects, the dispenser assembly may further include a first link member connected at a first end of the first link member to the lever. The first link member may include the cam at a second end of the first link member.

In some non-limiting embodiments or aspects, the dispenser assembly may further include a bracket member configured to support the seal. The dispenser assembly may further include a second link member connected at a first end of the second link member to the bracket member and slidably connected at a second end of the second link member to the cam.

In some non-limiting embodiments or aspects, the dispenser assembly may include a pin positioned at the second end of the second link member. The cam may include a cambered slot configured to receive the pin therein.

In some non-limiting embodiments or aspects, the cambered slot may include an L-shaped slot including a first slot length and a second slot length.

In some non-limiting embodiments or aspects, the second slot length may be positioned at an angle greater than or equal to 80 degrees relative to the first slot length.

In some non-limiting embodiments or aspects, the pin may be configured to slide within the first slot length of the L-shaped slot of the cam when the lever is pulled over the first distance to the first position. The pin may be configured to slide within the second slot length of the L-shaped slot of the cam when the lever is pulled over the second distance to the second position.

In some non-limiting embodiments or aspects, the seal may include a recessed channel therein configured to guide a liquid flow of drink product from the spout and downward toward a beverage container.

In some non-limiting embodiments or aspects, when the lever is in the first position, an outer perimeter of the seal may block a majority of liquid flow from the spout and the recessed channel of the seal may permit some liquid flow through the recessed channel of the seal.

In some non-limiting embodiments or aspects, the bracket member may be configured to extend below the seal and further guide a liquid flow of drink product downward toward a beverage container.

In some non-limiting embodiments or aspects, the dispenser assembly may include a shroud configured to cover at least part of the seal and the spout. The shroud may include a concave recessed channel on an interior surface of the shroud configured to guide a liquid flow of drink product out of the spout and downward toward a beverage container.

In some non-limiting embodiments or aspects, when the user pulls the lever in a first rotational direction over the first distance, the seal may be retracted from the spout by a first angle to permit a first rate of flow from the spout.

In some non-limiting embodiments or aspects, when the user pulls the lever in the first rotational direction over the second distance, the seal may be further retracted from the spout by a second angle greater than the first angle, to permit a second rate of flow from the spout greater than the first rate of flow.

In some non-limiting embodiments or aspects, the dispenser assembly may further include a spring connected to a lower portion of the lever, the spring providing a biasing force for the first resistance and the second resistance.

In some non-limiting embodiments or aspects, when the user releases the lever from the first position or the second position, the biasing force of the spring may return the lever to a rest position and may return the seal to a sealed position relative to the spout.

According to some non-limiting embodiments or aspects, provided is a drink maker. The drink maker includes a dispenser assembly. The dispenser assembly includes a lever, a cam, and a seal. The lever is configured to be pulled by a user a first distance to a first position. The lever is further configured to be pulled by the user a second distance to a second position. The cam is configured to provide a first resistance to pulling the lever when the lever is pulled over the first distance to the first position. The cam is further configured to provide a second resistance to pulling the lever when the lever is pulled over the second distance to the second position. The seal is configured to be moved in response to movement of the lever and the cam. The seal partly opens a spout of the drink maker when the lever is in the first position and fully opens the spout when the lever is in the second position.

In some non-limiting embodiments or aspects, the dispenser assembly may further include a bracket member configured to support the seal. The dispenser assembly may further include a second link member connected at a first end of the second link member to the bracket member and slidably connected at a second end of the second link member to the cam. The dispenser assembly may further include a pin positioned at the second end of the second link member. The cam may include a cambered slot configured to receive the pin therein.

In some non-limiting embodiments or aspects, the cambered slot may include an L-shaped slot including a first slot length and a second slot length. The pin may be configured to slide within the first slot length of the L-shaped slot of the cam when the lever is pulled over the first distance to the first position. The pin may be further configured to slide within the second slot length of the L-shaped slot of the cam when the lever is pulled over the second distance to the second position.

In some non-limiting embodiments or aspects, the seal may include a recessed channel therein configured to guide a liquid flow of drink product from the spout and downward toward a beverage container.

In some non-limiting embodiments or aspects, the dispenser assembly may further include a shroud configured to cover at least part of the seal and the spout. The shroud may include a concave recessed channel on an interior surface of the shroud configured to guide a liquid flow of drink product out of the spout and downward toward a beverage container.

Further non-limiting embodiments or aspects are set forth in the following numbered clauses:

Clause 1: A dispenser assembly for a drink maker comprising: a lever configured to be pulled by a user a first distance to a first position, the lever further configured to be pulled by the user a second distance to a second position; a cam configured to provide a first resistance to pulling the lever when the lever is pulled over the first distance to the first position and provide a second resistance to pulling the lever when the lever is pulled over the second distance to the second position; and a seal configured to be moved in response to movement of the lever and the cam, wherein the seal partly opens a spout of the drink maker when the lever is in the first position and fully opens the spout when the lever is in the second position.

Clause 2: The dispenser assembly of clause 1, further comprising a first link member connected at a first end of the first link member to the lever, the first link member comprising the cam at a second end of the first link member.

Clause 3: The dispenser assembly of clause 1 or clause 2, further comprising: a bracket member configured to support the seal; and a second link member connected at a first end of the second link member to the bracket member and slidably connected at a second end of the second link member to the cam.

Clause 4: The dispenser assembly of any of clauses 1-3, further comprising a pin positioned at the second end of the second link member, wherein the cam comprises a cambered slot configured to receive the pin therein.

Clause 5: The dispenser assembly of any of clauses 1-4, wherein the cambered slot comprises an L-shaped slot comprising a first slot length and a second slot length.

Clause 6: The dispenser assembly of any of clauses 1-5, wherein the second slot length is positioned at an angle greater than or equal to 80 degrees relative to the first slot length.

Clause 7: The dispenser assembly of any of clauses 1-6, wherein the pin is configured to slide within the first slot length of the L-shaped slot of the cam when the lever is pulled over the first distance to the first position, and wherein the pin is configured to slide within the second slot length of the L-shaped slot of the cam when the lever is pulled over the second distance to the second position.

Clause 8: The dispenser assembly of any of clauses 1-7, wherein the seal comprises a recessed channel therein configured to guide a liquid flow of drink product from the spout and downward toward a beverage container.

Clause 9: The dispenser assembly of any of clauses 1-8, wherein when the lever is in the first position, an outer perimeter of the seal blocks a majority of liquid flow from the spout and the recessed channel of the seal permits some liquid flow through the recessed channel of the seal.

Clause 10: The dispenser assembly of any of clauses 1-9, wherein the bracket member is configured to extend below the seal and further guide a liquid flow of drink product downward toward a beverage container.

Clause 11: The dispenser assembly of any of clauses 1-10, further comprising a shroud configured to cover at least part of the seal and the spout, the shroud comprising a concave recessed channel on an interior surface of the shroud configured to guide a liquid flow of drink product out of the spout and downward toward a beverage container.

Clause 12: The dispenser assembly of any of clauses 1-11, wherein when the user pulls the lever in a first rotational direction over the first distance, the seal is retracted from the spout by a first angle to permit a first rate of flow from the spout.

Clause 13: The dispenser assembly of any of clauses 1-12, wherein when the user pulls the lever in the first rotational direction over the second distance, the seal is further retracted from the spout by a second angle greater than the first angle, to permit a second rate of flow from the spout greater than the first rate of flow.

Clause 14: The dispenser assembly of any of clauses 1-13, further comprising a spring connected to a lower portion of the lever, the spring providing a biasing force for the first resistance and the second resistance.

Clause 15: The dispenser assembly of any of clauses 1-14, wherein, when the user releases the lever from the first position or the second position, the biasing force of the spring returns the lever to a rest position and returns the seal to a sealed position relative to the spout.

Clause 16: A drink maker comprising: a dispenser assembly comprising: a lever configured to be pulled by a user a first distance to a first position, the lever further configured to be pulled by the user a second distance to a second position; a cam configured to provide a first resistance to pulling the lever when the lever is pulled over the first distance to the first position and provide a second resistance to pulling the lever when the lever is pulled over the second distance to the second position; and a seal configured to be moved in response to movement of the lever and the cam, wherein the seal partly opens a spout of the drink maker when the lever is in the first position and fully opens the spout when the lever is in the second position.

Clause 17: The drink maker of clause 16, wherein the dispenser assembly further comprises: a bracket member configured to support the seal; a second link member connected at a first end of the second link member to the bracket member and slidably connected at a second end of the second link member to the cam; and a pin positioned at the second end of the second link member, wherein the cam comprises a cambered slot configured to receive the pin therein.

Clause 18: The drink maker of clause 16 or clause 17, wherein the cambered slot comprises an L-shaped slot comprising a first slot length and a second slot length, wherein the pin is configured to slide within the first slot length of the L-shaped slot of the cam when the lever is pulled over the first distance to the first position, and wherein the pin is configured to slide within the second slot length of the L-shaped slot of the cam when the lever is pulled over the second distance to the second position.

Clause 19: The drink maker of any of clauses 16-18, wherein the seal comprises a recessed channel therein configured to guide a liquid flow of drink product from the spout and downward toward a beverage container.

Clause 20: The drink maker of any of clauses 16-19, further comprising a shroud configured to cover at least part of the seal and the spout, the shroud comprising a concave recessed channel on an interior surface of the shroud configured to guide a liquid flow of drink product out of the spout and downward toward a beverage container.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings and appendix are for the purpose of illustration and description only and are not intended as a definition of the limits of the disclosed subject matter.

BRIEF DESCRIPTION OF THE DRAWINGS

Additional advantages and details are explained in greater detail below with reference to the non-limiting, exemplary embodiments that are illustrated in the accompanying schematic figures, in which:

FIGS. 32A-32C show a cross-sectional profile view of a dispenser assembly, according to non-limiting embodiments or aspects;

FIG. 34A shows a rear, perspective view of a lower portion of a dispenser assembly, according to non-limiting embodiments or aspects;

FIG. 34B shows a front, perspective view of a lower portion of a dispenser assembly, according to non-limiting embodiments or aspects;

DETAILED DESCRIPTION

Figure 1:
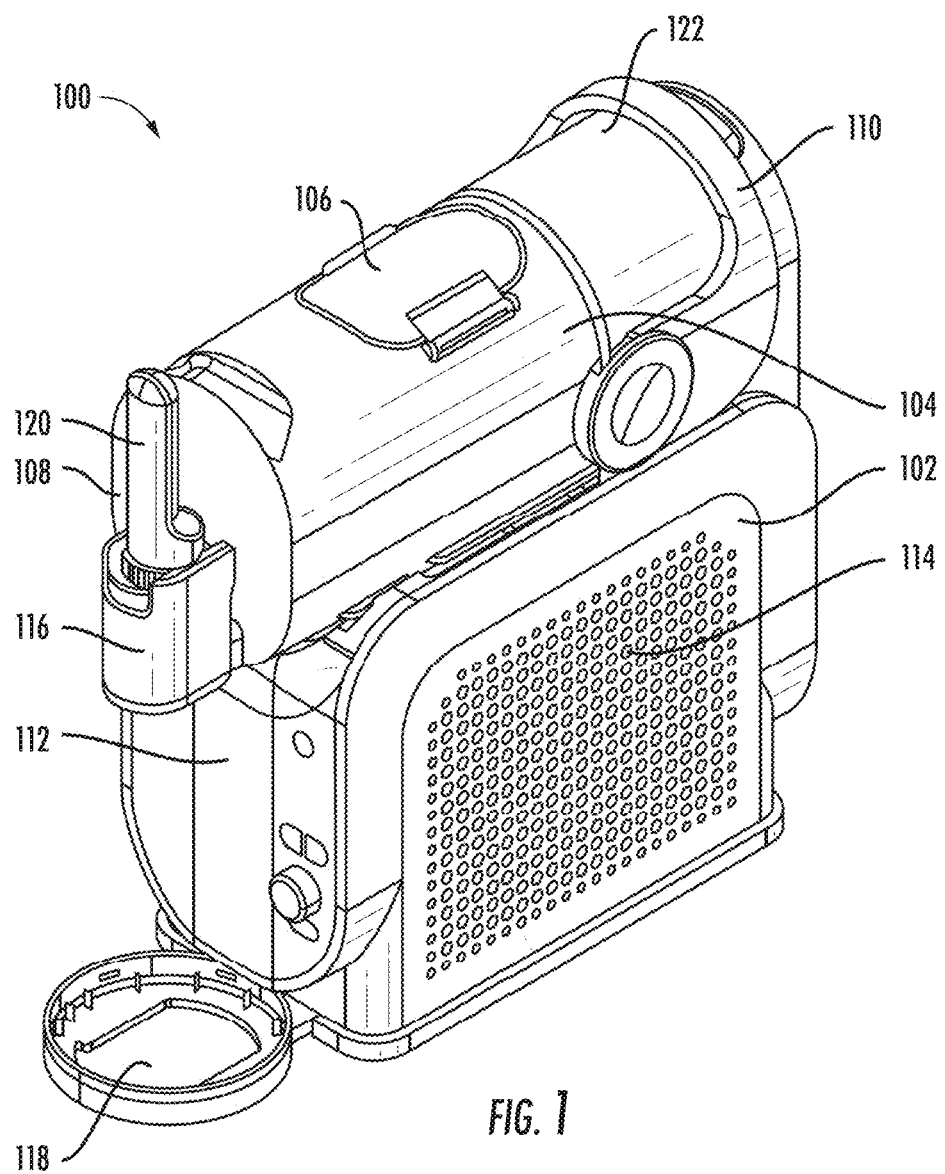
FIG. 1 shows a perspective view of a frozen drink maker, according to non-limiting embodiments or aspects.

In the following description, like components have the same reference numerals, regardless of different illustrated implementations. To illustrate implementations clearly and concisely, the drawings may not necessarily reflect appropriate scale and may have certain structures shown in somewhat schematic form. The disclosure may describe and/or illustrate structures in one implementation, and in the same way or in a similar way in one or more other implementations, and/or combined with or instead of the structures of the other implementations.

For purposes of the description hereinafter, the terms "end," "upper," "lower," "right," "left," "vertical," "horizontal," "top," "bottom," "lateral," "longitudinal," "front," "rear," and derivatives thereof shall relate to the embodiments as they are oriented in the drawing figures. However, it is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects of the disclosed subject matter. Hence, specific dimensions and other physical characteristics related to the embodiments or aspects disclosed herein are not to be considered as limiting.

In the specification and claims, for the purposes of describing and defining the disclosure, the terms "about" and "substantially" represent the inherent degree of uncertainty attributed to any quantitative comparison, value, measurement, or other representation. The terms "about" and "substantially" moreover represent the degree by which a quantitative representation may vary from a stated reference without resulting in a change in the basic function of the subject matter at issue. Open-ended terms, such as "comprise," "include," and/or plural forms of each, include the listed parts and can include additional parts not listed, while terms such as "and/or" include one or more of the listed parts and combinations of the listed parts. Use of the terms "top," "bottom," "above," "below" and the like helps only in the clear description of the disclosure and does not limit the structure, positioning and/or operation of the disclosure in any manner.

The application, in various implementations, addresses deficiencies associated with prior commercial slush machines. Unfortunately, the architecture of prior commercial slush machines usually requires a significant amount of force to seat the vessel over a large radial seal, making it challenging for a user to install and uninstall the vessel from the device. In many prior commercial slush machines, the vessel is installed by engaging a catch to retain the vessel, which strains the plastic to properly position the vessel and requires significant user effort. Accordingly, there is a need for a more user-friendly architecture to install and uninstall the vessel of a frozen drink maker, such as, for example, a lever that can be used to couple and decouple the vessel to a housing of the frozen drink maker with minimal force and/or that only requires one hand to use.

FIG. 1 shows a perspective view of a frozen drink maker 100, according to an illustrative implementation of the disclosure. Frozen drink maker 100 includes a housing 102 and mixing vessel 104. Housing 102 may include user interface 112 for receiving user inputs to control frozen drink maker 100 and/or to output or display information. User interface 112 may include one or more buttons, dials, switches, touchscreens, indicators, LEDs, and the like. User interface 112 may display status information including, for example, a temperature of a drink product within mixing vessel 104, an indicator of a recipe and/or program currently being implemented, and a timer associated with the progress of a recipe and/or program in progress and/or currently being implemented. User interface 112 may provide indicators and/or warnings to users regarding, for example, when a recipe is complete or when a user is expected to perform an action associated with processing a drink product. User interface 112 may include a selectable menu of drink types (e.g., recipes) and/or programs for different types of drink products such as, without limitation, granita, smoothie, margarita, daiquiri, pina colada, slush, cocktail, frappe, juice, diary, milk shake, cool drink, semi-frozen drink, frozen drink, and the like.

Housing 102 may include a panel (e.g., a removable panel) 114 along a side of housing 102. Panel 114 may include a plurality of openings that facilitate air flow to aid in cooling components within housing 102. Housing 102 may include upper housing section 122 that is arranged to couple with a rear end of mixing vessel 104 when mixing vessel 104 is attached to housing 102. Mixing vessel 104 may include walls, or a portion thereof, that are transparent to enable a viewer to see a drink product within mixing vessel 104 during processing. Mixing vessel 104 may include pour-in opening 106 whereby mixing vessel 104 can receive ingredients for processing a drink product within mixing vessel 104. FIG. 1 shows pour-in opening 106 in a closed configuration with a cover sealing pour-in opening 106. The cover may be detachably removable or moveable to open or close pour-in opening 106. Pour-in opening 106 may include a grate to inhibit a user from reaching into mixing vessel 104 when pour-in opening 106 is open, e.g., the cover is not installed. Mixing vessel 104 may include a dispenser assembly 108 having a user handle 120, a spout (not shown), and a spout shroud and/or cover 116. Dispenser assembly 108 enables a user, by pulling down on handle 120, to open a spout, connected to a wall of mixing vessel 104, to dispense a processed (e.g., cooled) drink product from mixing vessel 104. The user can close the spout by pushing handle 120 back to its upright position (shown in FIG. 1) and, thereby, stop the dispensing of the processed drink product.

Frozen drink maker 100 may include a coupling mechanism that enables a secure coupling of mixing vessel 104 to housing 102, including upper housing section 122. In some non-limiting embodiments or aspects, the coupling mechanism is a lever 110 rotatably coupled to upper housing section 122. FIG. 1 shows lever 110 in the coupled, locked, and/or closed position whereby mixing vessel 104 is coupled to (e.g., attached to, latched to, and/or locked to) housing 102 and upper housing section 122. In the coupled position, lever 110 ensures that there is a water-tight seal to prevent leakage of drink product from mixing vessel 104. Lever 110 may be placed in the coupled position by sliding mixing vessel 104 against upper housing section 122 and then rotating lever 110 in a clockwise direction until its handle rests on or about the top surface of upper housing section 122. Mixing vessel 104 can be disengaged and/or decoupled from housing 102 and upper housing section 122 by pulling and/or rotating lever 110 in a counter-clockwise direction (from the perspective of FIG. 1) toward the front of mixing vessel 104, which causes lever 110 to release mixing vessel 104. Once released and/or decoupled, mixing vessel 104 may slide in a forward direction (away from upper housing section 122) to be fully detached and/or removed from housing 102.

A flexible seal (illustrated in FIG. 8) may be positioned between mixing vessel 104 and upper housing section 122. The flexible seal may include a face seal portion and/or a radial seal portion. If present, the face seal portion may provide an improved seal based on compression provided by lever 110 pushing mixing vessel 104 laterally against a wall of upper housing section 122. Mixing vessel 104 may have a substantially cylindrical shape with a base having an opening formed therein, and the opening is sealed by the flexible seal when lever 110 is in the coupled position. An interlock switch may be implemented at upper housing section 122 that is activated when mixing vessel 104 is coupled to upper housing section 122 that prevents activation of drive motor 208 unless mixing vessel 104 is coupled to upper housing section 122. This ensures that a user is not exposed to a moving dasher 204. Frozen drink maker 100 may also include drip tray 118 being positioned below dispenser assembly 108 and arranged to collect any drink product that is not properly dispensed from mixing vessel 104 to, for example, a user cup. Drip tray 118 may be attachably removable from its operational position shown in FIG. 1. For example, drip tray 118 may be mounted and/or stored on a side panel of housing 102, as illustrated in FIG. 3 as water tray 304.

Figure 2:
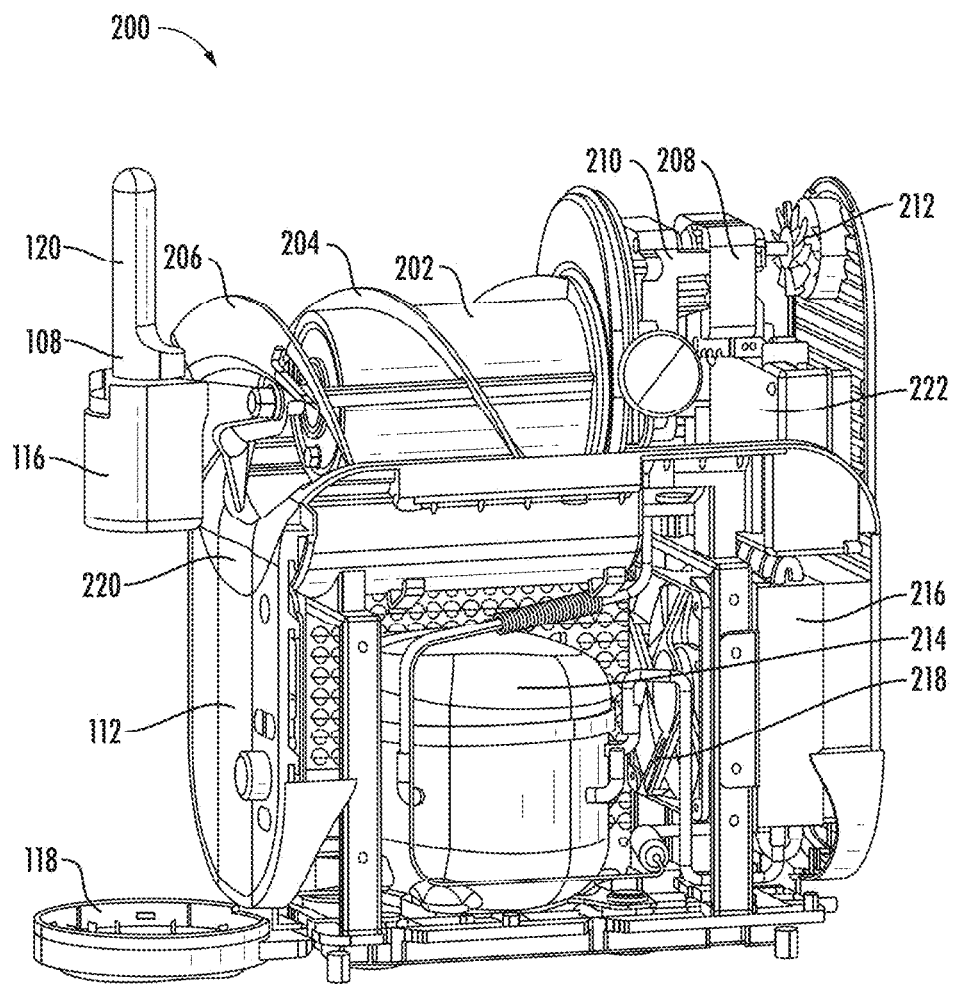
FIG. 2 shows a view of various internal components within the housing and mixing vessel of the frozen drink maker of FIG. 1, according to non-limiting embodiments or aspects.

FIG. 2 shows a view 200 of various internal components within housing 102 and mixing vessel 104 of frozen drink maker 100 of FIG. 1. Frozen drink maker 100 includes a cylindrical evaporator 202 that is surrounded by an auger and/or dasher 204. Dasher 204 may include one or more mixing blades and/or protrusions that extend helically around evaporator and/or chiller 202. Dasher 204 may be driven to rotate by a central drive shaft (not shown) within mixing vessel 104. The drive shaft may be surrounded by evaporator 202. However, in various implementations, evaporator 202 does not rotate. The drive shaft may be coupled via a gear assembly 210 to a drive motor 208. In some non-limiting embodiments or aspects, drive motor 208 is an AC motor, but another type of motor may be used such as, without limitation, a DC motor. Drive motor 208 may include a motor fan 212 arranged to provide air cooling for drive motor 208. While FIG. 2 shows an implementation where drive motor 208 is not coaxially aligned with the drive shaft used to rotate dasher 204, in other implementations, drive motor 208 can be aligned coaxially with the drive shaft. During processing of a drink product, drive motor 208 may be continuously operated at one or more speeds to drive continuous rotation of dasher 204 and, thereby, provide continuous mixing of the drink product within mixing vessel 104. In some non-limiting embodiments or aspects, the rotation of dasher 204 causes the helically arranged blades to push the cooling drink product to the front of mixing vessel 104. During the processing, portions of the drink product may freeze against the surface of evaporator 202 as a result of being cooled by evaporator 202. In some non-limiting embodiments or aspects, the blades of the rotating dasher 204 scrape frozen portions of the drink product from the surface evaporator 202 while concurrently mixing and pushing the cooling drink product towards the front of mixing vessel 104.

Frozen drink maker 100 may include a refrigeration circuit and/or system to provide cooling of a drink product and/or to control the temperature of a drink product within mixing vessel 104. The refrigeration circuit may include a compressor 214, an evaporator 202, a condenser 216, a condenser fan 218, a bypass valve, and conduit that carries refrigerant in a closed loop among the refrigeration circuit components to facilitate cooling and/or temperature control of a drink product in mixing vessel 104. Operations of the refrigeration circuit may be controlled by a controller, such as controller 402, as described further with respect to FIG. 4 later herein. Frozen drink maker 100 may also include a condensation collection tray 220 arranged to collect any liquid condensation caused by cooling from evaporator 202. FIG. 2 shows condensation collection tray 220 in the inserted position. Condensation collection tray 220 may be insertably removable from a slot within housing 102 to enable collection of condensed liquid when inserted into the slot and then efficient removal to empty condensation collection tray 220, and then re-insertion into the slot for subsequent liquid collection.

Figure 3:
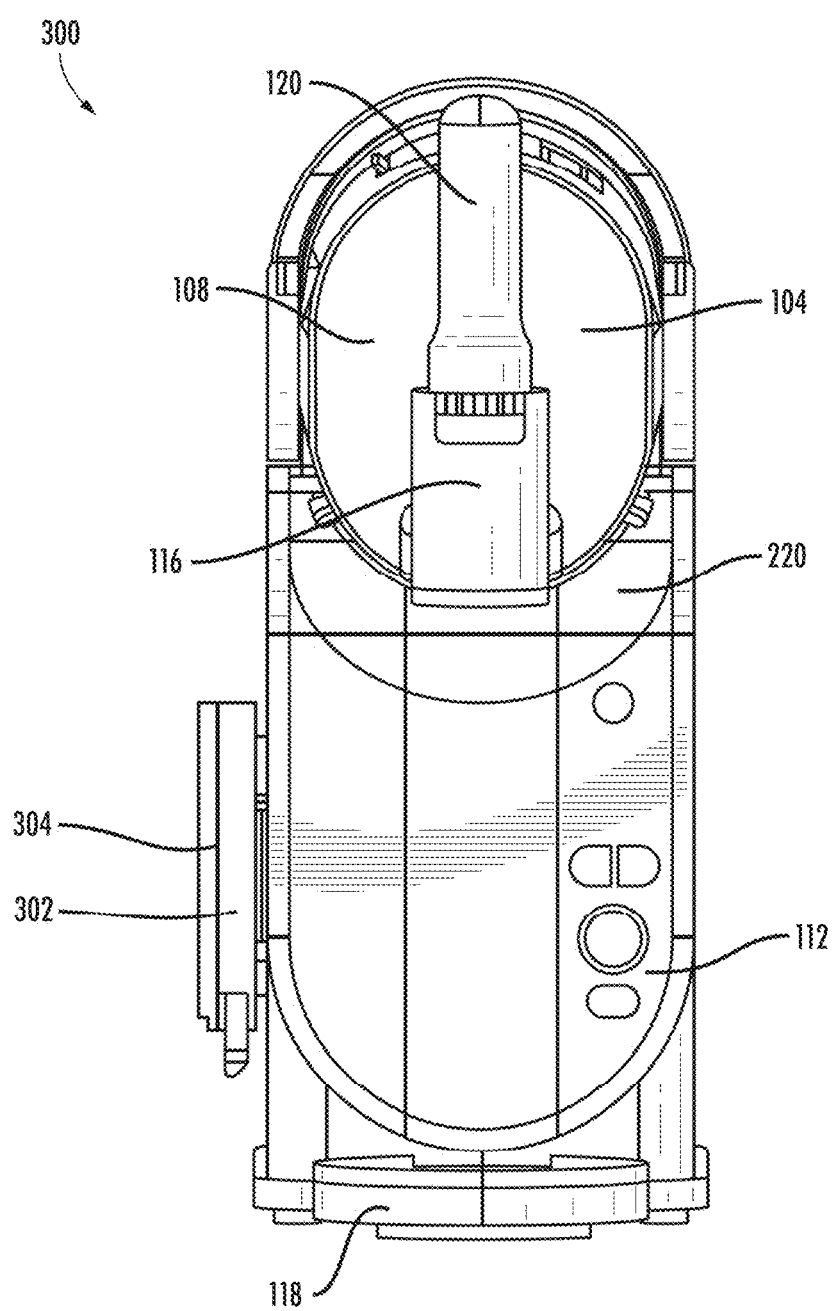
FIG. 3 shows a front view of the frozen drink maker of FIG. 1, according to non-limiting embodiments or aspects.

FIG. 3 shows a front view 300 of frozen drink maker 100 of FIG. 1. Frozen drink maker 100 may include user interface 112 on a front surface of housing 102. In other implementations, user interface 112 may be located on a side, top, or back of housing 102. Frozen drink maker 100 may include a mount 302 on a side of housing 102 where drip tray 118 can be mounted when not in use (shown as drip tray 304 in FIG. 3), such as during transport of frozen drink maker 100. Frozen drink maker 100 may include a power interface arranged to receive AC power from a power outlet (not shown). In some non-limiting embodiments or aspects, frozen drink maker 100 may include one or more batteries housed within housing 102 and arranged to provide power to various components of frozen drink maker 100. Frozen drink maker 100 may also include a printed circuit board assembly (PCBA) 222 within housing 102. As will be explained with respect to FIG. 4, PCBA 222 may include a control system 400 arranged to automatically control certain operations of frozen drink maker 100.

Figure 4:
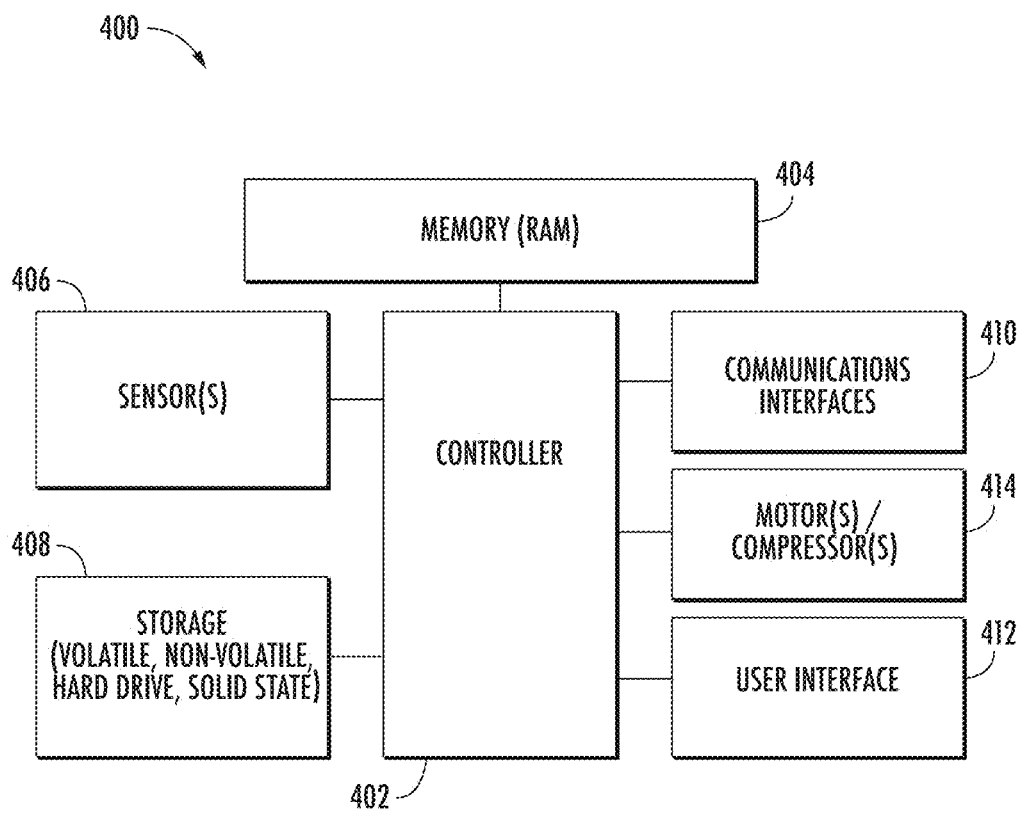
FIG. 4 is a block diagram of an example of a control system of the frozen drink maker of FIG. 1, according to non-limiting embodiments or aspects.

FIG. 4 is a block diagram illustrating an example of a control system 400 of frozen drink maker 100, according to some implementations of the disclosure. Control system 400 may include a microcontroller, a processor, a system-on-a-chip (SoC), a client device, and/or a physical computing device and may include hardware and/or virtual processor(s). In some non-limiting embodiments or aspects, control system 400 and its elements, as shown in FIG. 4, each relate to physical hardware, while in some implementations one, more, or all of the elements could be implemented using emulators or virtual machines. Regardless, electronic control system 400 may be implemented on physical hardware, such as in frozen drink maker 100.

As also shown in FIG. 4, control system 400 may include a user interface 212 and/or 112, having, for example, a keyboard, keypad, one or more buttons, dials, touchpad, or sensor readout (e.g., biometric scanner) and one or more output components, such as displays, speakers for audio, LED indicators, and/or light indicators. Control system 400 may also include communications interfaces 410, such as a network communication unit that could include a wired communication component and/or a wireless communications component, which may be communicatively coupled to controller and/or processor 402. The network communication unit may utilize any of a variety of proprietary or standardized network protocols, such as Ethernet, TCP/IP, to name a few of many protocols, to effect communications between processor 402 and another device, network, or system. Network communication units may also comprise one or more transceivers that utilize the Ethernet, power line communication (PLC), Wi-Fi®, cellular, and/or other communication methods. For example, control system 400 may send one or more communications associated with a status of frozen drink maker 100 to a mobile device of a user, e.g., send an alert to the mobile device when a recipe is complete and/or a drink product is ready for dispensing, or to indicate that the mixing vessel is low or out of a drink product.

Control system 400 may include a processing element, such as controller and/or processor 402, that contains one or more hardware processors, where each hardware processor may have a single or multiple processor cores. In one implementation, processor 402 includes at least one shared cache that stores data (e.g., computing instructions) that are utilized by one or more other components of processor 402. For example, the shared cache may be a locally cached data stored in a memory for faster access by components of the processing elements that make up processor 402. Examples of processors include, but are not limited to, a central processing unit (CPU) and/or microprocessor. Controller and/or processor 402 may utilize a computer architecture base on, without limitation, the Intel® 8051 architecture, Motorola® 68HCX, Intel® 80X86, and the like. The processor 402 may include, without limitation, an 8-bit, 12-bit, 16-bit, 32-bit, or 64-bit architecture. Although not illustrated in FIG. 4, the processing elements that make up processor 402 may also include one or more other types of hardware processing components, such as graphics processing units (GPUs), application specific integrated circuits (ASICs), field-programmable gate arrays (FPGAs), and/or digital signal processors (DSPs).

FIG. 4 also illustrates that memory 404 may be operatively and communicatively coupled to controller 402. Memory 404 may be a non-transitory medium configured to store various types of data. For example, memory 404 may include one or more storage devices 408 that include a non-volatile storage device and/or volatile memory. Volatile memory, such as random-access memory (RAM), can be any suitable non-permanent storage device. The non-volatile storage devices 408 may include one or more disk drives, optical drives, solid-state drives (SSDs), tape drives, flash memory, read-only memory (ROM), and/or any other type of memory designed to maintain data for a duration time after a power loss or shut down operation. In certain configurations, the non-volatile storage devices 408 may be used to store overflow data if allocated RAM is not large enough to hold all working data. The non-volatile storage devices 408 may also be used to store programs that are loaded into the RAM when such programs are selected for execution. Data store and/or storage devices 408 may be arranged to store a plurality of drink product making and/or processing instruction programs associated with a plurality of drink product processing sequences, e.g., recipes. Such drink product making and/or processing instruction programs may include instruction for controller and/or processor 402 to: start or stop one or more motors and/or compressors 414 (e.g., such as motor 208 and/or compressor 214), start or stop compressor 214 to regulate a temperature of a drink product being processed within mixing vessel 104, operate the one or more motors 414 (e.g., motor 208 and/or compressor 214) at certain periods during a particular drink product processing sequence, operate motor 208 at certain speeds during certain periods of time of a recipe, issue one or more cue instructions to user interface 412 and/or 112 that are output to a user to illicit a response, action, and/or input from the user.

Persons of ordinary skill in the art are aware that software programs may be developed, encoded, and compiled in a variety of computing languages for a variety of software platforms and/or operating systems and subsequently loaded and executed by processor 402. In one implementation, the compiling process of the software program may transform program code written in a programming language to another computer language such that the processor 402 is able to execute the programming code. For example, the compiling process of the software program may generate an executable program that provides encoded instructions (e.g., machine code instructions) for processor 402 to accomplish specific, non-generic, particular computing functions.

After the compiling process, the encoded instructions may be loaded as computer executable instructions or process steps to processor 402 from storage device 408, from memory 404, and/or embedded within processor 402 (e.g., via a cache or on-board ROM). Processor 402 may be configured to execute the stored instructions or process steps in order to perform instructions or process steps to transform the electronic control system 400 into a non-generic, particular, specially programmed machine or apparatus. Stored data, e.g., data stored by a data store and/or storage device 408, may be accessed by processor 402 during the execution of computer executable instructions or process steps to instruct one or more components within control system 400 and/or other components or devices external to control system 400. For example, the recipes may be arranged in a lookup table and/or database within storage device 408 and be accessed by processor 402 when executing a particular recipe selected by a user via user interface 412 and/or 112.

User interface 412 and/or 112 can include a display, positional input component (such as a mouse, touchpad, touchscreen, or the like), keyboard, keypad, one or more buttons, one or more dials, a microphone, speaker, or other forms of user input and output components. The user interface components may be communicatively coupled to processor 402. When the user interface output component is or includes a display, the display can be implemented in various ways, including by a liquid crystal display (LCD) or a cathode-ray tube (CRT) or light emitting diode (LED) display, such as an OLED display.

Sensors 406 may include one or more sensors that detect and/or monitor conditions of a drink product within mixing vessel 104, conditions associated with a component of frozen drink maker 100, and/or conditions of a refrigerant within the refrigeration system. Conditions may include, without limitation, rotation, speed of rotation, and/or movement of a device or component (e.g., a motor), rate of such movement, frequency of such movement, direction of such movements, motor current, motor voltage, motor power, motor torque, temperature, pressure, fluid level in mixing vessel 104, position of a device or component (e.g., whether pour-in opening 106 is open or closed), and/or the presence of a device or component (e.g., whether shroud 116 is installed or not). Types of sensors may include, for example, electrical metering chips, Hall sensors, pressure sensors, temperature sensors, optical sensors, current sensors, torque sensors, voltage sensors, cameras, other types of sensors, or any suitable combination of the foregoing. Frozen drink maker 100 may include one or more temperature sensors positioned in various locations within mixing vessel 104 such as, for example, on or about the lower front area within mixing vessel 104, on or about the upper front area within mixing vessel 104, on or about the upper rear area within mixing vessel 104, within one or more coils of evaporator 202, and/or within housing 102.

Sensors 406 may also include one or more safety and/or interlock switches that prevent or enable operation of certain components, e.g., a motor, when certain conditions are met (e.g., enabling activation of motor 208 and/or compressor 414 when a lid or cover for opening 106 is attached or closed and/or when a sufficient level of drink product is in mixing vessel 104). Persons of ordinary skill in the art are aware that electronic control system 400 may include other components well known in the art, such as power sources and/or analog-to-digital converters, not explicitly shown in FIG. 4.

In some non-limiting embodiments or aspects, control system 400 and/or processor 402 includes an SoC having multiple hardware components including, but not limited to: a microcontroller, microprocessor or digital signal processor (DSP) core and/or multiprocessor SoCs (MPSoC) having more than one processor cores; memory blocks including a selection of read-only memory (ROM), random access memory (RAM), electronically erasable programmable read-only memory (EEPROM) and flash memory; timing sources including oscillators and phase-docked loops; peripherals including counter-timers, real-time timers and power-on reset generators; external interfaces, including industry standards such as universal serial bus (USB), Fire-Wire, Ethernet, universal synchronous/asynchronous receiver/transmitter (USART), serial peripheral interface (SPI); analog interfaces including analog-to-digital converters (ADCs) and digital-to-analog converters (DACs); and voltage regulators and power management circuits.

A SoC includes both the hardware, described above, and software controlling the microcontroller, microprocessor and/or DSP cores, peripherals and interfaces. Most SoCs are developed from pre-qualified hardware blocks for the hardware elements (e.g., referred to as modules or components which represent an IP core or IP block), together with software drivers that control their operation. The above listing of hardware elements is not exhaustive. A SoC may include protocol stacks that drive industry-standard interfaces like a universal serial bus (USB).

Once the overall architecture of the SoC has been defined, individual hardware elements may be described in an abstract language called RTL which stands for register-transfer level. RTL is used to define the circuit behavior. Hardware elements are connected together in the same RTL language to create the full SoC design. In digital circuit design, RTL is a design abstraction which models a synchronous digital circuit in terms of the flow of digital signals (data) between hardware registers, and the logical operations performed on those signals. RTL abstraction is used in hardware description languages (HDLs) like Verilog and VHDL to create high-level representations of a circuit, from which lower-level representations and ultimately actual wiring can be derived. Design at the RTL level is typical practice in modern digital design. Verilog is standardized as Institute of Electrical and Electronic Engineers (IEEE) 1364 and is an HDL used to model electronic systems. Verilog is most commonly used in the design and verification of digital circuits at the RTL level of abstraction. Verilog may also be used in the verification of analog circuits and mixed-signal circuits, as well as in the design of genetic circuits. In some non-limiting embodiments or aspects, various components of control system 400 are implemented on a PCBA such as PCBA 222.

In operation in certain implementations, a user fills mixing vessel 104 via pour-in opening 106 with ingredients associated with a drink product. The user selects the type of drink product to be processed via user interface 112, e.g., the user selects the recipe for "margarita." In some non-limiting embodiments or aspects, the user selects the product type and/or recipe before filling mixing vessel 104 and user interface 112 provides one or more indicators or queues (visible and/or audible) that instruct the user to add ingredients to mixing vessel 104. Mixing vessel 104 may include one or more fill sensors that detect when a sufficient amount or level of ingredients and/or fluid is within mixing vessel 104. The one or more fill sensors may provide a signal to processor 402 that indicates when mixing vessel 104 is sufficiently filled or not filled. Processor 402 may prevent operations of frozen drink maker 100 (e.g., prevent activation of motor 208 and/or other components) if the fill sensor(s) 406 indicate(s) that mixing vessel 104 is not sufficiently filled. A lid sensor may be associated with opening 106, whereby the lid sensor sends an open and/or closed signal to processor 402 that indicates whether opening 106 is open or closed. Processor 402 may prevent operations of frozen drink maker 100 if the lid sensor indicates that opening 106 is open and/or not closed. Depending on the sensed condition, user interface 112 may provide an indication regarding the condition, e.g., that mixing vessel 104 is sufficiently filled or not sufficiently filled and/or that opening 106 is not closed, to enable a user to take appropriate action(s).

Once mixing vessel 104 is filled with ingredients, the user may provide an input, e.g., a button press, to start processing of the drink product based on the selected recipe. Processing may include activation of motor 208 to drive rotation of dasher 204 and/or blade 206 to effect mixing of the ingredients of the drink product. Processing may also include activation of the refrigeration system including activation of compressor 214 and condenser fan 218. Compressor 214 facilitates refrigerant flow through one or more coils of evaporator 202 and through condenser 216 to provide cooling and/or temperature control of the drink product within mixing vessel 104. Processor 402 may control operations of various components such as motor 208 and compressor 214. To regulate temperature at a particular setting associated with a recipe, processor 402 may activate/start and/or de-activate/stop compressor 214 to start and/or stop refrigerant flow through the coil(s) of evaporator 202 and, thereby, start or stop cooling of the drink product within mixing vessel 104.

By cooling a drink product to a particular temperature, slush and/or ice particles may be formed within the drink product. Typically, the amount of particles and/or texture of a drink product corresponds to a temperature of the drink product, e.g., the cooler the temperature—the larger the amount of particles (and/or the larger the size of particles) and/or the more slush-like the drink product. User interface 112 may enable a user to fine tune and/or adjust a preset temperature associated with a recipe to enable a user to adjust the temperature and/or texture of a drink product to a more desirable temperature and/or texture.

Processor 402 may perform processing of the drink product for a set period of time in one or more phases and/or until a desired temperature and/or texture is determined. Processor 402 may receive one or more temperature signals from one or more temperature sensors 406 within mixing vessel 104 to determine the temperature of the drink product. Processor 402 may determine the temperature of the drink product by determining an average temperature among temperatures detected by multiple temperature sensors 406. Processor 402 may determine the temperature of the drink product based on the detected temperature from one sensor 406 within mixing vessel 104 and/or based on a temperature of the refrigerant detected by a refrigerant temperature sensor 406. Once a phase and/or sequence of a recipe is determined to be completed by processor 402, processor 402 may, via user interface 112, provide a visual and/or audio indication that the recipe is complete and ready for dispensing. In response, a user may place a cup or container below dispenser assembly 108 and pull handle 120 rotationally downward towards the user to open a spout located at the lower front wall of mixing vessel 104, resulting in dispensing of the drink product into the cup or container. Once filled, the user can close the spout by pushing handle 120 back rotationally upward away from the user to its upright position shown in FIG. 2. In implementations where handle 120 is spring-biased to the closed position, the user can release their hold of handle 120 and, thereby, allow a spring force to move handle 120 back rotational upward away from the user to the upright and closed position.

Figure 5A:
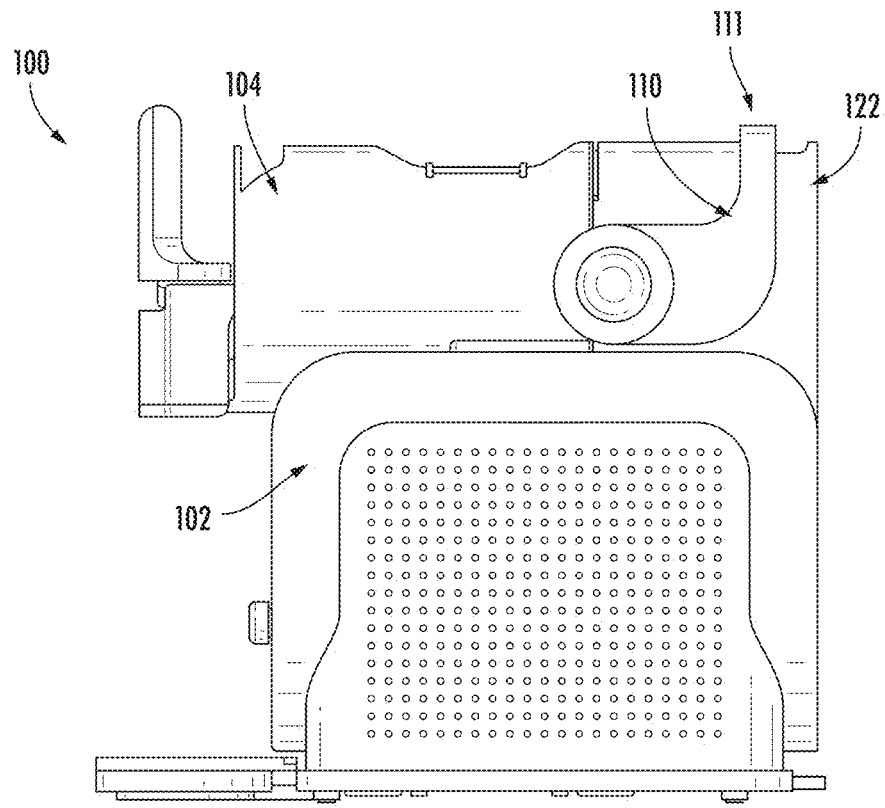
FIG. 5A illustrates a side view of the frozen drink maker of FIG. 1 with the mixing vessel in a coupled position relative to the upper housing section, according to non-limiting embodiments or aspects.
Figure 5B:
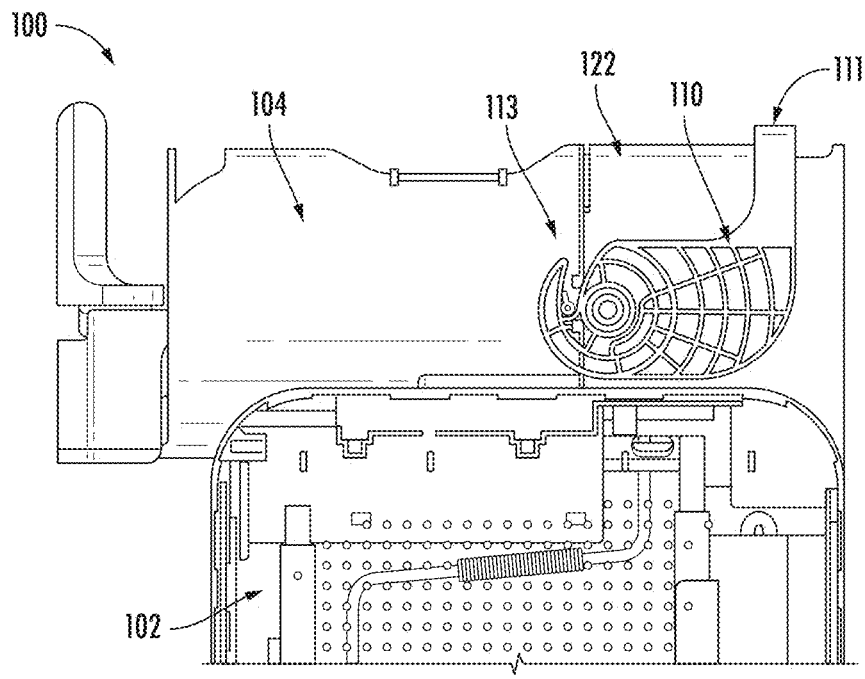
FIG. 5B illustrates a side view of the frozen drink maker illustrated in FIG. 5A with some features of the housing and the lever shown in partial cross-section, according to non-limiting embodiments or aspects.

As previously mentioned, frozen drink maker 100 includes upper housing section 122 arranged to couple with a rear end of mixing vessel 104 when mixing vessel 104 is attached to housing 102. Frozen drink maker 100 also includes lever 110 that enables mixing vessel 104 to be coupled (e.g., locked, attached to, and/or affixed to) to housing 102 (e.g., upper housing section 122). Lever 110 also enables mixing vessel 104 to be unlocked and decoupled from housing 102 (e.g., upper housing section 122). Features of lever 110 are shown in FIGS. 5A and 5B. FIG. 5A illustrates a side view of frozen drink maker 100, with mixing vessel 104 in a coupled position relative to upper housing section 122. FIG. 5B illustrates a side view of frozen drink maker 100 illustrated in FIG. 5A, with some features of housing 102 and lever 110 shown in partial cross-section.

As shown in FIGS. 5A and 5B, lever 110 includes handle 111 that can be gripped by a user and moved relative to upper housing section 122. Handle 111 can be moved into the position shown in FIGS. 5A and 5B to couple mixing vessel 104 into place on frozen drink maker 100 and can be moved away from upper housing section 122 and/or toward a front of housing 102 to decouple mixing vessel 104 from frozen drink maker 100. When handle 111 is moved relative to upper housing section 122, it activates cam 113, which engages mating features on mixing vessel 104 to either couple or uncouple mixing vessel 104 relative to upper housing section 122. In some non-limiting embodiments or aspects, handle 111 moves less than 90° relative to upper housing section 122 when moving between the coupled position and the uncoupled position.

Figure 6:
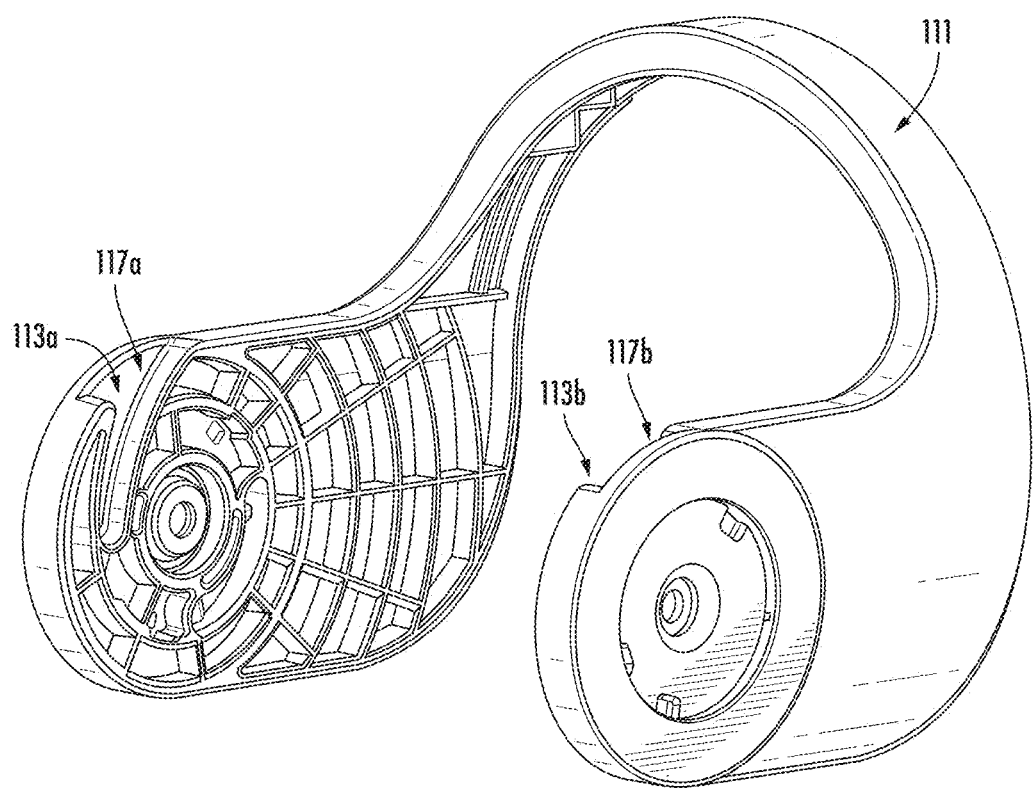
FIG. 6 shows a detailed view of a lever with cams for coupling a mixing vessel to the housing of a frozen drink maker, according to non-limiting embodiments or aspects.
Figure 7A:
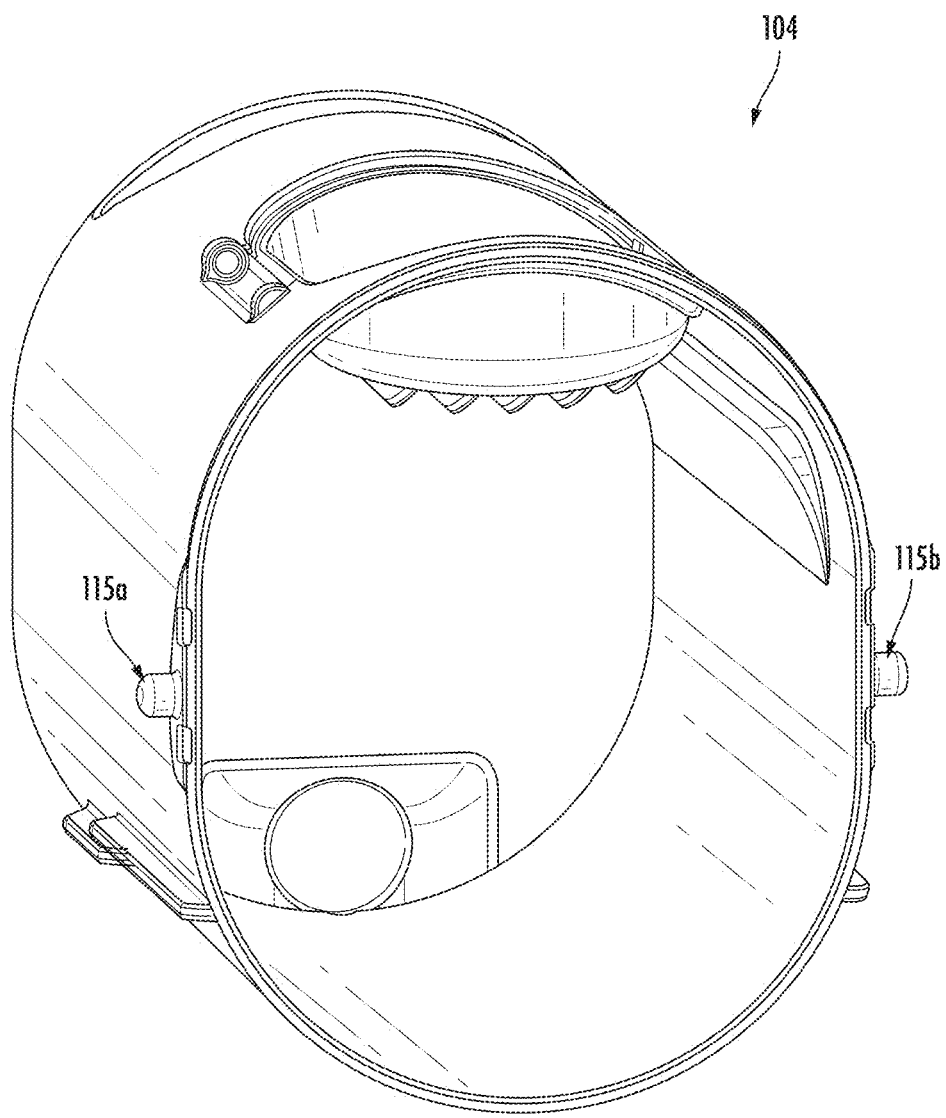
FIG. 7A shows a rear view of a mixing vessel, according to non-limiting embodiments or aspects.

FIG. 6 shows a detailed view of handle 111 with two cams 113a, 113b positioned on opposing sides. Handle 111 may include one, two, three, four, or more cams 113, if desired. As handle 111 is moved, cams 113a, 113b rotate with respect to upper housing section 122. FIG. 7A shows a rear view of mixing vessel 104. Mixing vessel 104 includes protrusions 115a, 115b on opposing outer sides, near the rear bottom of mixing vessel 104. Protrusions 115a, 115b are shaped and positioned to engage with cams 113a, 113b on handle 111. In particular, cams 113a, 113b have channels and/or cam paths 109a, 109b through which protrusions 115a, 115b slide respectively. As cams 113a, 113b rotate toward the back of housing 102, protrusions 115a, 115b slide along cam paths 109a, 109b and are pulled toward upper housing section 122 and the rear of housing 102, causing mixing vessel 104 to press against upper housing section 122 and form a water-tight seal with housing 102. When cams 113a, 113b are rotated toward the front of frozen drink maker 100, protrusions 115a, 115b are pushed away from upper housing section 122, causing mixing vessel 104 to be decoupled from contact with upper housing section 122.

Figure 7B:
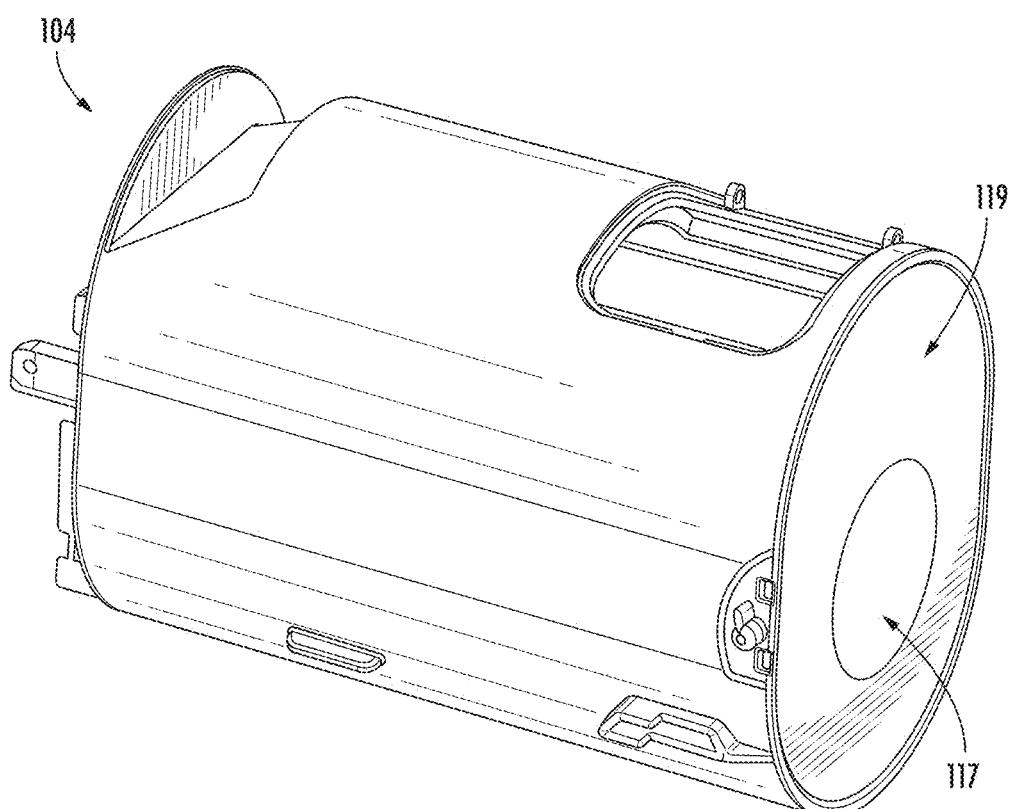
FIG. 7B shows a perspective view of the rear of a mixing vessel, according to non-limiting embodiments or aspects.

Cam 113 may be an over-center cam, as shown in FIG. 5B and FIG. 6, or cam 113 may have alternative geometry. In the disclosed frozen drink maker 100, cam 113 retains mixing vessel 104 on housing 102 when lever 110 is in the coupled position. As previously discussed, mixing vessel 104 may have an overall cylindrical or approximately cylindrical shape and may include opening 117 (shown in FIG. 7B) at its rear end that couples to upper housing section 122. As shown in FIG. 7B, opening 117 may be in a rear panel 119 (e.g., rear vessel cap) of mixing vessel 104. Opening 117 may be positioned to face horizontally when mixing vessel 104 is in the coupled position on upper housing section 122.

Figure 8:
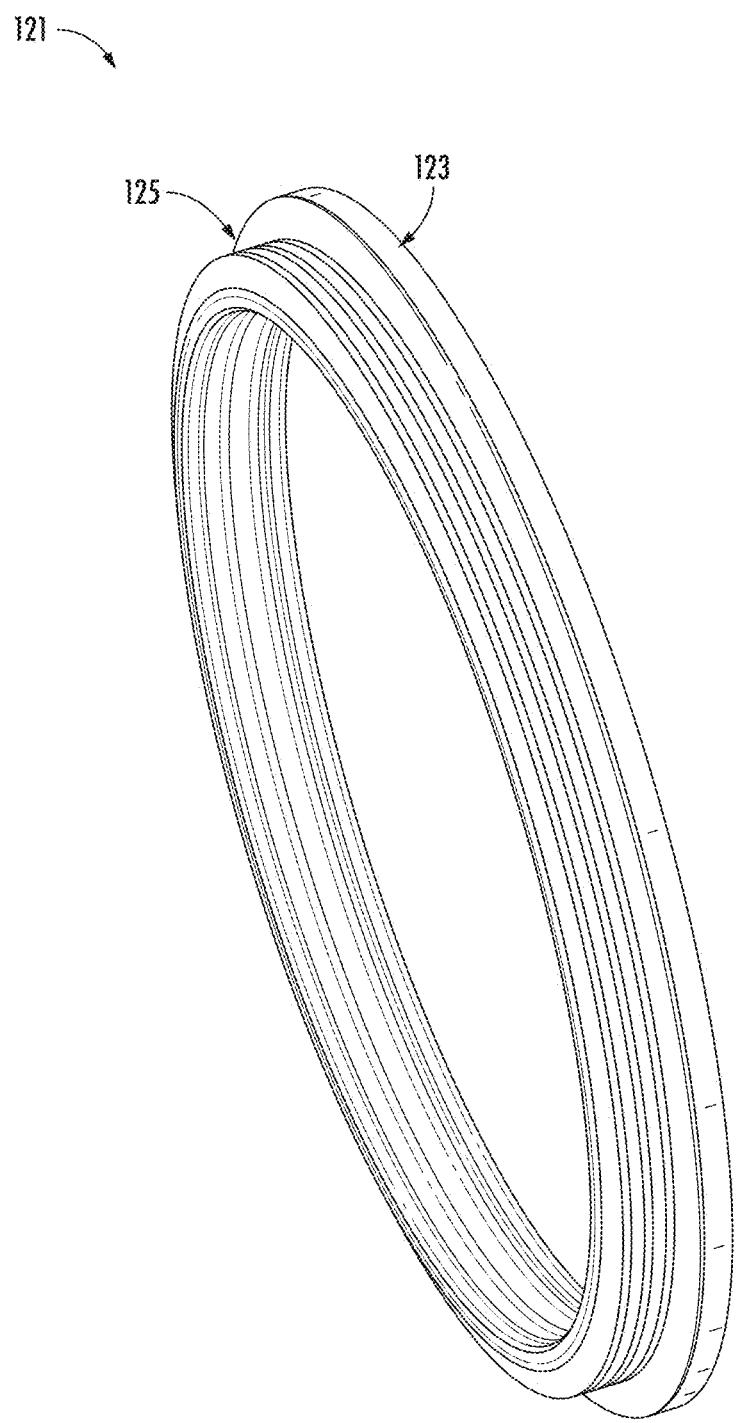
FIG. 8 shows a perspective view of a flexible seal, according to non-limiting embodiments or aspects.

To move lever 110 into a coupled position, handle 111 is moved toward upper housing section 122. When mixing vessel 104 is in a coupled position on upper housing section 122, lever 110, in cooperation with flexible seal 121, seals opening 117. FIG. 8 shows flexible seal 121 configured in accordance with an implementation of the present disclosure. Flexible seal 121 may be formed of any elastomeric material, such as natural or synthetic rubber, silicone, neoprene, chloroprene, polyisoprene, polybutadiene, or combinations thereof. Flexible seal 121 may be independent of housing 102. If desired, flexible seal 121 may be affixed to upper housing section 122. Flexible seal 121 may be a single member including face seal portion 123 and/or radial seal portion 125, as shown in FIG. 8. However, in other embodiments, face seal portion 123 and radial seal portion 125 may be implemented with distinct flexible seals 121.

Face seal portion 123 has an annular shape with a primary dimension that is vertically aligned to form a vertically aligned seal between a horizontal face of upper housing section 122 and a horizontal edge of mixing vessel 104. When in the coupled position, face seal portion 125 interfaces a vertically aligned surface of upper housing section 122 to a vertically aligned side of mixing vessel 104. Radial seal portion 125 includes multiple flexible annular ribs, as shown in FIG. 8. Radial seal portion 125 forms a radial seal relative to the horizontal axis of mixing vessel 104, sealing against an inside (e.g., cylindrical) surface of mixing vessel 104. Flexible seal 121 may include at least one of radial seal portion 125 and face seal portion 123.

Previously known frozen drink makers do not include both a face seal and a radial seal for a mixing vessel. If present, face seal portion 123 of flexible seal 121 may provide an improved seal based on compression provided by handle 111 pushing mixing vessel 104 laterally against a wall of upper housing section 122. Cam 113 also allows high force on face seal portion 123 to be easily achieved and maintained. Since face seal portion 123 serves as the primary seal, in some non-limiting embodiments or aspects, radial seal portion 125 size can be reduced, thereby lowering mixing vessel's 104 resistance to seating and improving ease of use.

Figure 9:
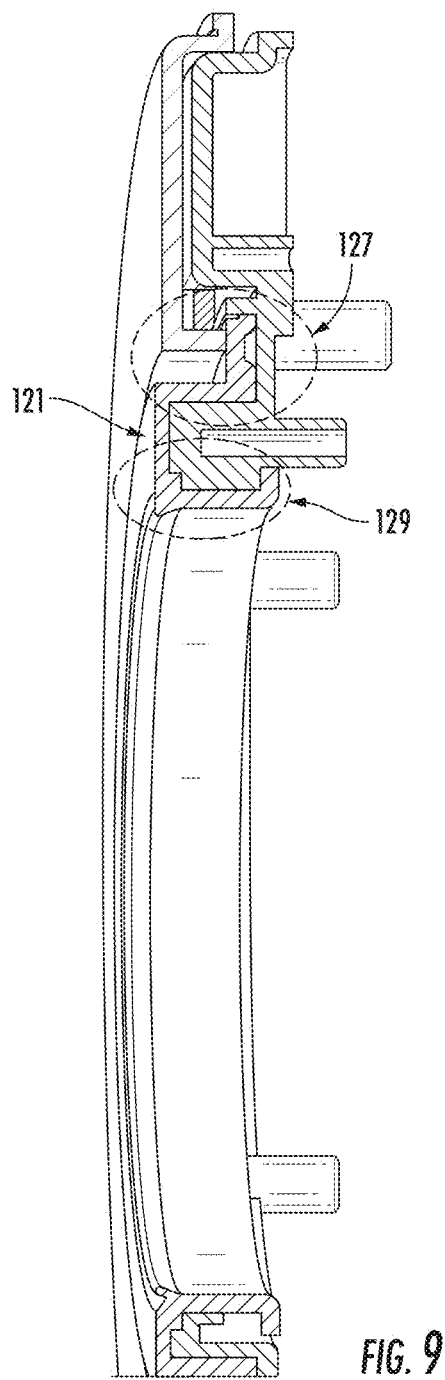
FIG. 9 shows a cross-sectional view of a flexible seal, according to non-limiting embodiments or aspects.

In some non-limiting embodiments or aspects, flexible seal 121 may serve as the seal for mixing vessel 104 and/or evaporator 202. For example, FIG. 9 shows a cross-sectional view of a sample flexible seal 121 having vessel seal portion 127 and evaporator seal portion 129. Vessel seal portion 127 of flexible seal 121 creates a watertight seal between mixing vessel 104 and upper housing section 122. Evaporator seal portion 129 of flexible seal 121 seals evaporator 202 within mixing vessel 104.

To move lever 110 from a coupled position to an uncoupled position, handle 111 is moved away from upper housing section 122 and/or toward a front of housing 102, which causes mixing vessel 104 to slide in a forward direction (away from upper housing section 122) to be fully detached and/or removed from housing 102. If desired, cam 113 may include an ejection feature to apply an ejection force to mixing vessel 104 to eject past radial seal portion 125.

Figure 10:
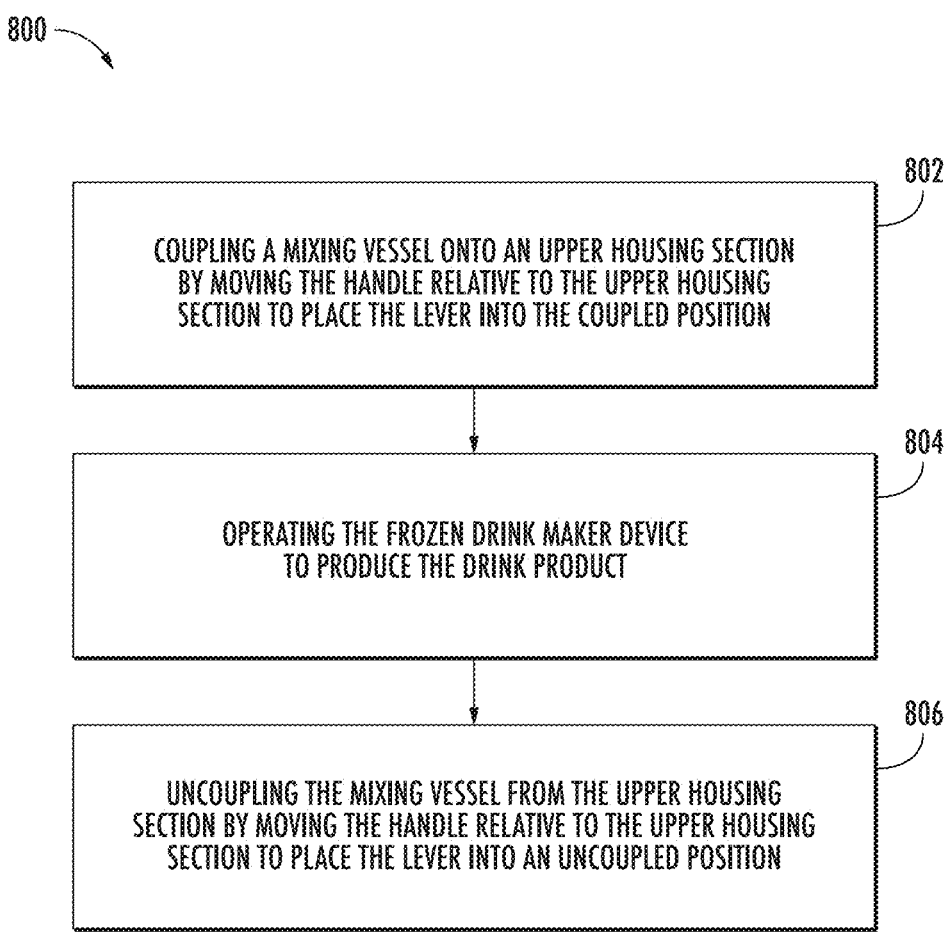
FIG. 10 illustrates a flow diagram for a method of using the disclosed frozen drink maker, according to non-limiting embodiments or aspects.

In other aspects, methods of using frozen drink maker 100 as disclosed here are described. FIG. 10 illustrates method 800 of producing a frozen drink using a frozen drink maker device. The frozen drink maker device includes a housing having an upper housing section and a lever configured to move relative to the upper housing section between a coupled position and an uncoupled position, and a mixing vessel arranged to couple to the upper housing section. The lever includes a handle that is moveable to place the lever into the coupled position and/or the uncoupled position. As shown in FIG. 10, method 800 includes coupling the mixing vessel onto the upper housing section by moving the handle relative to the upper housing section to place the lever into the coupled position (block 802). When in the coupled position, at least one of a face seal and a radial seal are formed between the mixing vessel and the upper housing section. Method 800 also includes operating the frozen drink maker device to produce the frozen drink (block 804). Method 800 further includes uncoupling the mixing vessel from the upper housing section by moving the handle relative to the upper housing section to place the lever into an uncoupled position (block 806).

In some non-limiting embodiments or aspects, coupling the mixing vessel onto the upper housing section involves moving the handle toward the upper housing section. In these and other implementations, uncoupling the mixing vessel from the upper housing section involves moving the handle away from the upper housing section and/or toward a front of the housing. Moving the handle relative to the upper housing section to place the lever into the coupled position may be accomplished by a user with only one hand. In these and other implementations, moving the handle relative to the upper housing section to place the lever into the uncoupled position may be accomplished by a user with only one hand. In select implementations, moving the handle relative to the upper housing section to position the lever from the coupled position to the uncoupled position requires moving the handle less than 900 relative to the upper housing section.

Figure 11A:
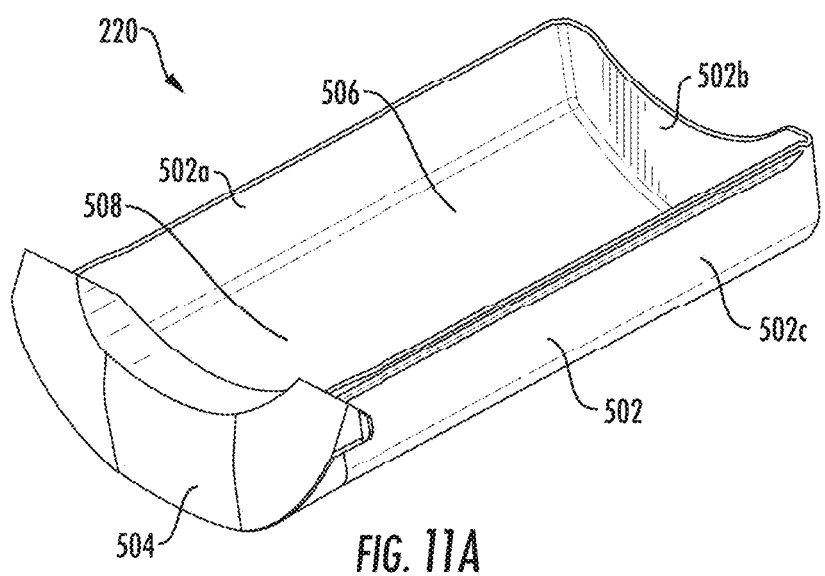
FIGS. 11A and 11B show perspective views of a condensation collection tray of the frozen drink maker of FIG. 1, according to non-limiting embodiments or aspects.
Figure 11B:
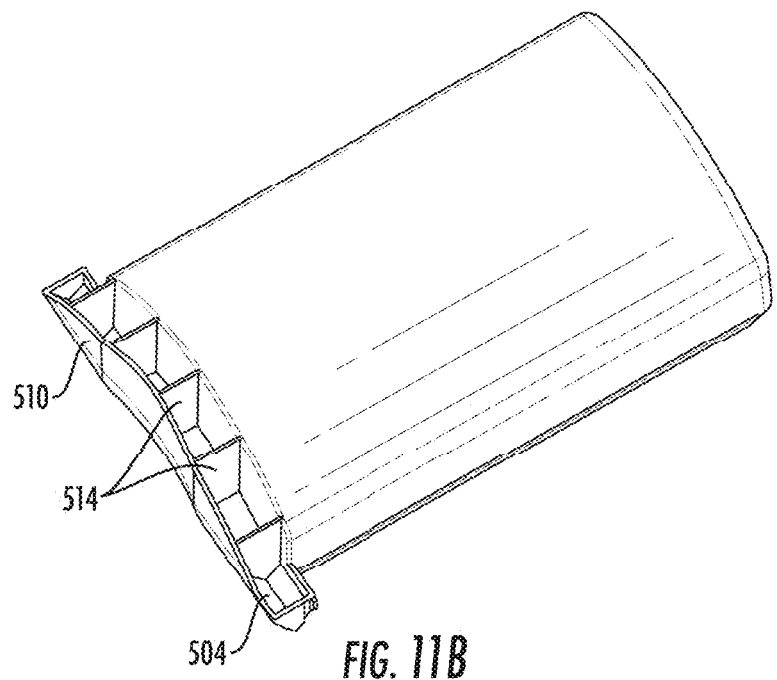

FIGS. 11A and 11B show perspective views of collection tray 220, according to an illustrative implementation of the disclosure. Collection tray 220 may generally comprise collection portion 502 and handle 504 that may be used to insert collection tray 220 into and remove collection tray 220 from housing 102. Collection portion 502 may comprise three walls 502a, 502b, 502c extending generally upwards from evaporator-facing surface 506. Together with handle 504, walls 502a, 502b, 502c and surface 506 may define chamber 508 for collecting liquid, including condensation falling from evaporator 202, spills, and water poured into housing 102 to clean the inside of housing 102. A shape of collection portion 502, including evaporator-facing surface 506, may correspond to an outer shape of evaporator 202. For example, the shape of evaporator-facing surface 506 may be semi-cylindrical to correspond to the cylindrical shape of evaporator 202, as shown in FIG. 11A. However, the disclosure contemplates other suitable shapes, such as rectangular, of collection portion 502. Chamber 508 may have a liquid volume capacity of about 16 ounces. However, the disclosure contemplates a liquid volume capacity of more or fewer than 16 ounces. As shown in FIG. 11B, an underside of handle 504 may define one or more ribs 514 for adding structural integrity between a user-facing surface 510 of handle 504 and the main body of collection tray 220. Collection tray 220 may be made from dishwasher-safe materials for easy cleaning.

Figure 11C:
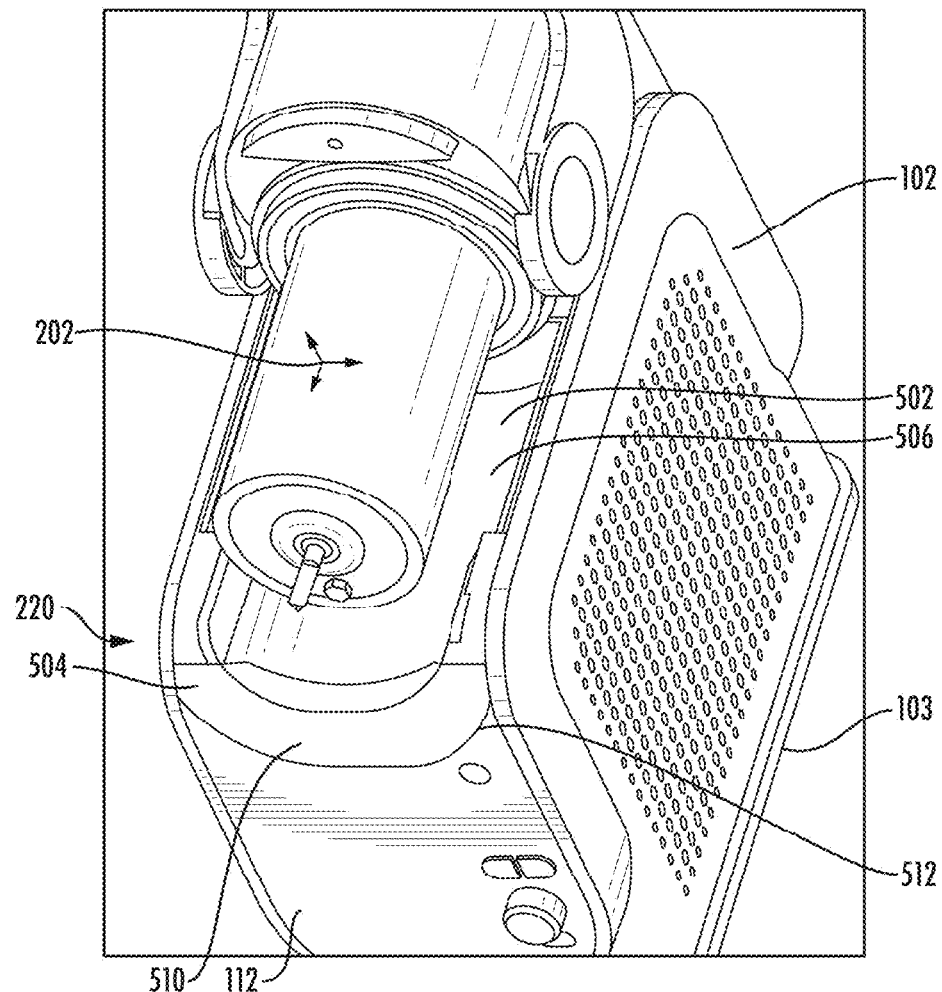
FIG. 11C shows the collection tray of FIGS. 11A and 11B inserted into the frozen drink maker of FIG. 1, according to non-limiting embodiments or aspects.

FIG. 11C shows collection tray 220 inserted into housing 102 of frozen drink maker 100, according to an illustrative implementation of the disclosure. For ease of illustration, housing 102 is shown with mixing vessel 104 and attached dispenser assembly 108 removed. When fully inserted, user-facing surface 510 of handle 504 may sit flush with user interface 112 of housing 102. In the inserted position, collection tray 220 may be spaced vertically above bottom side 103 of housing 102. Once liquid is collected in chamber 508, the user may remove collection tray 220 for disposal of the collected liquid and cleaning of collection tray 220.

Figure 11D:
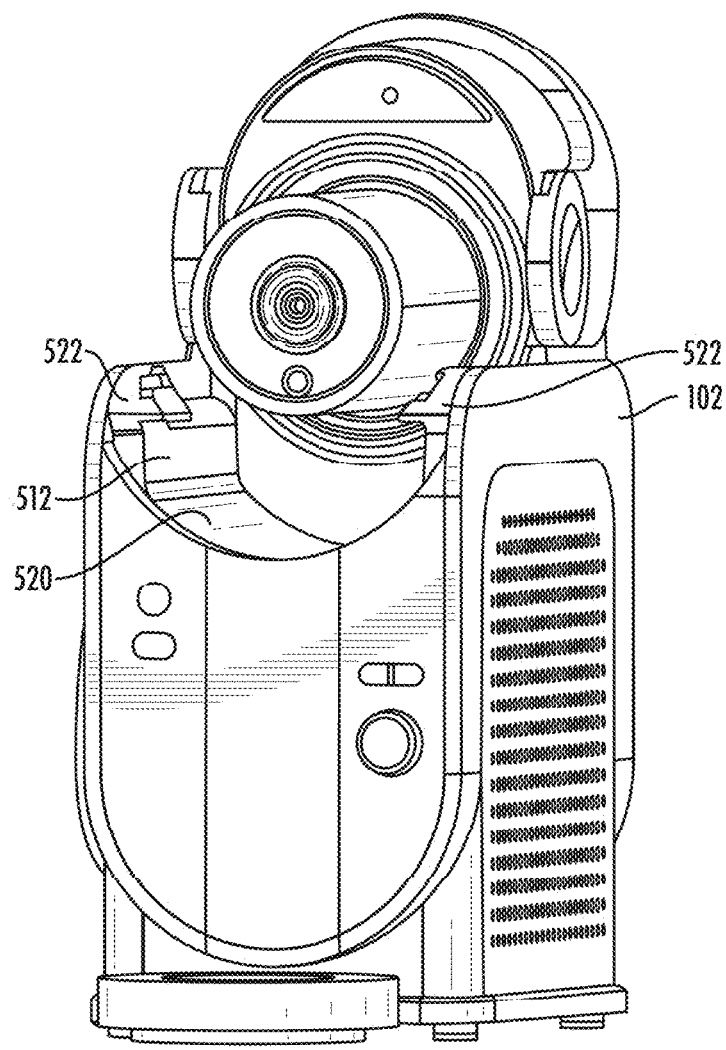
FIG. 11D shows the frozen drink maker of FIG. 1 with the collection tray removed, according to non-limiting embodiments or aspects.

FIG. 11D shows housing 102 with collection tray 220 removed, according to an implementation of the disclosure. As shown in FIG. 11D, housing 102 may include top surface 520 for supporting collection tray 220 when collection tray 220 is inserted into housing 102. A shape of top surface 520 may be semi-cylindrical to correspond to the semi-cylindrical shape of evaporator-facing surface 506. Housing 102 may also include one or more rails 522 defining one or more slots 512 between rails 522 and top surface 520. Rails 522 may help guide the user in inserting collection tray 220 into slots 512 when installing collection tray 220 to housing 102.

Figure 12:
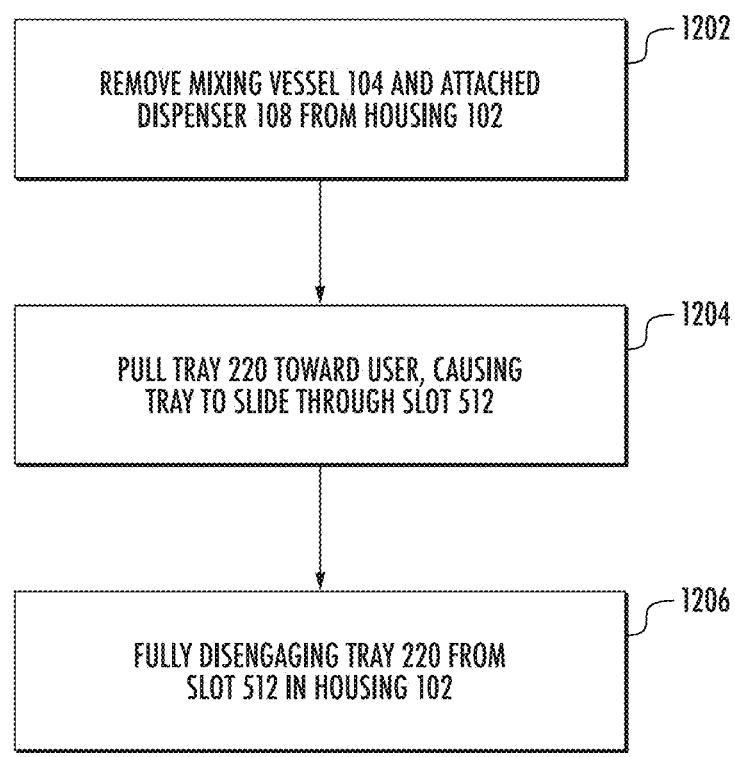
FIG. 12 is a flow chart illustrating a method of removing the collection tray of FIGS. 11A and 11B from the frozen drink maker of FIG. 1, according to non-limiting embodiments or aspects.

In some non-limiting embodiments or aspects, to remove collection tray 220 (e.g., for emptying and/or cleaning collection tray 220), the user must first remove mixing vessel 104 and attached dispenser 108 (FIG. 1). The user may then remove collection tray 220 by pulling collection tray 220 toward the user. This movement may cause collection tray 220 to slide along slots 512 until it is completely disengaged from housing 102. Conversely, to insert collection tray 220 into housing 102, the user may insert collection tray 220 into housing 102 by inserting collection portion 502 into slots 512 underneath evaporator 202 (FIG. 2) such that evaporator-facing surface 506 faces evaporator 202. In some non-limiting embodiments or aspects, after collection tray 220 has been inserted into housing 102, mixing vessel 104 with attached dispenser 108 may be inserted onto housing 102 and fastened and sealed against housing 102. FIG. 12 is a flow chart illustrating a method of removing collection tray 220 from housing 102, as described above. FIG. 12 includes removing mixing vessel 104 and attached dispenser 108 from housing 102 (block 1202), pulling collection tray 220 toward the user, causing collection tray 220 to slide through slot 512 (block 1204), and fully disengaging collection tray 220 from slot 512 in housing 102 (block 1206).

Figure 13A:
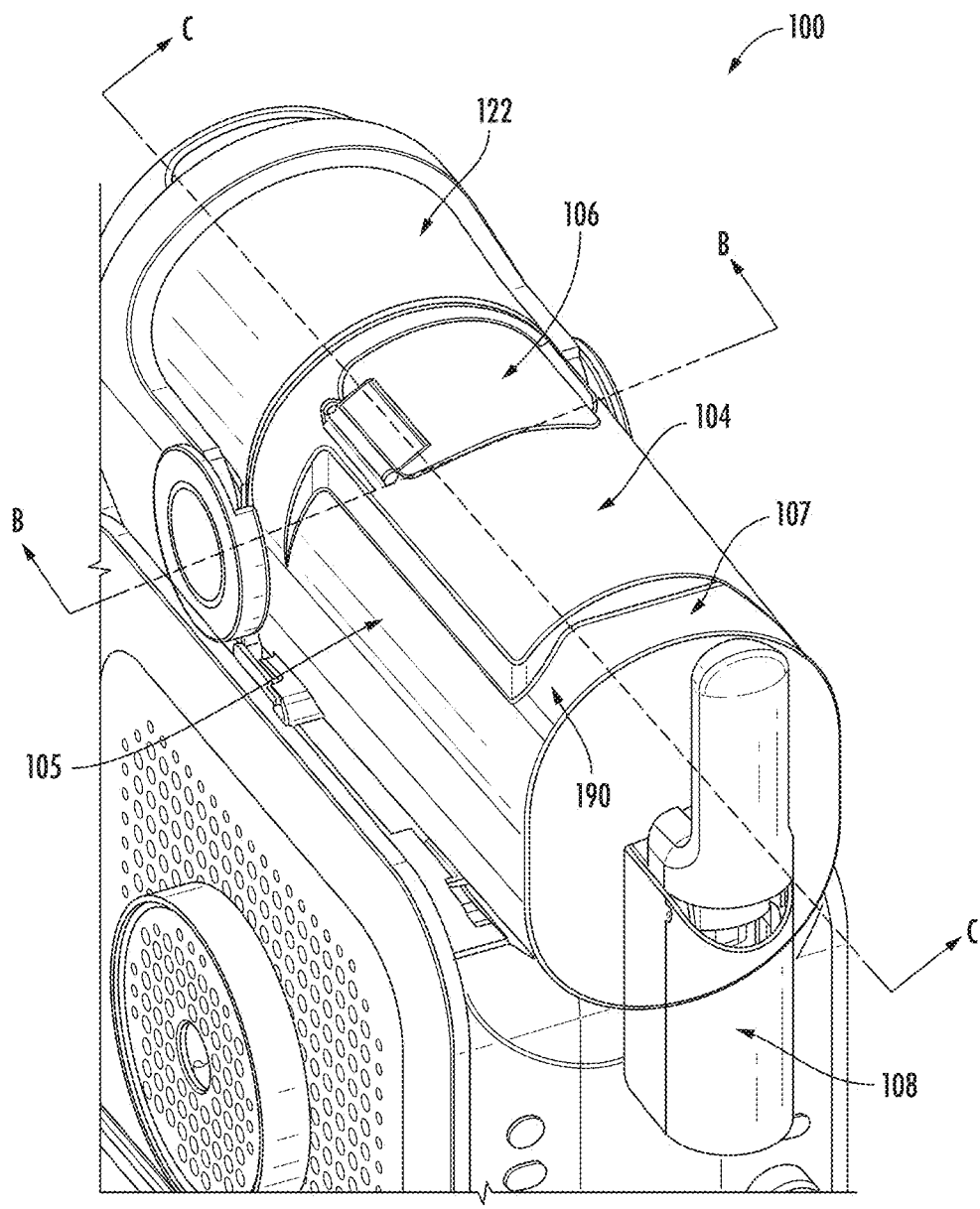
FIG. 13A shows an isometric view of the frozen drink maker with a mixing vessel having at least one internal baffle, according to non-limiting embodiments or aspects.
Figure 13B:
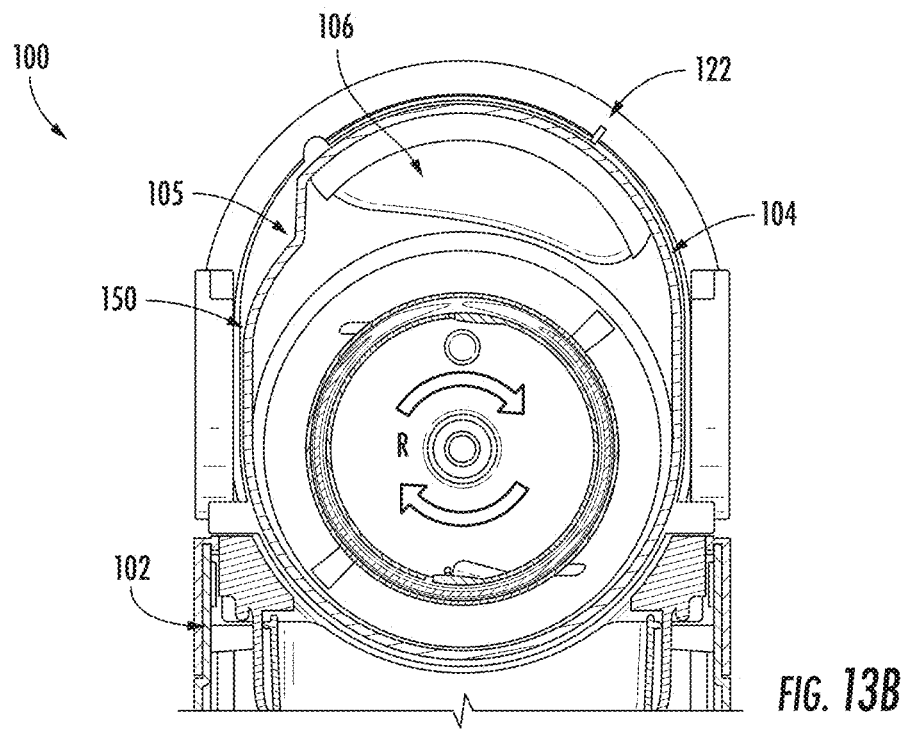
FIG. 13B shows a cross-sectional view of the frozen drink maker shown in FIG. 13A, taken along line B-B, according to non-limiting embodiments or aspects.
Figure 13C:
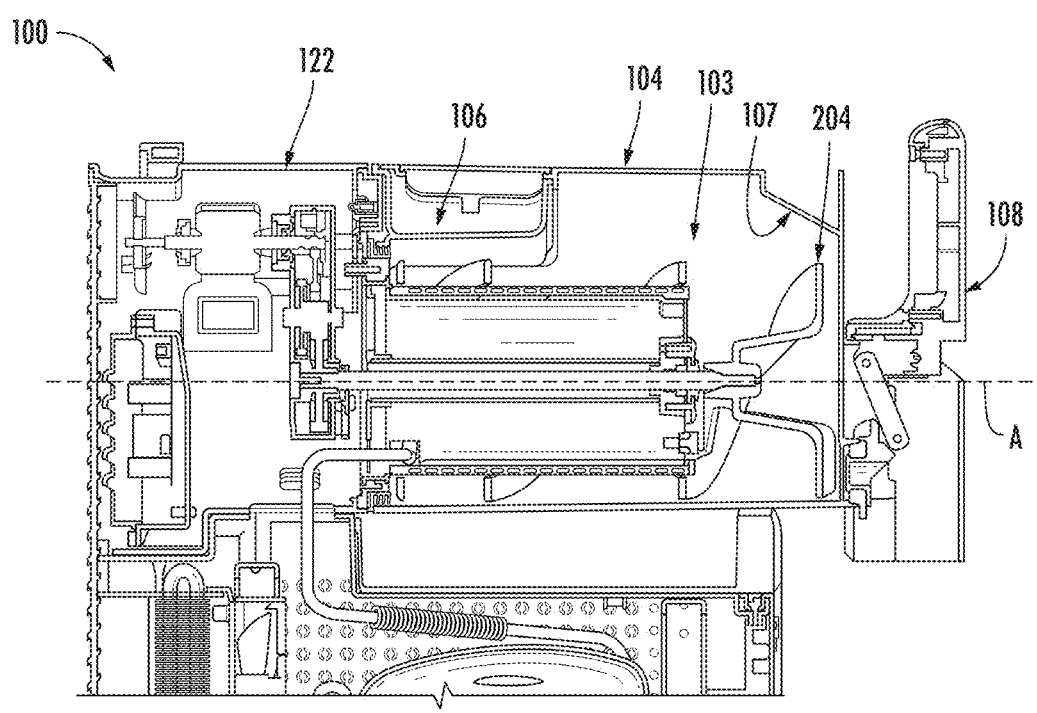
FIG. 13C shows a cross-sectional view of the frozen drink maker shown in FIG. 13A, taken along line C-C, according to non-limiting embodiments or aspects.

FIGS. 13A-13C show a sample frozen drink maker 100 with mixing vessel 104 coupled to housing 102 (specifically, upper housing section 122) and dispenser assembly 108, according to some implementations. Mixing vessel 104 has a curved sidewall defining a substantially cylindrical chamber within. In select implementations, mixing vessel 104 is shaped as an ovoid or approximately as an ovoid (e.g., a cylinder with an ovular cross-section), or as an elliptic cylinder (e.g., a cylinder with an elliptic cross-section), or an approximate elliptic cylinder. When coupled to housing 102, the front of mixing vessel 104 contacts dispenser assembly 108 and the rear of mixing vessel 104 abuts upper housing section 122. Within mixing vessel 104, the front face of chamber 508 may have a substantially ovular shape or a substantially circular shape. The rear of mixing vessel 104 chamber 508 may include an opening configured to form a seal with upper housing section 122. The opening at the rear of mixing vessel 104 may have a substantially circular shape or a substantially ovular shape. Mixing vessel 104 is sized to accommodate dasher 204 that rotates about a center axis (shown as center axis "A" in FIG. 13C). FIG. 13B shows a possible direction of dasher 204 rotation ("R"). Mixing vessel 104 may be shaped such that a distance from the center axis (A) of dasher 204 to the top of the vessel chamber is less than 6 inches, less than 8 inches, less than 10 inches, less than 12 inches, less than 14 inches, or less than 16 inches.

Figure 14A:
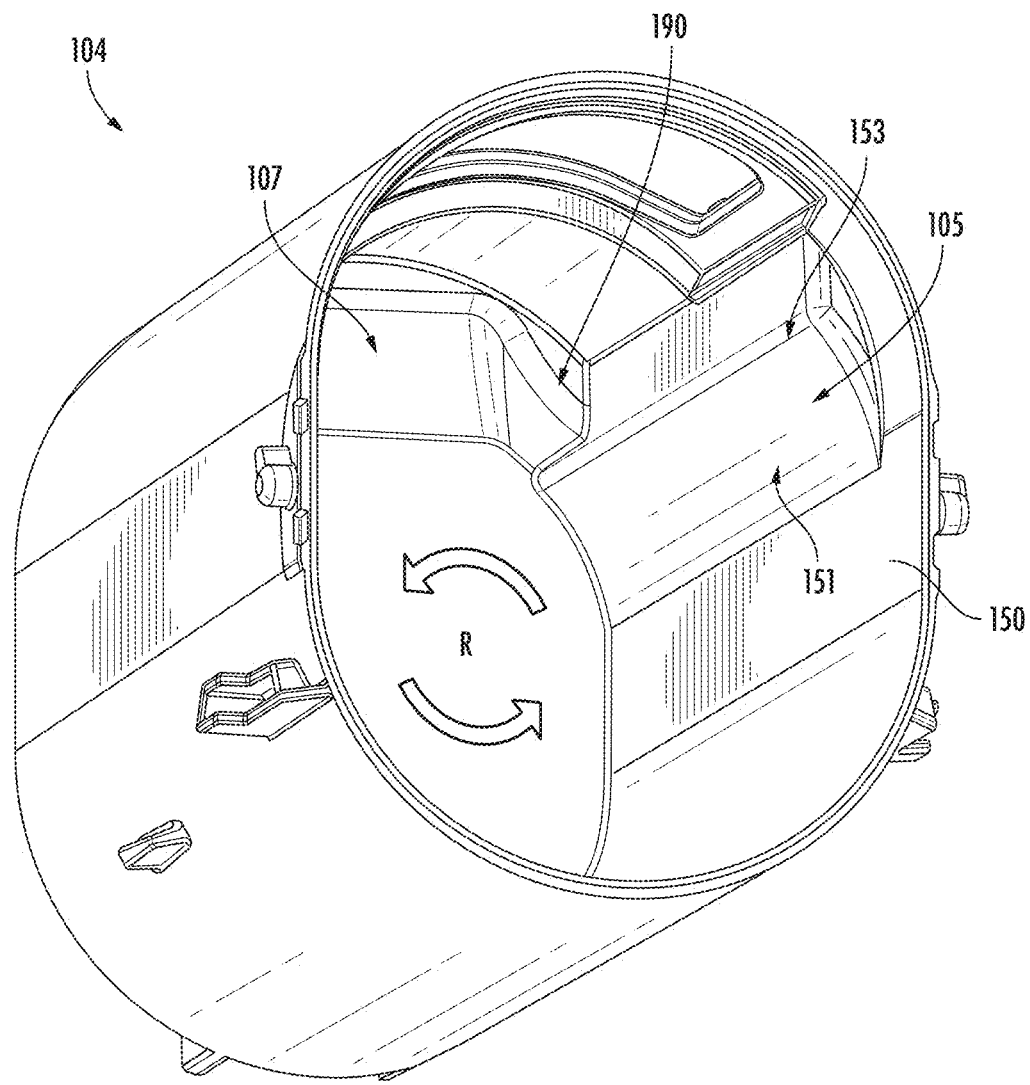
FIG. 14A shows a rear isometric view of a mixing vessel for a frozen drink maker with three internal baffles, according to non-limiting embodiments or aspects.
Figure 14B:
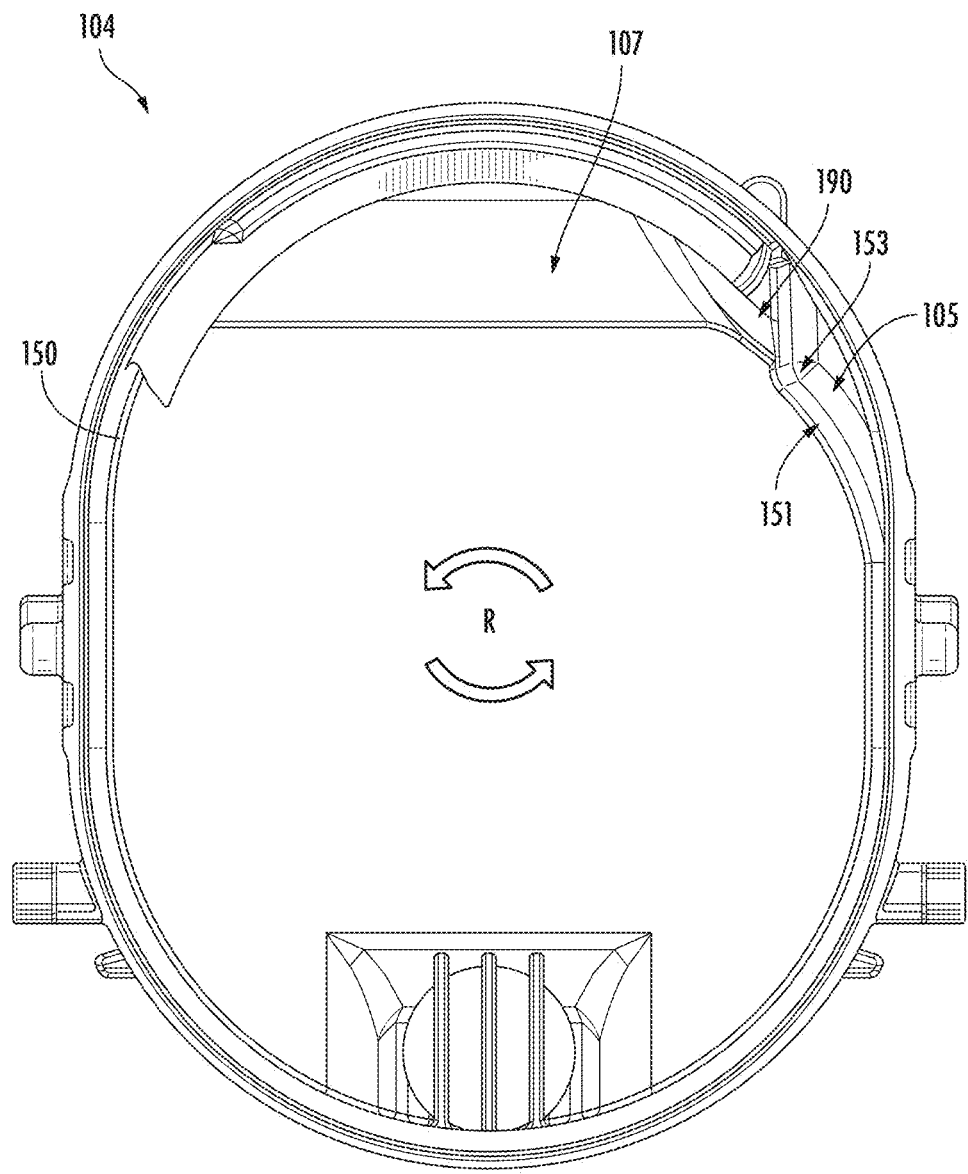
FIG. 14B shows a rear view of the mixing vessel shown in FIG. 14A, according to non-limiting embodiments or aspects.
Figure 14C:
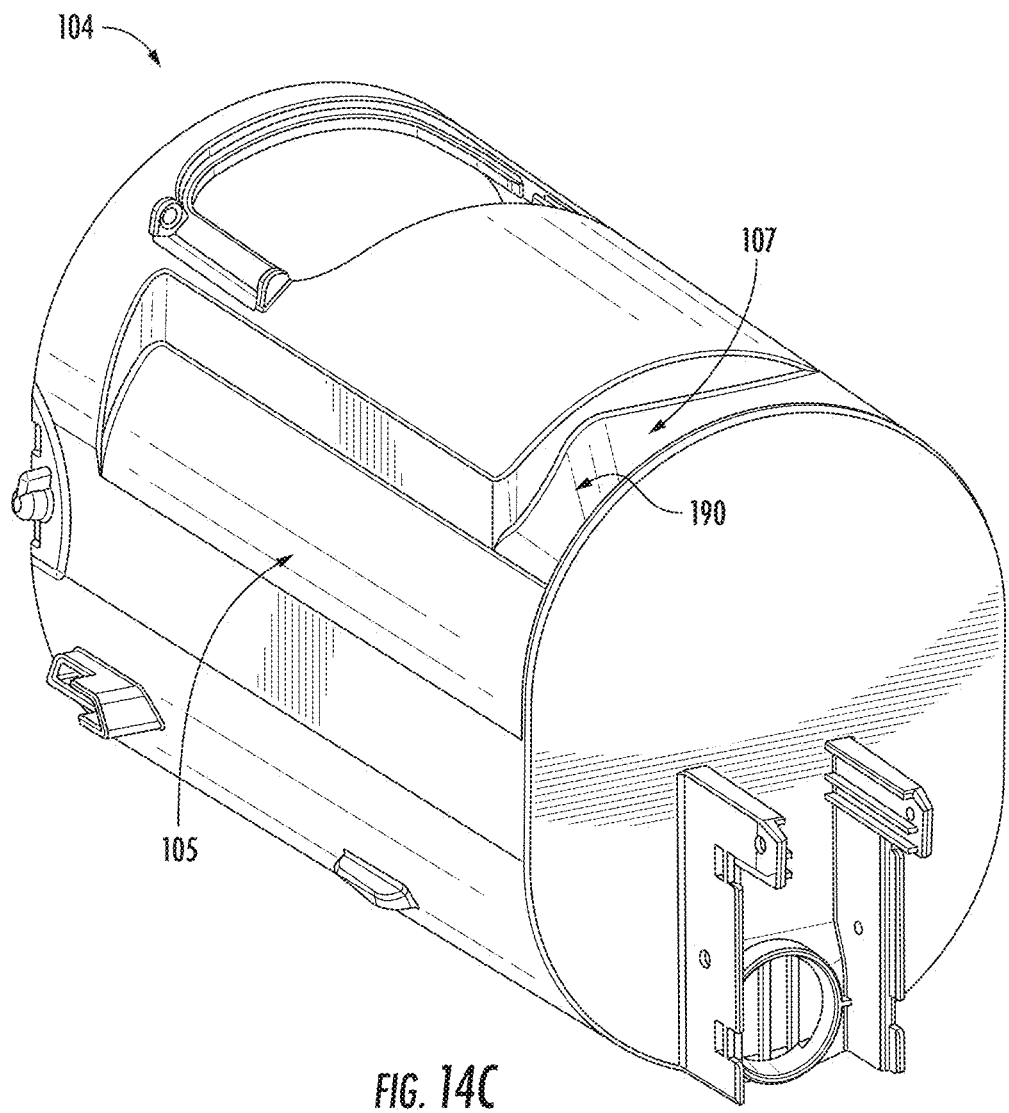
FIG. 14C shows a front isometric view of the mixing vessel shown in FIG. 14A, according to non-limiting embodiments or aspects.

FIGS. 14A-14C show an example of mixing vessel 104 with at least one internal baffle configured to control slush flow within mixing vessel 104. As shown in FIGS. 13A, 13B, and 14A-14B, mixing vessel 104 includes side baffle 105 extending laterally along sidewall 150 of mixing vessel 104 chamber 508. In some non-limiting embodiments or aspects, side baffle 105 extends from the front of mixing vessel 104 chamber 508 (or approximate thereto) to the rear of mixing vessel 104 chamber 508 (or approximate thereto). In some non-limiting embodiments or aspects, side baffle 105 extends along chamber sidewall 150 in a direction parallel to the center axis (A) of dasher 204. In some non-limiting embodiments or aspects, side baffle 105 is positioned on a left side (when viewed from the front) of chamber sidewall 150 (e.g., in embodiments in which dasher 204 rotates in a clockwise direction). FIGS. 14A and 14C illustrate a clockwise direction of dasher rotation (R) when viewed from the front. Side baffle 105 may be positioned slightly above the center axis (A) of dasher 204, in some implementations.

Side baffle 105 may include curved surface 151 that conforms to the pathway of dasher 204, as shown in FIGS. 14A and 14B. For example, when viewed along the center axis (A) of dasher 204, side baffle 105 may protrude inwardly relative the ovular (e.g., elliptical) cross-section of chamber sidewall 150, where, starting from a bottom end of side baffle 105 at which curved surface 151 of side baffle 105 is vertical or substantially vertical, curved surface 151 may slope gradually inward until reaching inflection point 153. After reaching inflection point 153, curved surface 151 may slope more sharply vertically until the top end of side baffle 105 is reached and, thereafter, curved surface 151 of side baffle 105 returns to a curvature in conformance with the ovular cross-section of chamber sidewall 150. The radial direction of curved surface 151 of side baffle 105 from its bottom to inflection point 153 is generally aligned with the radial movement of dasher 204 and thus the contents of mixing vessel 104 chamber 508. The cross-sectional geometry of side baffle 105 described above directs the contents of mixing vessel 104 away from a top of mixing vessel 104 chamber 508 (e.g., at a lower radial trajectory than if side baffle 105 was not present, such as the right side of mixing vessel 104 chamber 508 as shown in FIG. 13B). If side baffle 105 was not present, contents of mixing vessel 104 chamber 508 could flow unimpeded up sidewall 150 to a top interior surface of mixing vessel 104 chamber 508, which would leave these contents excluded from mixing and/or allow them to escape from mixing vessel 104. Side baffle 105 thus reduces the amount of frozen material that could otherwise form on the top interior surface of mixing vessel 104 as a result of its contents being rotated upwards.

As shown in FIGS. 13B, 13C, and 14A-14C, mixing vessel 104 may include front baffle 107. If present, front baffle 107 may be positioned at a front top portion of vessel chamber 103 (illustrated in FIG. 13B). In some non-limiting embodiments or aspects, front baffle 107 extends along the front face of vessel chamber 103 between the right sidewall and the left sidewall of vessel chamber 103. The rotation of dasher 204 pushes vessel contents towards the front of vessel chamber 103, where, if left unchecked, contents could build up near the top front, perhaps even creating a frozen mass detrimental to the mixing process. Viewing from the cross-section of FIG. 13C, front baffle 107 may form an angle relative the front face of vessel chamber 103 (e.g., 1000-150°, 1000-125°, or 105°-120°), which redirects vessel contents that have been forced into the top front of mixing vessel 104 towards the rear of vessel chamber 103. In some non-limiting embodiments or aspects, front baffle 107 may include a curved surface extending upwardly from the front face of vessel chamber 103 toward a top of vessel chamber 103. In some such implementations, the angle front baffle 107 forms relative to the front face of vessel chamber 103 varies from a lower angle (e.g., 5°-20°) at a section of front baffle 107 proximate to the front face of vessel chamber 103 to a higher angle (e.g., 75°-90°) at a section of front baffle proximate to the top of vessel chamber 103.

Front baffle 107 is configured to urge contents away from the top surface of vessel chamber 103 to avoid buildup and overflow on the top of mixing vessel 104. Front baffle 107 thus reduces the amount of frozen material that could otherwise form on the top front interior surface of mixing vessel 104 as a result of the action of dasher 204.

As shown in FIGS. 13C and 14A-14C, mixing vessel 104 may include corner baffle 190. Corner baffle 190 may be positioned at a front top side of vessel chamber 103. Corner baffle 190 joins or connects side baffle 105 and front baffle 107. Thus, if side baffle 105, front baffle 107, and corner baffle 190 are each present, corner baffle 190 physically joins side baffle 105 to front baffle 107. As shown in FIGS. 14A-14B, side baffle 105 and front baffle 107 are orthogonal to each other and if these baffles terminated in a hard corner without corner baffle 190, slush may not be properly directed. Connecting side baffle 105 and front baffle 107 with corner baffle 190 allows slush to easily flow out of the corner between side baffle 105 and front baffle 107.

Corner baffle 190 has curved surface 155 that extends from side baffle 105 to front baffle 107. Curved surface 155 may be convex, as shown in FIG. 14A. Along its length, corner baffle 190 extends into vessel chamber 103 at a relatively constant distance. In other words, the depth of corner baffle 190 may be relatively constant along the length of corner baffle 190. The side of vessel chamber 103 in which corner baffle 190 is positioned (e.g., the left side or the right side) can be selected based on the direction in which dasher 204 rotates within mixing vessel 104. In particular, corner baffle 190 may be positioned such that dasher 204 is directed toward corner baffle 190 while moving upwardly within vessel chamber 103. For example, in select implementations, corner baffle 190 is positioned at the left top front of vessel chamber 103 when dasher 204 is arranged to rotate in a clockwise direction. This positioning may advantageously force slush downward toward dasher 204 when it contacts corner baffle 190 as the slush moves upwardly with dasher 204, thereby reducing slush buildup on sidewall 150 and the top of mixing vessel 104.

It should be understood that, in some non-limiting embodiments or aspects, the disclosed mixing vessel 104 includes one, two, three, or more internal baffles positioned within vessel chamber 103. In other words, mixing vessel 104 may include side baffle 105, front baffle 107, and/or corner baffle 190. Side baffle 105, front baffle 107, and/or corner baffle 190 can reduce slush buildup on the sidewalls and top of vessel chamber 150, which is important for commercial frozen drink makers as well as household frozen drink makers with significantly less headspace than commercial units.

Figure 15:
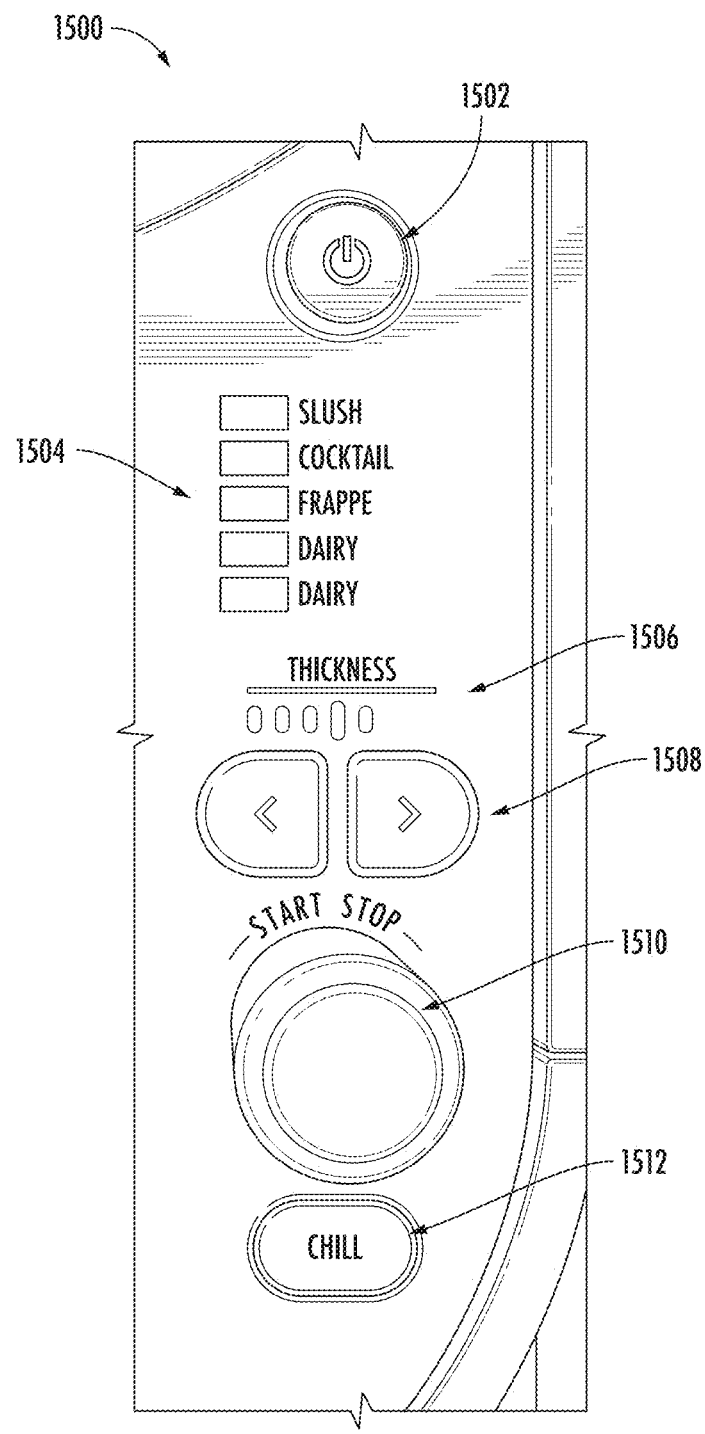
FIG. 15 is a close-up view of a user interface, according to non-limiting embodiments or aspects.

FIG. 15 is a close-up view 1500 of a user interface such as user interface 112. According to view 1500, user interface 112 may include power button 1502, drink type indicator panel 1504, manual temperature adjustment and/or temperature offset indicator 1506, manual temperature adjustment interface 1508, drink type control dial 1510, and chill button 1512. A user may turn frozen drink maker 100 on or off using power button 1502. A user may select a drink type to process a type of drink product by turning dial 1510 until a selected drink type is indicated via panel 1504. The user may select, for example, a slush, cocktail, a frappe, a juice, or a dairy/milkshake drink type. Dial 1510 may also include a push button feature that enables a user to start or stop processing of a drink type by pressing dial 1510. Manual temperature adjustment interface 1508 may include left and right buttons that enable a user to adjust a temperature within a temperature offset band. such as temperature offset band 1602 of FIG. 16 for a milkshake recipe. A user may select chill button 1512 to initiate a chill program and/or recipe whereby frozen drink maker 100 and/or controller 402 maintains the drink product within mixing vessel 104 at a cool temperature without forming a frozen or semi-frozen drink product. In some non-limiting embodiments or aspects, the same cool temperature is maintained for any drink type. For example, controller 402 may receive a signal indicative of the selection of chill button 1512, and reduce the temperature to, and maintain the temperature at or near, a predefined temperature (e.g., in a range) that should not result in any drink type freezing. In another embodiment, controller 402 may receive a signal indicative of the selection of chill button 1512 and a selection of a drink type from drink type control dial 1510, and reduce the temperature to, and maintain the temperature at or near, a predefined temperature (e.g., in a range) defined for that particular drink type (e.g., as specified by a drink type object in memory) that should not result in that drink type freezing.

Figure 16:
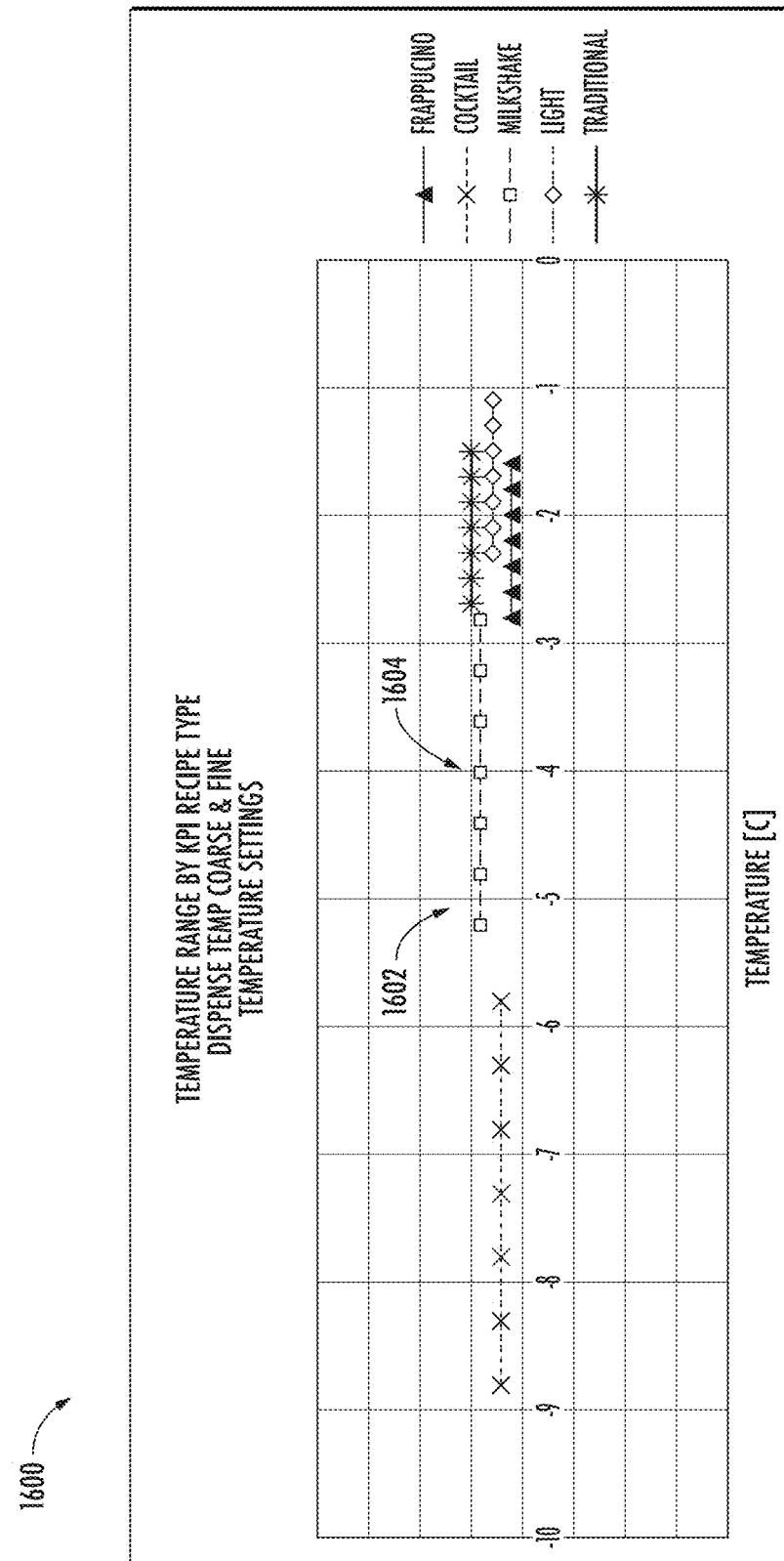
FIG. 16 is a graph of coarse and fine temperature settings, according to non-limiting embodiments or aspects.

FIG. 16 is a graph 1600 of coarse and fine temperature settings associated with processing a drink product, where such temperature settings may be stored as temperature values in memory, as described elsewhere herein. For example, when a user selects a dairy and/or milkshake recipe and starts a frozen drink processing sequence and/or recipe using dial 1510, controller 402 will control processes of the dairy/milkshake recipe to adjust the temperature of the drink product to a coarse temperature setting 1604 at −4 degrees Celsius in graph 1600. A user before, during, or after coarse temperature setting 1604 is reached, may fine tune or adjust the coarse target temperature of the drink type by setting a temperature offset using manual temperature adjustment interface 1508. The user may push the left arrow button to decrease the recipe target temperature in increments of about 0.4 degrees Celsius to about −5.2 degrees Celsius. As the temperature decreases, the thickness and/or amount of frozen drink particles increases. Hence, manual temperature adjustment indicator 1506 may include a "thickness" label. But different labels may be used such as "temperature offset" or "temperature adjust", and the like.

The user may push the right arrow button to increase the recipe target temperature in increments of about 0.4 degrees Celsius to about −2.8 degrees Celsius. As the temperature increases, the thickness and/or amount of frozen drink particles decreases. Manual temperature adjustment indicator 1506 may include one or more light indicators that are illuminated in a configuration corresponding to the selected temperature offset. For example, manual temperature adjustment indicator 1506 may have a center light indicator that indicates that a 0-degree Celsius offset is selected (e.g., no offset). Manual temperature adjustment indicator 1506 may include light indicators corresponding to each increment of offset selected above or below the coarse setting (e.g., the 0 degree Celsius offset point). FIG. 16 also shows temperature offset and/or manual adjustment bands associated with various types of drink products, such as Milkshake, Frappuccino, Cocktail, Light, and Traditional. Each of the temperature bands may include a center, coarse, and/or target drink type temperature and user-selectable fine tune offset temperatures above and below the drink type target temperature. In some non-limiting embodiments or aspects, the temperature offset band associated with one recipe is different than that temperature offset band of a different recipe, resulting in the temperature offset increments being different between the different recipes.

Figure 17:
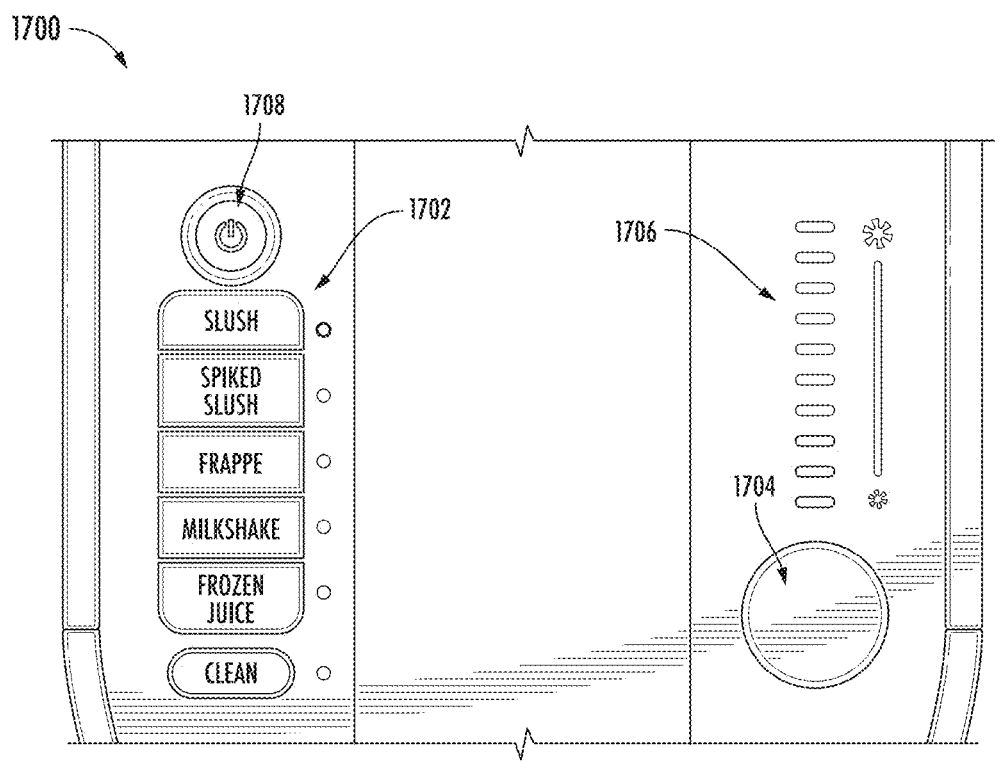
FIG. 17 is a close-up view of another user interface, according to non-limiting embodiments or aspects.

FIG. 17 is a close-up view 1700 of another user interface, according to an implementation of the disclosure. According to view 1700, user interface 112 may include power button 1708, drink type selector/indicator panel 1702, manual temperature adjustment and/or temperature offset indicator 1706, and manual temperature adjustment dial 1704. A user may turn frozen drink maker 100 on or off using power button 1708. A user may select a drink type to process a type of drink product by pressing a button associated with a selected drink type, e.g., SLUSHI. The selection of a particular drink type may be indicated by illumination of a light indicator associated with the selected drink type button. For example, FIG. 17 shows that the SLUSHI drink type has been selected by illumination of the white LED indicator next to the SLUSHI button. The user may select, for example, a slush drink, spiked slush or cocktail, a frappe, a frozen juice, or a dairy/milkshake drink type. Manual temperature adjustment dial 1704 may be rotated clockwise or counter-clockwise to set the temperature value and/or target temperature setting within a universal range of drink product temperature values. For example, manual temperature adjustment indicator 1706 may include 10 temperature values or settings corresponding to target temperatures such as illustrated in FIG. 18.

Figure 18:
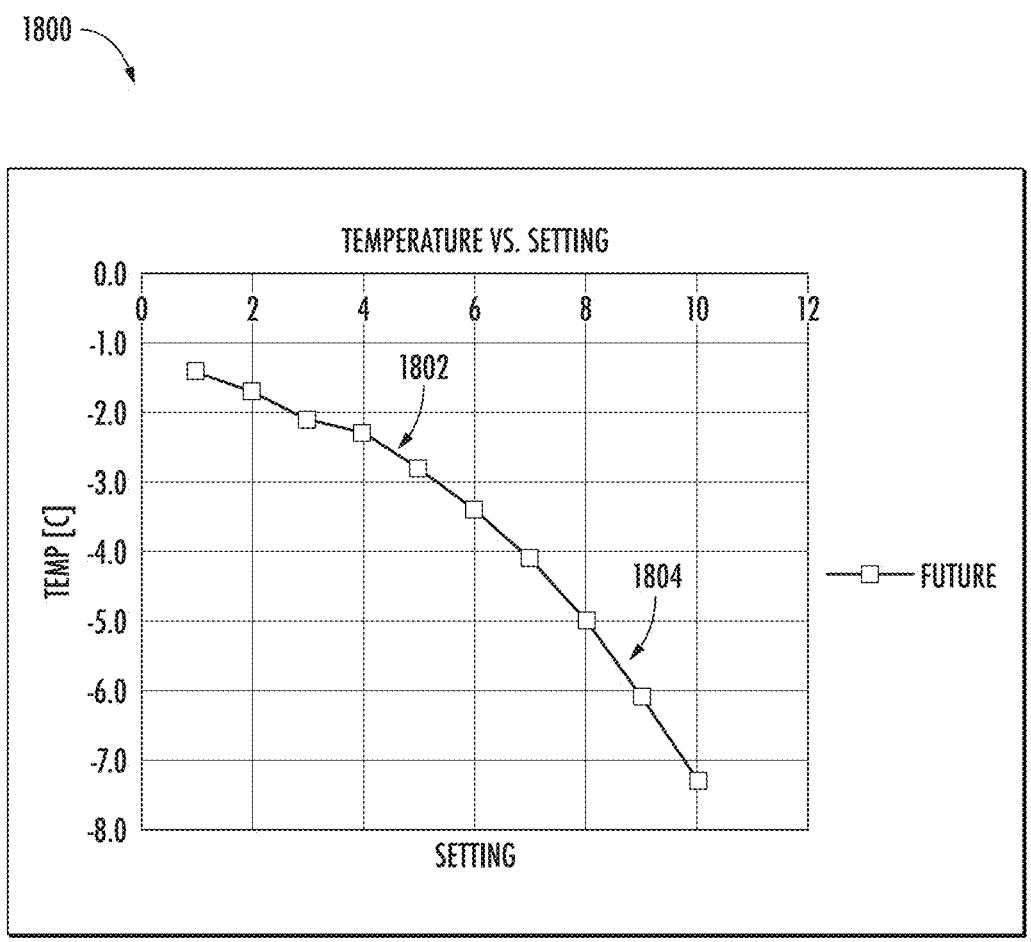
FIG. 18 is a graph of temperature values associated with automatic recipe temperature target temperatures and manual temperature adjustments, according to non-limiting embodiments or aspects.

FIG. 18 is a graph 1800 of temperature values associated with automatic recipe temperature target temperatures and manual temperature adjustments. Graph 1800 shows temperature values 1 through 10 where setting #1 is at −1.3 degrees Celsius and setting #10 is at −7.2 degree Celsius. The ten temperature settings of graph 1800 correspond to the ten light indicators of manual temperature adjustment indicator 1706. In operation, when a user selects a drink type, e.g., a MILKSHAKE, by pressing the corresponding button in drink type selector/indicator panel 1702, the button's adjacent indicator illuminates. Also, if the coarse or automatic temperature value associated with a milkshake is about −4.0 degrees Celsius, which corresponds the setting #7 in graph 1800, then seven indicators (e.g., light bars) will be illuminated in manual adjustment indicator 1706. The light bars may be dimmed or flash periodically until the target temperature is reached and/or detected by controller 402. Interface 112 may emit an audible sound, e.g., a beep or beep sequence when a target temperature is reached. A dimmed or flashing illumination may be changed to a brighter and/or steady illumination when a target temperature is reached. In some non-limiting embodiments or aspects, once a target temperature is reached, controller 402 will cycle compressor 214 on and off to keep a temperature of the drink product within a target temperature range above and/or below the target temperature. For example, the range may be greater than or equal to about 0.2, 0.3, 0.5, or 1.0 degrees Celsius above and below the drink product target temperature. As long as the temperature remains within the target temperature range, controller 402 will not initiate an alert (e.g., audible output) or change in status of any indicators of indicator 1706.

If the user wants to further decrease the target temperature and/or increase the target thickness of the milkshake to setting #10 of FIG. 18, the user can turn dial 1704 until all 10 light indicators are illuminated. If the user wants to increase the target temperature to setting #3 of FIG. 18 and/or reduce the target thickness of the milkshake, the user can turn dial 1704 until three indicators bars of indicator 1706 are illuminated as illustrated in FIG. 17. While FIG. 17 shows an interface using a dial 1704 to manually adjust temperature, other types of interfaces may be used such as, without limitation, up/down buttons, a touch screen, or a slider switch.

FIG. 18 also illustrates how each increment of temperature change between each of the temperature settings #1 to #10 may be nonlinear to account for adequate changes in thickness of a cooled or frozen drink product. As temperature decreases, it requires a larger change in temperature to cause a material or proportional change in the amount of frozen drink particles within or the thickness of a drink product. For example, temperature increment 1802 (between settings #4 and #5) is about 0.6 degrees Celsius, while temperature increment 1804 (between setting #8 and #9), in a lower temperature range, is about −1.0 degrees Celsius. In other implementations, the increment of temperature change between settings may be constant, resulting a linear temperature range. While a range including 10 temperature values or settings is illustrated in FIGS. 17 and 18, any number of settings and/or temperature ranges may be implemented.

Figure 19:
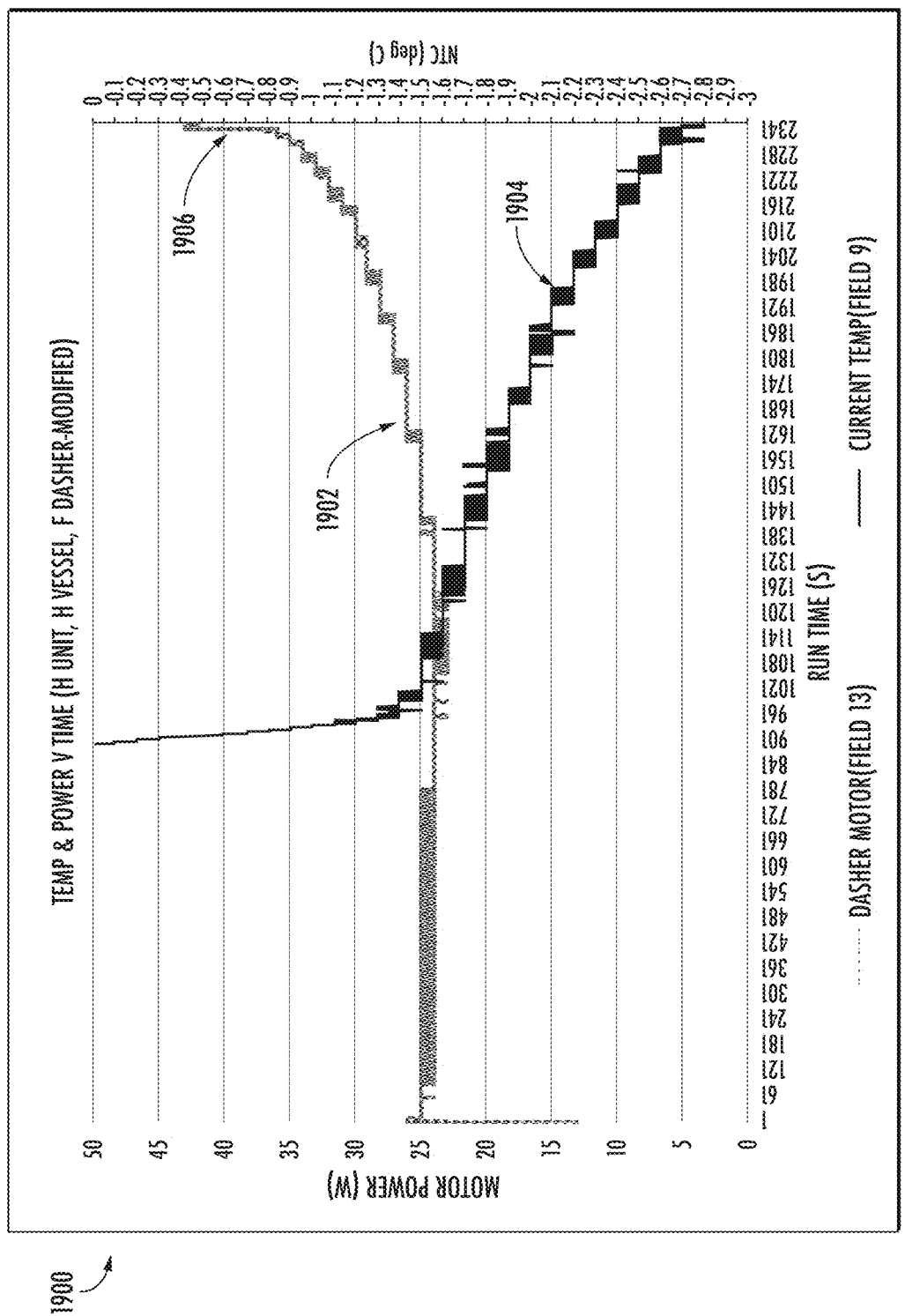
FIG. 19 is a graph of drive motor current and temperature vs. time as a drink product being processing by the frozen drink maker of FIG. 1, according to non-limiting embodiments or aspects.

FIG. 19 is a graph 1900 of drive motor 208 current and temperature of a drink product vs. time as the drink product is being processed by frozen drink maker 100 of FIG. 1. Graph 1900 shows changes in drive motor current 1902 and corresponding drink product temperatures 1904 over time as a drink product is being made. Graph 1900 illustrates how the current 1902 applied to drive motor 208 increases as the temperature 1904 decreases, causing the thickness of the drink product to increase, which results in an increased resistance of the drink product to the rotation of dasher 204 which, in turn, requires increased motor power and/or current 1902 to drive dasher 204 against the resistance. When current 1902, or power, or torque, reaches or exceeds a threshold or motor condition limit 1906, e.g., about 40 Watts and/or about 0.3 amps current, controller 402 may deactivate the cooling circuit, e.g., stop coolant and/or refrigerant flow to evaporator 202, to allow temperature 1904 to increase and, thereby reduce the thickness of the drink product to reduce current 1902 of drive motor 208 to below motor condition limit 1906. Controller 402 may automatically adjust the temperature setting associated with a particular drink type, which may have been fine-tuned by a user selection of a manual temperature adjustment and/or temperature offset, to a new temperature setting corresponding to a second target temperature, where the magnitude of motor current 1902 is lower than motor condition limit 1906. The second target temperature may be set to, for example, 0.25, 0.5, 0.75, 1, 1.25, 1.5, or 2.0 degrees Celsius above (by a relatively small offset) the initial and/or first target temperature. In this way, controller 402 prevents an overcurrent condition and possible damage to drive motor 208. This may also enable operation of frozen drink maker 100 and dasher 204 to continue by preventing excessive buildup of ice within mixing vessel 104, e.g., prevents drive motor 208 from stalling. Otherwise, drive motor 208 would stall and frozen drink maker 100 would be jammed up, blocking slush output from mixing vessel 104 and requiring a user to defrost and/or unblock mixing vessel 104 before normal operations can be resumed. Hence, this stall prevention enables frozen drink maker 100 to provide some slush output. Further, an excessive current or power condition of drive motor 208 caused by an object blocking rotations of dasher 204 can also be prevented. Controller 402 may perform actions in addition to stopping drive motor 208, such as shutting down compressor 214. Graph 1900 also shows how controller 402 may continuously and/or periodically monitor temperature associated with a drink product within mixing vessel 104 via temperature sensor(s) 406 to enable continuous control of components such as compressor 214, and other components, of frozen drink maker 100 to enable automatic control of the temperature of a drink product.

Figure 20:
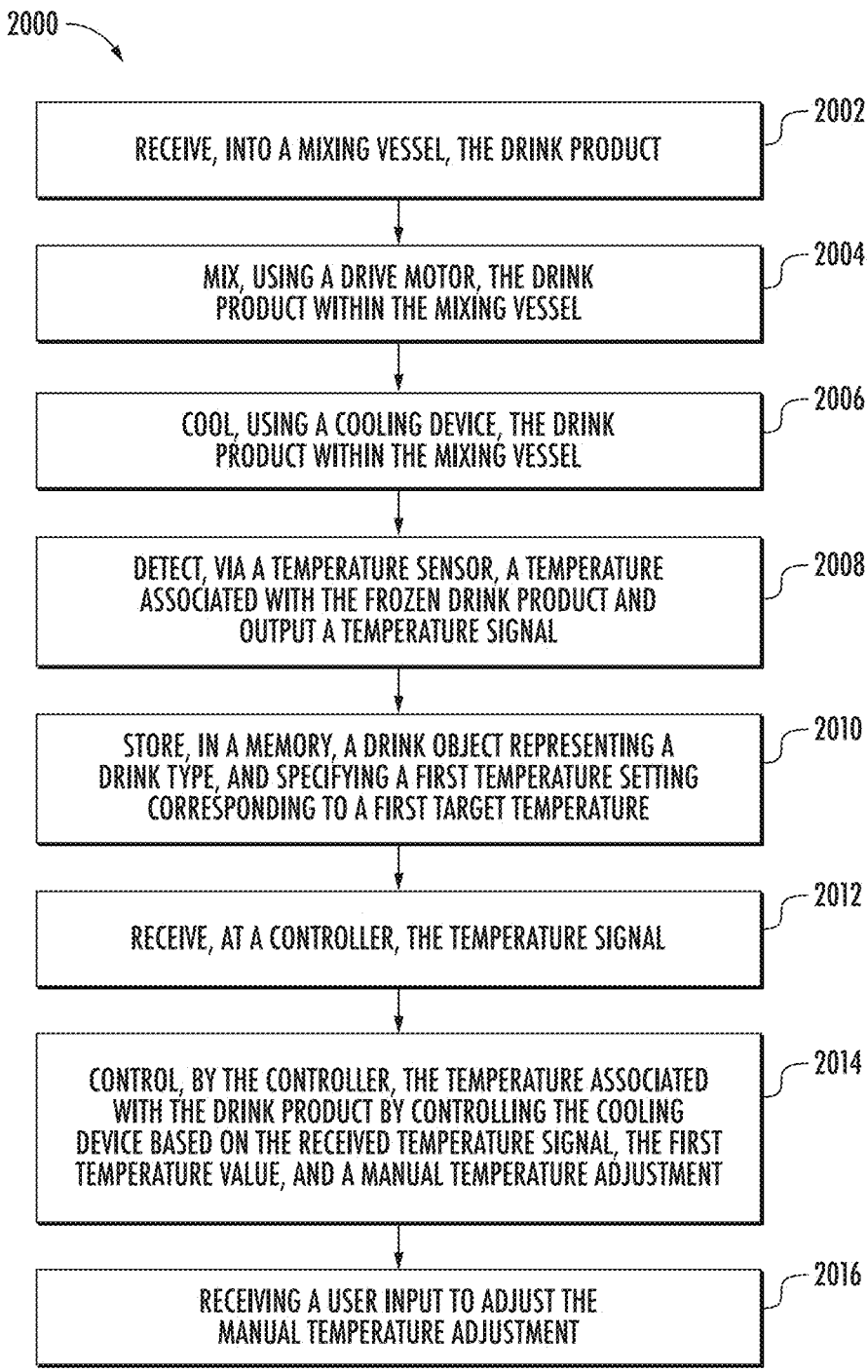
FIG. 20 is a flow diagram of a process for making a cooled drink product using a food type for initial or coarse temperature and/or texture control and then using a user input to subsequently fine tune the temperature and/or texture of the drink product, according to non-limiting embodiments or aspects.

FIG. 20 is a flow diagram of a process 2000 for making a cooled drink product using a recipe for initial or coarse temperature and/or texture control and then using a user input to fine tune the temperature and/or texture of the drink product. In certain implementations, process 2000 includes: receiving, into mixing vessel 104, a drink product (Step 2002); mixing, using a mixer and/or dasher 204 driven by drive motor 208, the drink product within mixing vessel 104 (Step 2004); cooling, using a cooling circuit such as a refrigeration circuit including evaporator 202, the drink product within mixing vessel 104 (Step 2006); detecting, via temperature sensor(s) 406, a temperature associated with the drink product and outputting a temperature signal (Step 2008); storing, in memory 404, a drink object representing a drink type, the drink object specifying a first temperature value and/or setting corresponding to a first target temperature (Step 2010); receiving, at controller 402, the temperature signal (Step 2012); controlling, by controller 402, the temperature associated with the drink product by controlling the cooling circuit, e.g., by activating or deactivating compressor 214 to initiate or stop refrigerant flow through evaporator 202, based on the received temperature signal, the first temperature value, and/or a manual temperature adjustment (Step 2014); and receiving a user input to adjust the manual temperature adjustment (Step 2016). The user input may be indicative of a desired thickness corresponding to the manual temperature adjustment. In some non-limiting embodiments or aspects, the manual temperature adjustment may be customized per drink type. In certain implementations, the manual adjustment is universal for all drink types. In some non-limiting embodiments or aspects, the manual temperature adjustment is finer and/or for a smaller range specific to a drink type (e.g., corresponding to FIG. 16) and in other implementations coarser and/or for a larger range not specific to a drink type—e.g., spanning multiple (e.g., all) drink types, thereby enabling a user greater latitude in adjusting thickness and/or temperature.

Figure 21:
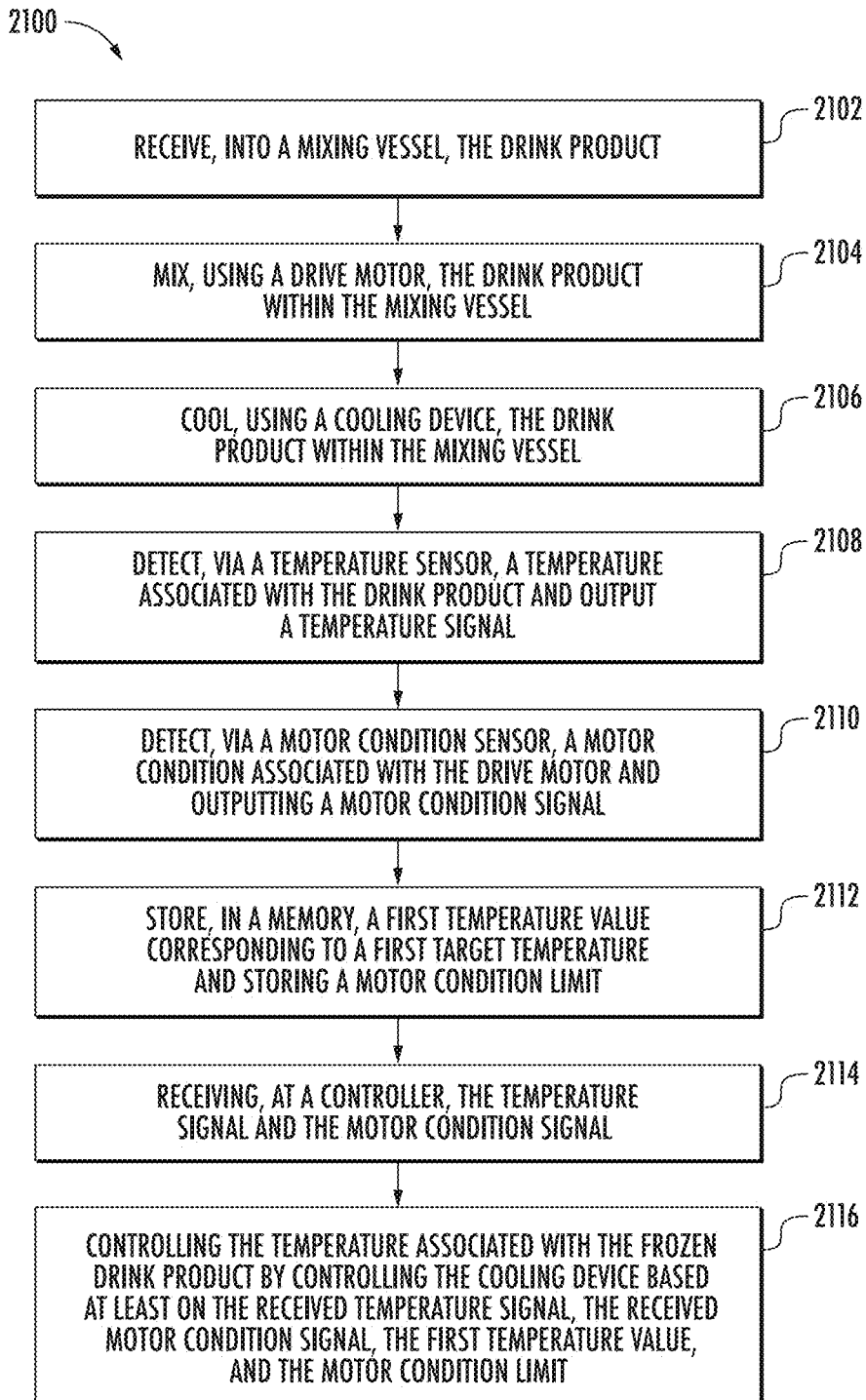
FIG. 21 is a flow diagram of a process for automatically detecting when drive motor current is too high and/or a drink product is too thick and, in response, adjusting the temperature of the drink product to reduce drive motor current and/or to increase the temperature of the drink product to reduce a thickness of the drink product, according to non-limiting embodiments or aspects.

FIG. 21 is a flow diagram of process 2100 for automatically detecting when drive motor current is too high and/or a drink product is too thick and, in response, adjusting the temperature of the drink product to reduce drive motor current and/or to increase the temperature of the drink product to reduce a thickness of the drink product. In certain implementations, process 2100 includes: receiving, in mixing vessel 104, the drink product (Step 2102); mixing, using a mixer and/or dasher 204 driven by drive motor 208, the drink product within mixing vessel 104 (Step 2104); cooling, using a cooling circuit such as evaporator 202, the drink product within mixing vessel 104 (Step 2106); measuring, via temperature sensor(s) 406, a temperature associated with the drink product and outputting a temperature signal (Step 2108); measuring, via motor condition sensor(s) 406, a motor condition associated with drive motor 208 and outputting a motor condition signal (Step 2110); storing, in memory 404, a first temperature value corresponding to a first target temperature and storing a motor condition limit (Step 2112); receiving, at controller 402, the temperature signal and the motor condition signal (Step 2114); and controlling the temperature associated with the drink product by controlling the cooling circuit, e.g., by activating or deactivating compressor 214 to initiate or stop the refrigerant flow through evaporator 202, based at least on the received temperature signal, the received motor condition signal, the first temperature setting, and the motor condition limit (Step 2116).

In some non-limiting embodiments or aspects, controller 402 may stop and/or deactivate drive motor 208 to stop rotation of dasher 204 when the motor condition signal exceeds a motor knockdown threshold, e.g., the motor current or power is too high and/or high enough to damage drive motor 208, which may be caused by an excessive buildup of ice within mixing vessel 104. Excessive ice build-up may be caused, for example, by filling mixing vessel 104 with only water or a liquid predominantly consisting of water. Shutdown of drive motor 208 may also prevent damage to dasher 204 caused by excessive build-up of hard ice. Controller 402 may perform other actions in addition to deactivating drive motor 208 or alternatively such as issuing an alert, via user interface 112, to a user to add more ingredients, such as sugar or alcohol, to the drink product or issuing an alert to the user to turn off frozen drink maker 100. A different motor shutdown threshold for motor 208 may be set higher than the motor knockdown threshold limit. In this way, controller 402 may attempt to increase temperature in mixing vessel 104 when a motor knockdown threshold limit is reached, but only shut down and/or stop drive motor 208 when a motor shutdown threshold is reached to prevent damage to drive motor 208. Controller 402 may take action based on determining whether the motor knockdown threshold limit or the motor shutdown limit has been reached or exceeded for a period of time, e.g., 0.5, 1.0, 1.5, 2.0, 5 seconds or more. By observing motor current and/or power for a period of time, a false positive and/or reading of current and/or power may be eliminated.

Figure 22A:
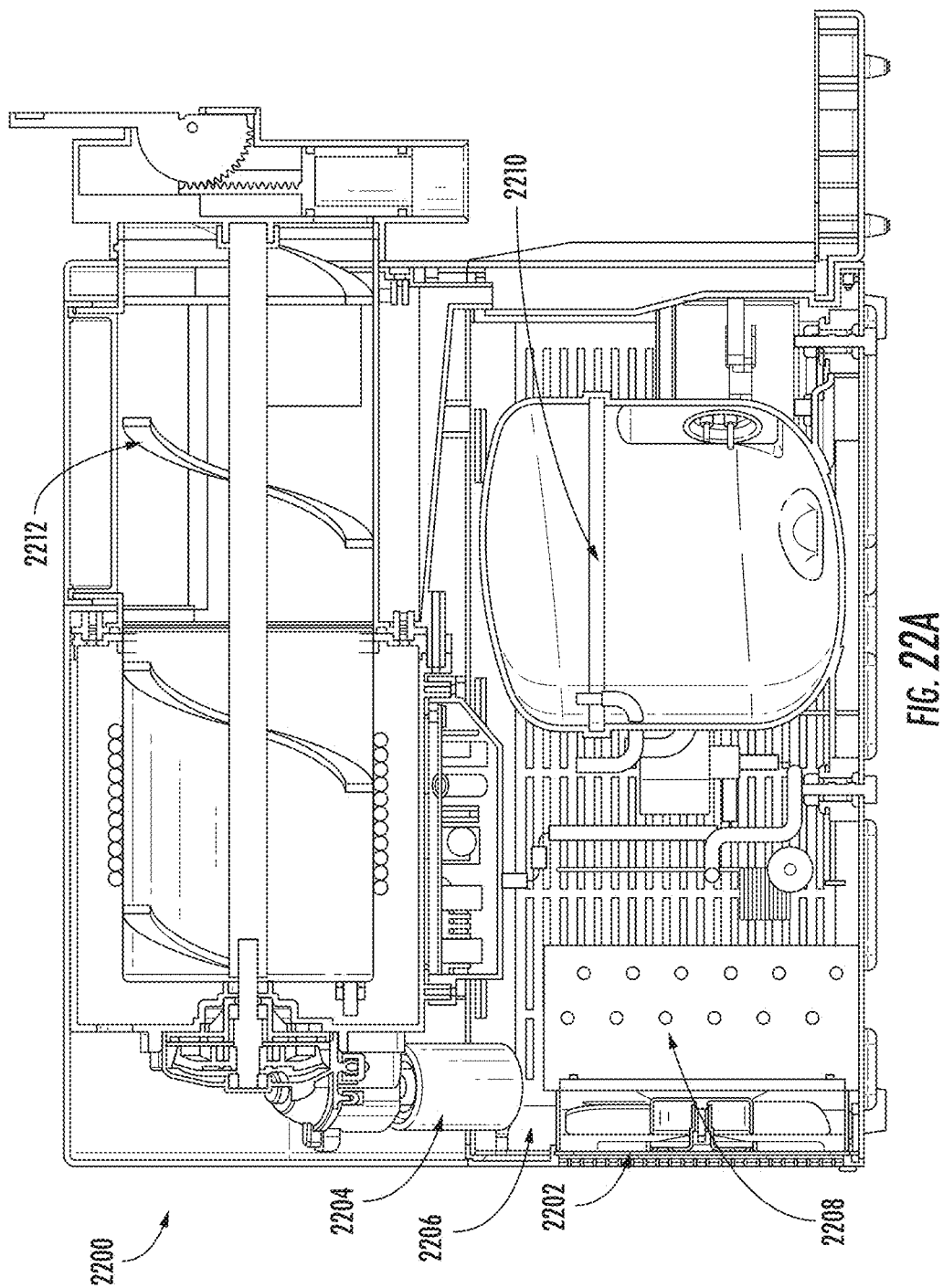
FIG. 22A shows an implementation of a dual-use cooling fan within the housing of a drink maker, according to non-limiting embodiments or aspects.

FIG. 22A shows a dual-use cooling fan 2202 within a housing of a drink maker 2200 including a refrigeration system having a condenser 2208 and compressor 2210. Drink maker 2200 also includes a drive motor 2204 configured to drive rotation of dasher 2212 during processing of a drink product. Dual-use cooling fan 2202 draws an air flow through condenser 2208 and directs the air flow, via an air channel 2206, toward drive motor 2204. The air flow passes over and adjacent to condenser coils as it passes through condenser 2208 to cool the refrigerant passing through condenser 2208 within a closed loop refrigeration system. The air flow also passes along a surface and/or surfaces of drive motor 2204 to effect cooling of drive motor 2204. While FIG. 22A shows a configuration where drive motor 2204 and condenser 2208 are positioned at about right angles with respect to dual-use cooling fan 2202, other configurations, arrangements, or orientations may be implemented such that dual-use cooling fan 2202 provides a cooling air flow to condenser 2208 and drive motor 2204.

In some non-limiting embodiments or aspects, a drink maker, such as drink maker 2200, includes a mixing vessel, like mixing vessel 104, arranged to receive a drink product. Drink maker 2200 includes a mixing component such as dasher 2212 or another type of mixing component, driven by drive motor 2204, that is arranged to mix the drink product within mixing vessel 104. A refrigeration system is arranged to cool the drink product within mixing vessel 104 that includes a condenser, such as condenser 2208. Cooling fan 2202, e.g., a dual-use cooling fan, is configured to concurrently cool drive motor 2204 and condenser 2208. Cooling fan 2202 may provide air flow through condenser 2208 to cool refrigerant flowing through condenser 2208. Cooling fan 2202 may provide air flow along a surface of drive motor 2204 to cool drive motor 2204. Cooling fan 2202, drive motor 2204, and condenser 2208 may be positioned such that air generated by cooling fan 2202 passes serially through condenser 2208 and along a surface of drive motor 2204.

A first portion of air generated by cooling fan 2202 may cool condenser 2208 and a second portion of air generated by cooling fan 2202 may cool drive motor 2204. Condenser 2208 may include a plurality of coils that carry coolant and/or refrigerant within a closed loop of the refrigeration circuit. When cooling fan 2202 provides air flow through condenser 2208 to cool refrigerant flowing through condenser 2208, the air flow may travel adjacent to and/or around the plurality of coils. A cooling channel 2206 may extend between cooling fan 2202 and drive motor 2204 where cooling channel 2206 provides cooling air flow between cooling fan 2202 and drive motor 2204. Cooling channel 2206 may be at least partially formed by a duct and/or ducting. The ducting may include plastic, metals, composite materials, and the like. A cooling channel 2206 may extend between cooling fan 2202 and condenser 2208, where the cooling channel provides cooling air flow between cooling fan 2202 and condenser 2208. The cooling channel may be at least partially formed by a duct. Cooling fan 2202 may include a centrifugal fan, a cross-flow fan, a tangential fan, a volute fan, a backward curved fan, a forward curved fan, a blower fan, a squirrel-cage fan, and/or an axial fan.

In some non-limiting embodiments or aspects, a cooling fan, such as cooling fan 2202, is configured for cooling a drive motor, such as drive motor 2204, and a condenser, such as condenser 2208, within a housing of a drink maker. Cooling fan 2202 may include an air inlet configured to receive an air flow, an impeller configured to generate the air flow; and an air outlet configured to output the air flow through condenser 2208 and along a surface of drive motor 2204.

Figure 22B:
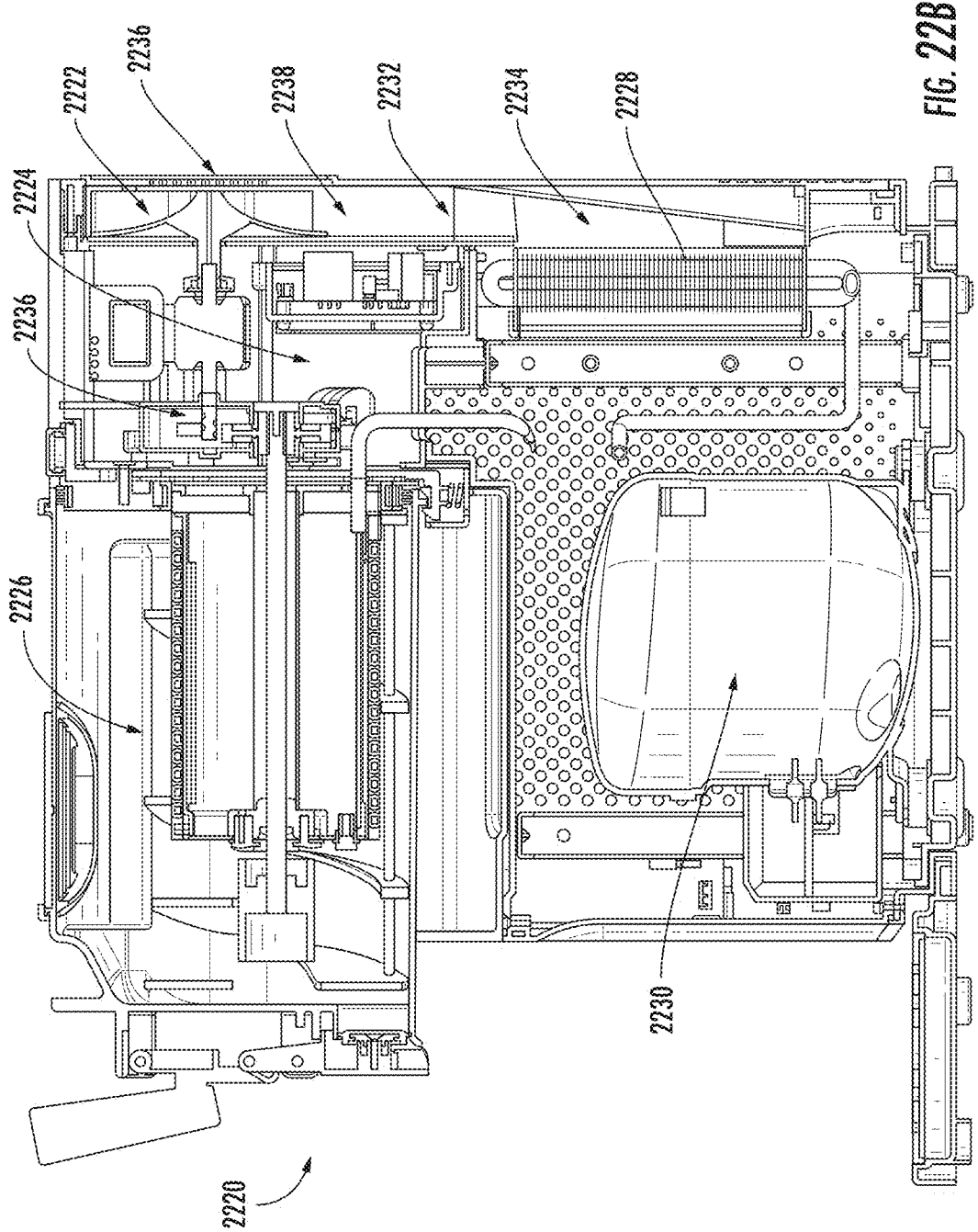
FIG. 22B shows another implementation of a dual-use cooling fan within the housing of a drink maker, according to non-limiting embodiments or aspects.

FIG. 22B shows another implementation of a dual-use cooling fan 2222 within the housing of a drink maker 2220 including a drive motor 2224, a dasher 2226, a compressor 2230, and a condenser 2228. Drive motor 2224 is coupled to and drives rotation of dasher 2226 and also drives rotation of cooling fan 2222 via gears 2236. Cooling fan 2222 includes an air outlet 2238 that directs air flow from cooling fan 2222 through air channel 2232 which may include ducting 2234 that directs air flow through condenser 2228 to cool refrigerant flowing through condenser 2228.

Figure 22C:
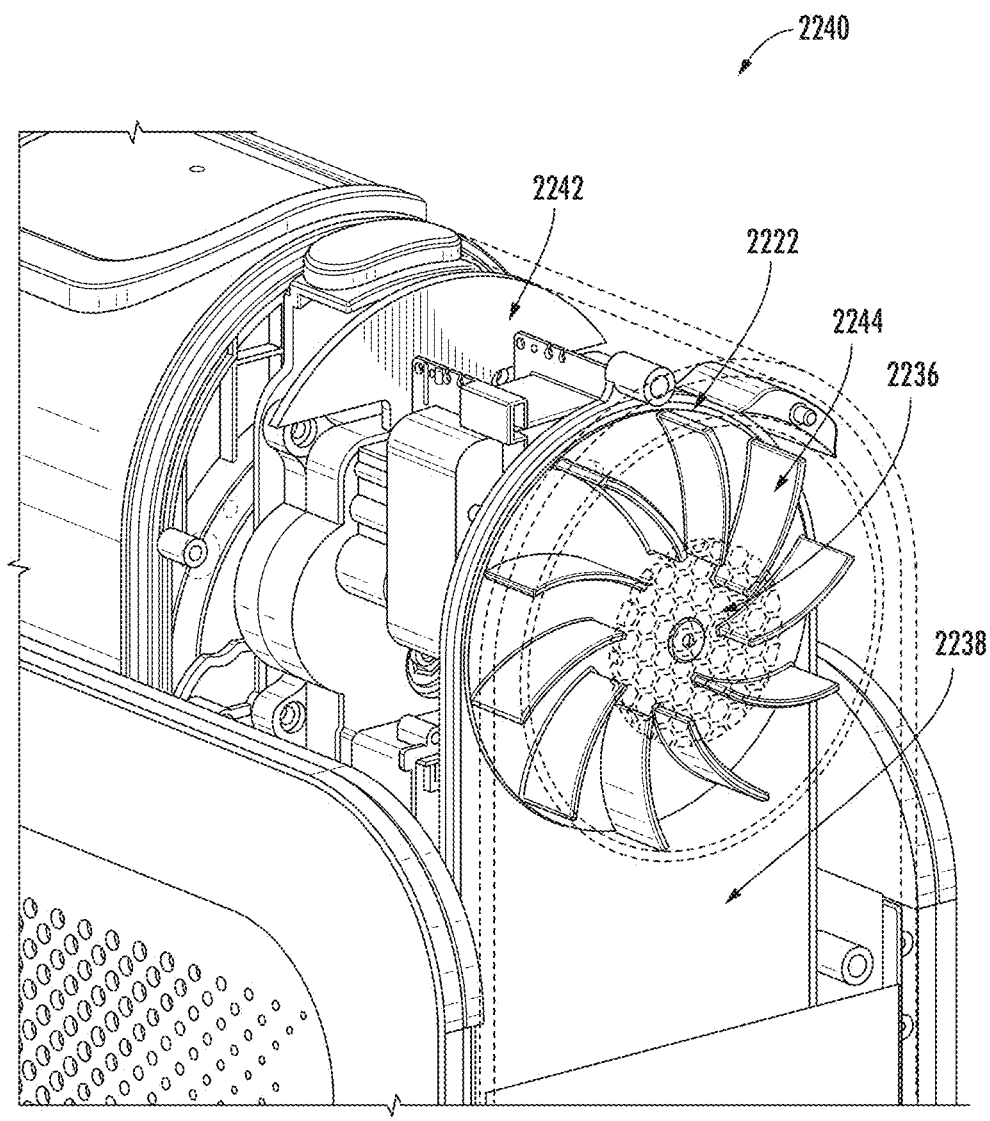
FIG. 22C shows a perspective view of the dual-use cooling fan of FIG. 22B, according to non-limiting embodiments or aspects.

FIG. 22C shows a perspective view 2240 of dual-use cooling fan 2222 within housing 2242 of drink maker 2220. Cooling fan 2222 may be a centrifugal fan and/or another type of fan, as described herein. Cooling fan 2222 may include an impeller 2244 that draws air flow into cooling fan 2222 via inlet 2236 and then expels air downward at about a right angle via outlet 2238 with respect to inlet 2236. The air flow exiting outlet 2238 flows downward past drive motor 2224, including along a surface of drive motor 2224, and through air channel 2232, which may include ducting 2234 that directs the air flow through condenser 2228 (adjacent to and/or around coils of condenser 2228) to effect cooling of refrigerant passing through the coils.

Figure 23:
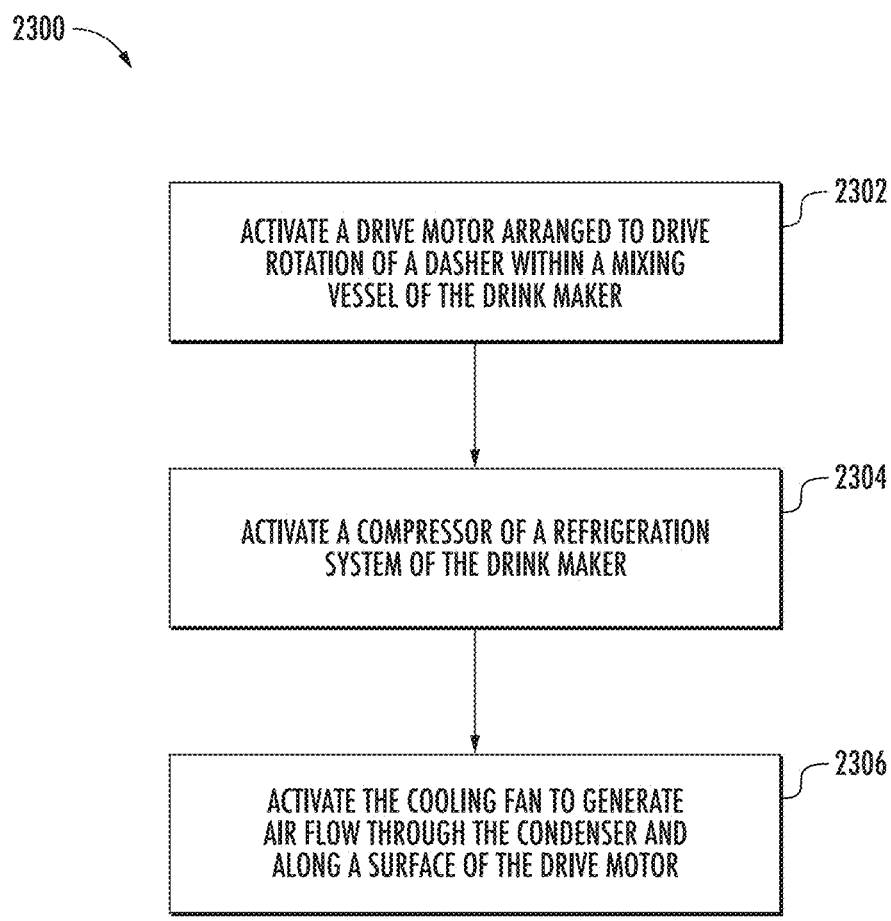
FIG. 23 is a flow diagram of a process for operating the dual-use cooling fan, according to non-limiting embodiments or aspects.

FIG. 23 is a flow diagram of a process 2300 for operating dual-use cooling fan 2202 or 2222 of FIGS. 22A and 22B respectively. Process 2300 facilitates concurrently cooling condenser 2208 (or condenser 2228) and drive motor 2204 (or drive motor 2224) within a housing of a drink maker using a cooling fan 2202 or 2222 respectively by: activating drive motor 2204 (or drive motor 2224) that is arranged to drive rotation of dasher 2212 (or dasher 2226) within a mixing vessel of a drink maker (Step 2302); activating compressor 2210 (or compressor 2230) of a refrigeration circuit of the drink maker (Step 2304); and activating cooling fan 2202 (or cooling fan 2222) to concurrently generate air flow through condenser 2208 (or condenser 2228) and along a surface of drive motor 2204 (or drive motor 2224) (Step 2306).

Figure 24A:
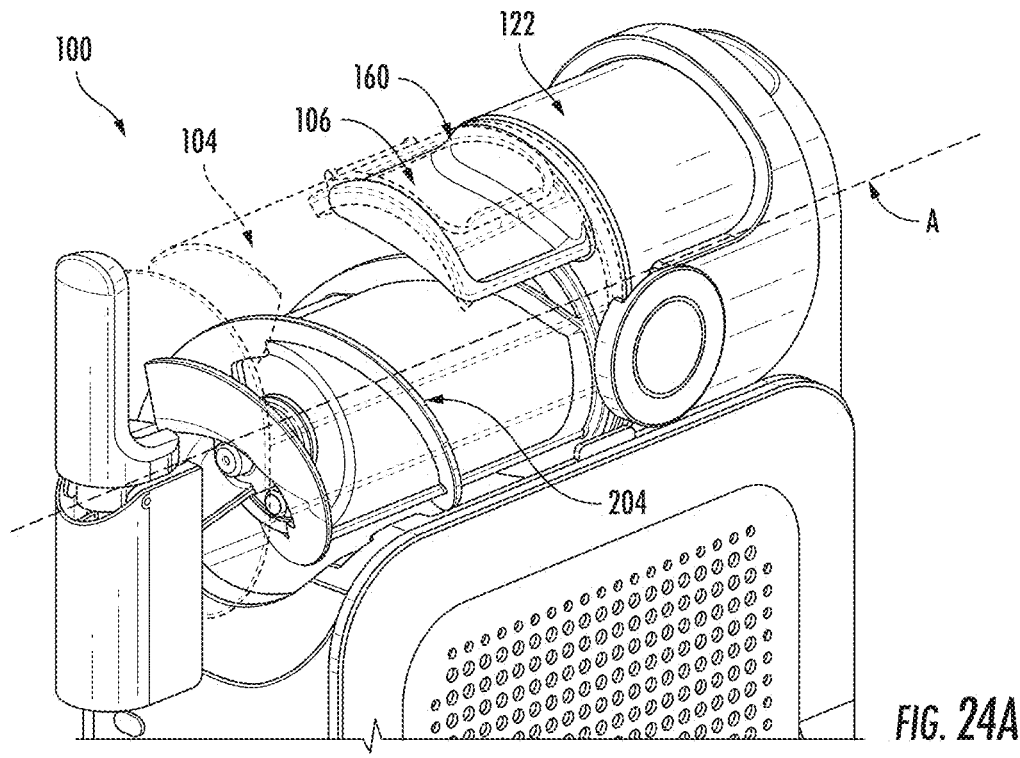
FIG. 24A shows a perspective view of a sample pour-in opening for a frozen drink maker, according to non-limiting embodiments or aspects.
Figure 24B:
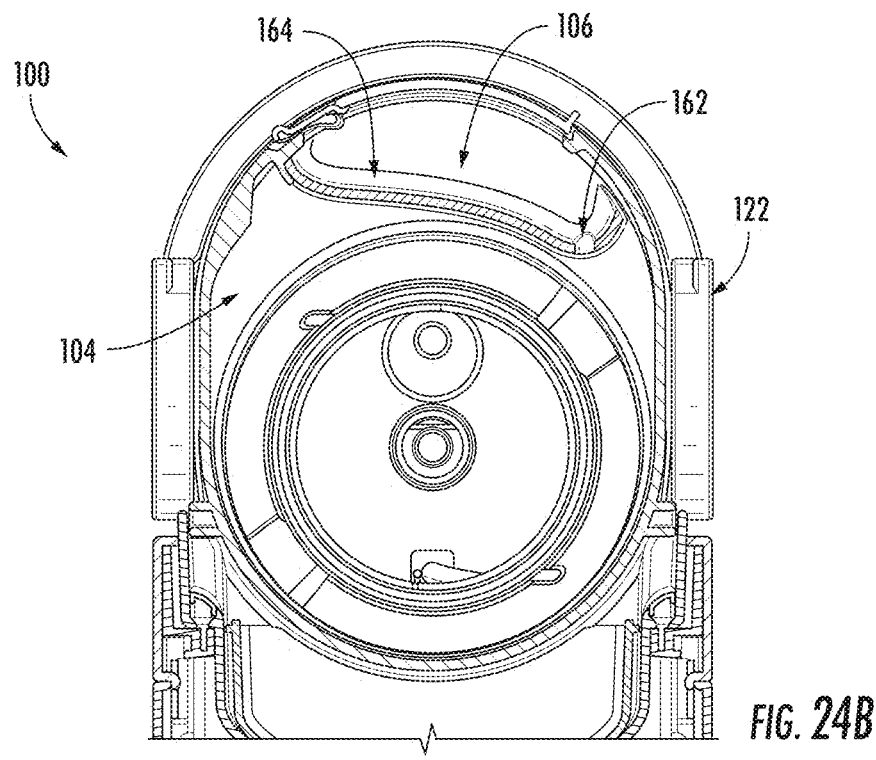
FIG. 24B shows a front view of the pour-in opening shown in FIG. 24A, according to non-limiting embodiments or aspects.
Figure 24C:
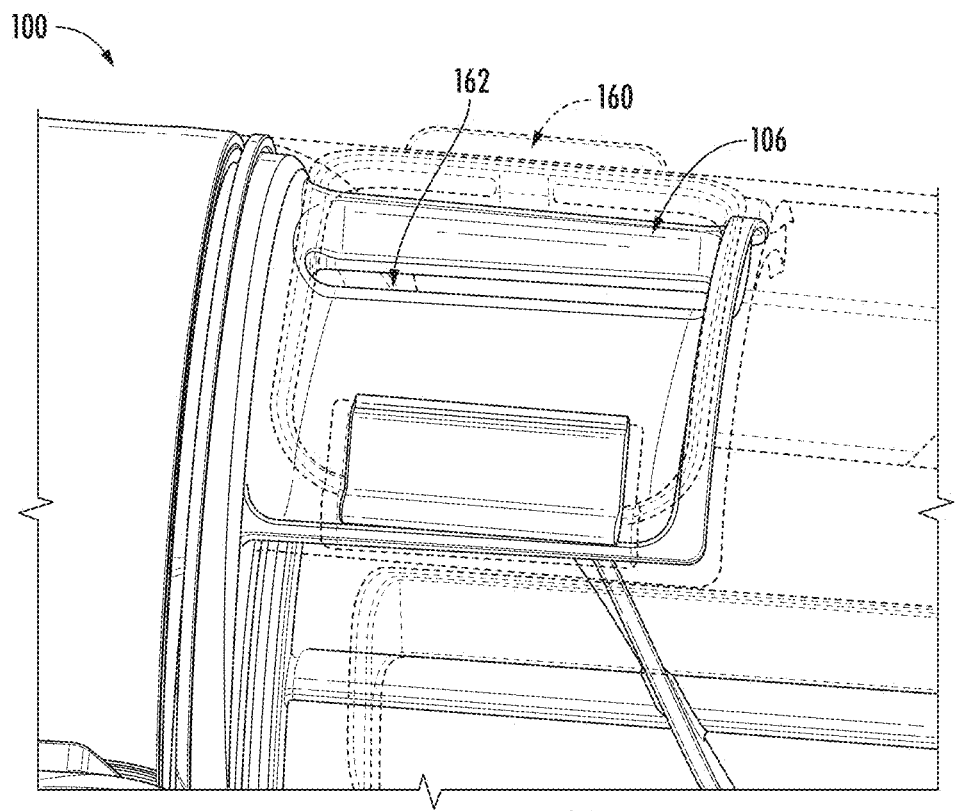
FIG. 24C shows a left perspective view of the pour-in opening shown in FIG. 24A, according to non-limiting embodiments or aspects.

As previously mentioned, frozen drink maker 100 may include pour-in opening 106 through which mixing vessel 104 can receive ingredients to be mixed to produce a drink product. An illustrative pour-in-opening 106 for a frozen drink maker 100 is shown in FIGS. 24A-24C. Frozen drink maker 100 includes mixing vessel 104 with a substantially cylindrical chamber and housing 102 with upper housing section 122. FIG. 24A shows a perspective side view of pour-in opening 106. FIG. 24B shows a front view of pour-in opening 106 of FIG. 24A, and FIG. 24C shows a perspective view of pour-in opening 106 of FIG. 24A from the left side of mixing vessel 104 (when viewed from the front view). Pour-in opening 106 may facilitate the addition of fluids, liquids, slush, or other ingredients to mixing vessel 104 while dasher 204 is active, as well as minimizing spillage and preventing finger insertion during use.

Figure 25:
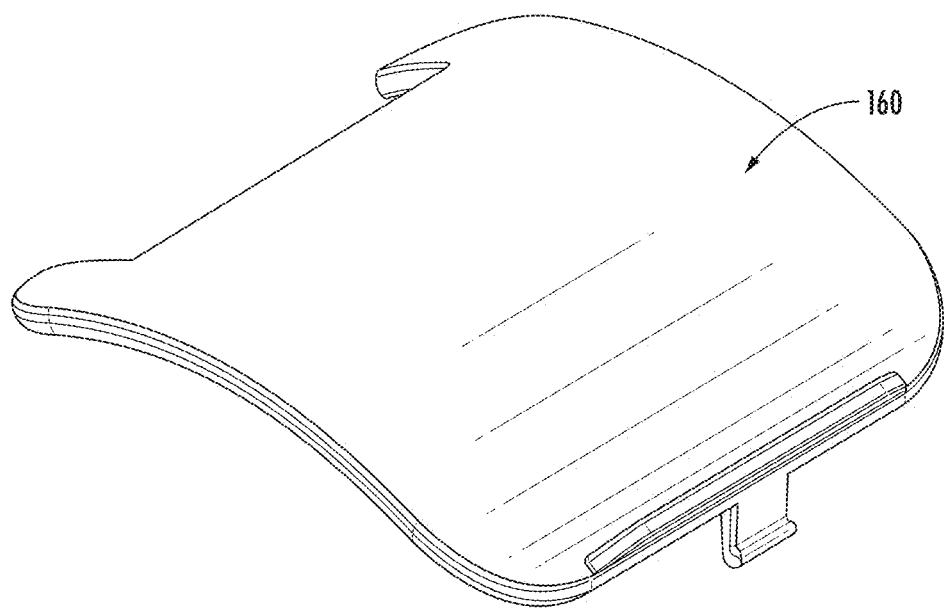
FIG. 25 shows a perspective view of a sample cover for a pour-in opening, according to non-limiting embodiments or aspects.

In some non-limiting embodiments or aspects, pour-in opening 106 may include cover 160 to seal pour-in opening 106, as shown in FIGS. 24A and 24C. A detailed perspective view of a sample cover 160 for pour-in opening 106 is shown in FIG. 25. If present, cover 160 may be hingedly connected to upper housing section 122 of mixing vessel 104. Cover 160 may be moved between an open position in which pour-in opening 106 is accessible to a user and a closed position in which pour-in opening 106 is not accessible to a user. Although not illustrated in the accompanying figures, pour-in opening 106 may also include a grate to restrict objects from entering aperture 162. If present, a grate may reduce the risk of solids greater than a certain size and/or having one or more certain shapes entering mixing vessel 104, which can cause damage.

Figure 26:
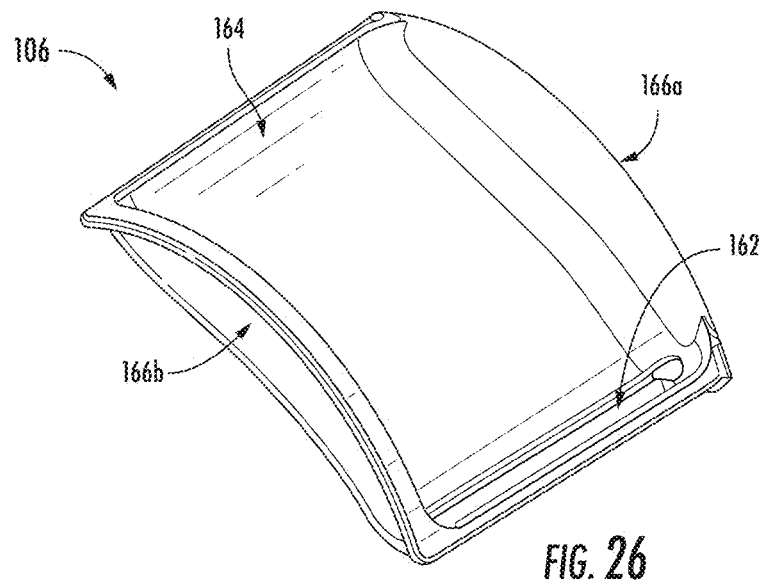
FIG. 26 shows a perspective view of a sample pour-in opening, according to non-limiting embodiments or aspects.
Figure 27A:
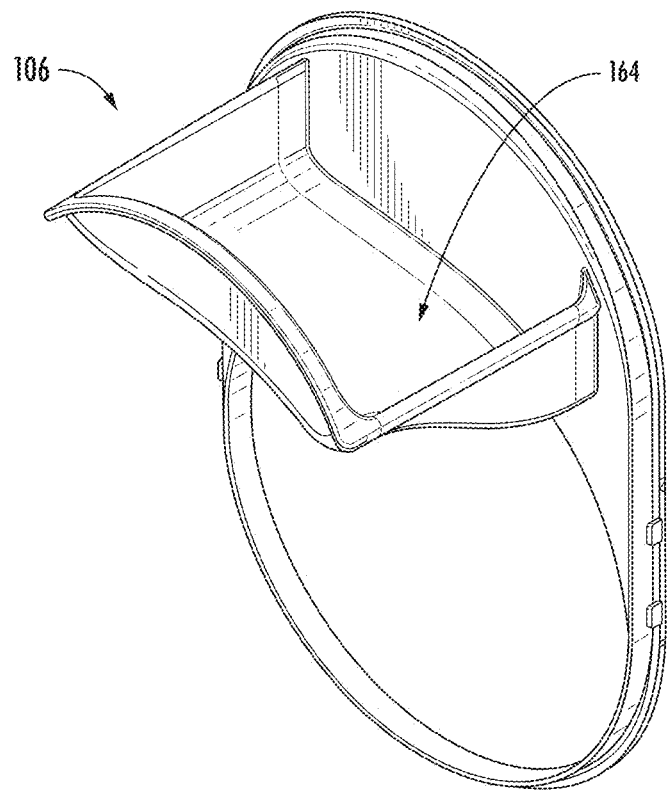
FIG. 27A shows a perspective view of a sample pour-in opening, according to non-limiting embodiments or aspects.
Figure 27B:
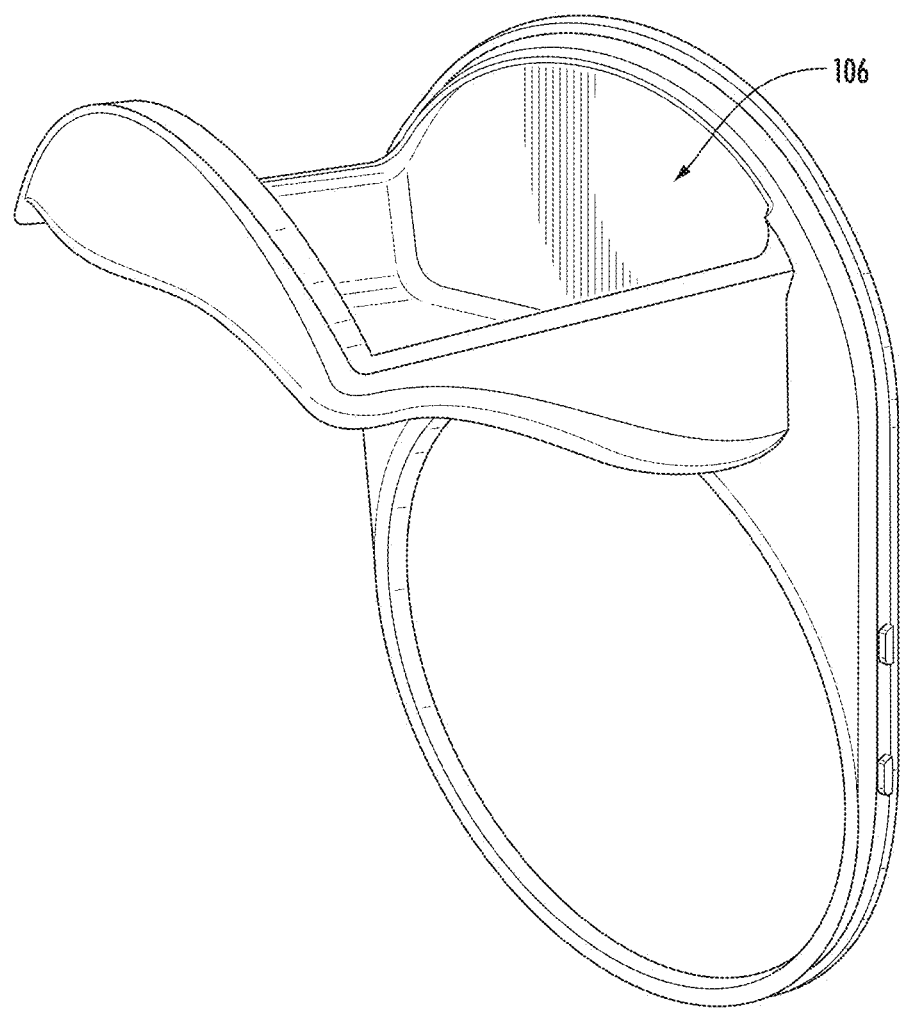
FIG. 27B shows an isometric view of a protype of the pour-in opening of FIG. 27A, according to non-limiting embodiments or aspects.
Figure 27C:
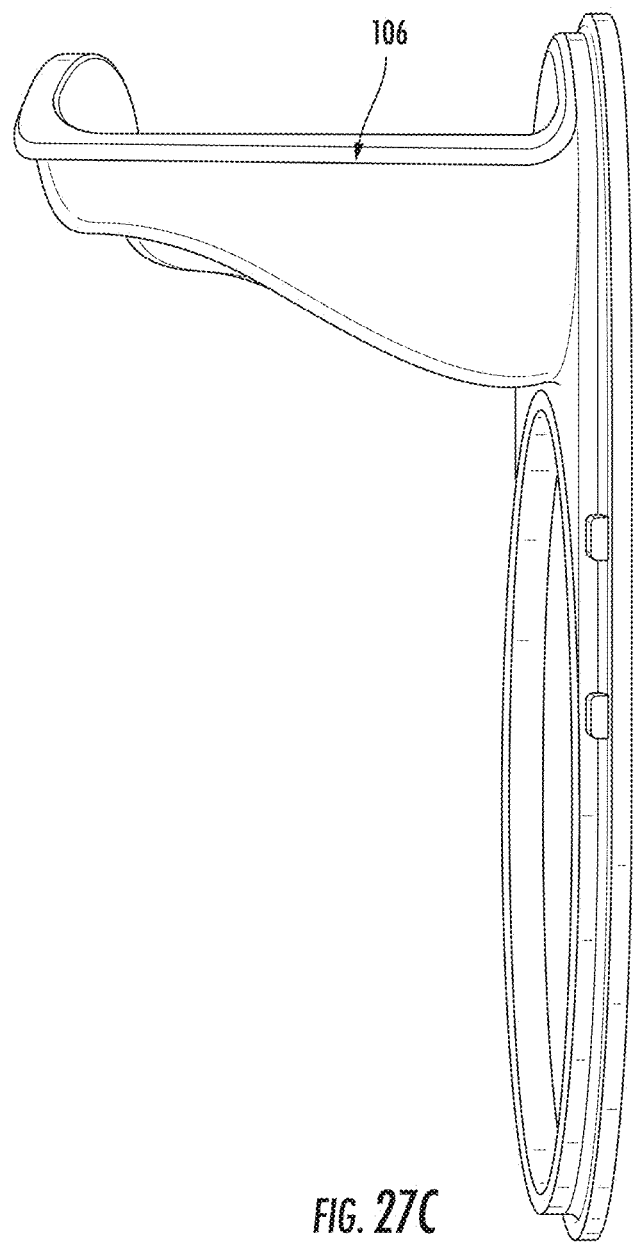
FIG. 27C shows a side view of the pour-in opening protype of FIG. 27B, according to non-limiting embodiments or aspects.
Figure 27D:
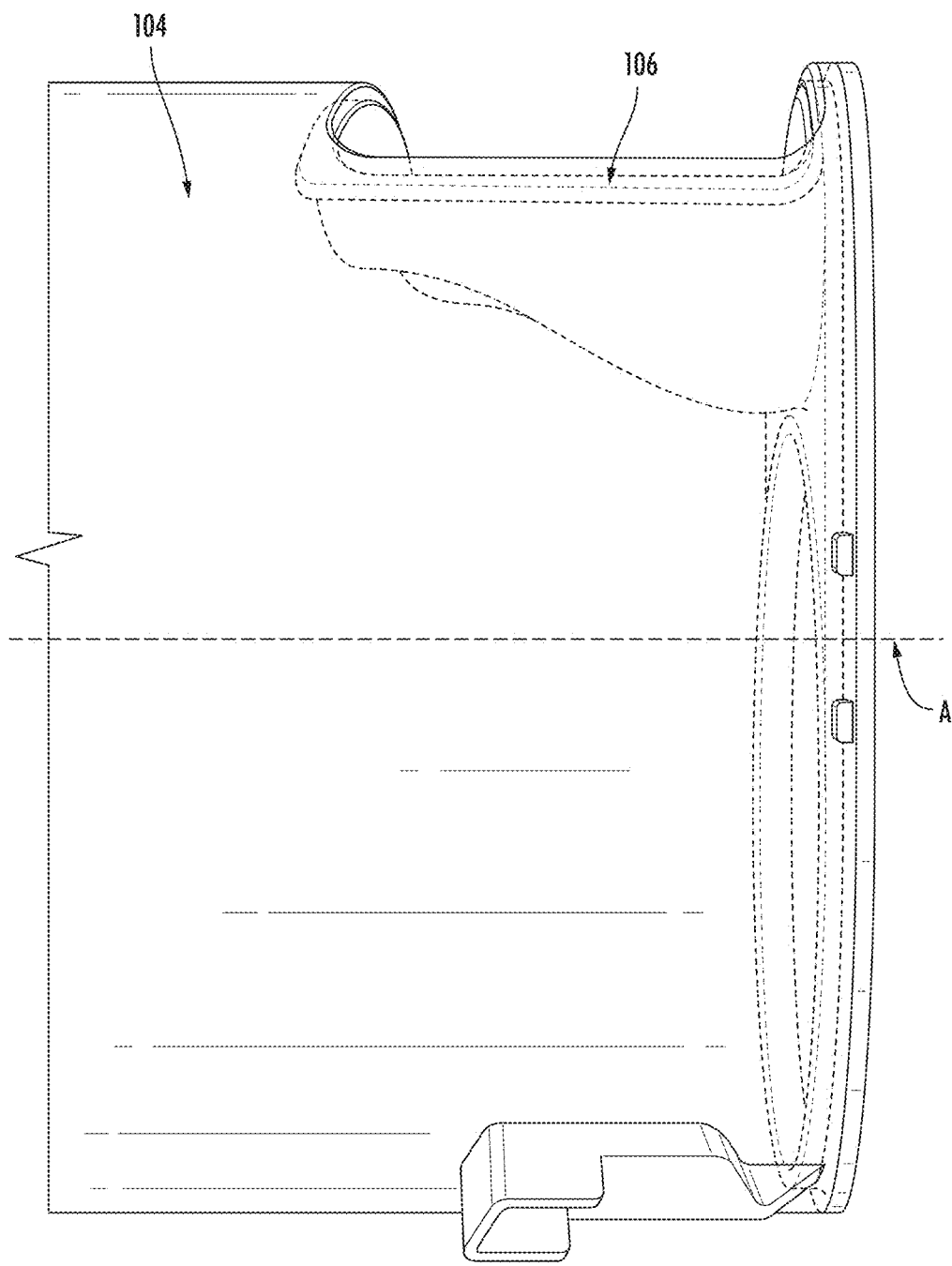
FIG. 27D shows the pour-in opening protype shown in FIG. 27B affixed to a mixing vessel, according to non-limiting embodiments or aspects.

FIG. 26 shows a perspective view of a sample pour-in opening 106. Pour-in opening 106 includes surface 164 that inclines radially with respect to a center axis of dasher 204 (shown as axis "A" in FIG. 24A). Surface 164 reduces possible splashing as mixing vessel 104 is filled. Surface 164 also prevents slush contained within mixing vessel 104 from being pushed out of pour-in opening 106. Surface 164 has aperture 162. Although FIG. 26 shows only one aperture 162, additional apertures may also be present. Aperture 162 is in fluid communication with an interior chamber of mixing vessel 104. In some non-limiting embodiments or aspects, aperture 162 extends laterally along surface 164 in a direction parallel to the center axis "A" of dasher 204. Aperture 162 may be shaped as a slot, as shown in FIG. 26, or may have a different shape. If shaped as a slot, aperture 162 may be longer or wider than shown in FIGS. 24A-24C and/or may have a different ratio of length to width than shown. Further, aperture 162, as a slot or another oblong shape, may have its major axis aligned parallel or perpendicular to the axis of mixing vessel 104, or at any other angle relative to the axis of mixing vessel 104. Aperture 162, for example, in the form of a slot, may be sized small enough (at least in width) to not allow passage of a human finger, at least not the entire length of a human finger, to thereby prevent a user from sticking one or more fingers into mixing vessel 104.

Pour-in opening 106 may optionally include one or more lips 166a, 166b extending up from a perimeter of surface 164 to form a well that feeds into aperture 162, as shown in FIG. 26. One or more lips 166a, 166b may reduce overflow spill when a liquid is poured into mixing vessel 104. If desired, pour-in opening 106 may also include a grate (not illustrated) covering at least a portion of aperture 162. For safety concerns, users should not contact dasher 204 while it is rotating. The geometry of pour-in opening 106 (including aperture 162 as described above) may inhibit or prevent a user from reaching into mixing vessel 104 even when cover 160 is in an open position and/or dasher 204 is rotating.

Pour-in opening 106 may be positioned on a top of mixing vessel 104, near its rear end, as shown in FIGS. 24A-24C, opposite dispenser assembly 108. Positioning pour-in opening 106 near the rear of mixing vessel 104 avoids interference with slush circulation in the front of frozen drink maker 100, which can lead to waste and non-homogeneous texture. With pour-in opening 106 positioned at the rear of mixing vessel 104, the front ⅔ of mixing vessel 104 has a continuous and smooth internal shape to provide good slush flow and minimize migration of the slush out of the top. By positioning pour-in opening 106 near the rear of mixing vessel 104, opening 106 is located in a position where there is less possible buildup of frozen and/or slush materials, enabling less obstructed pouring and reducing possible buildup of ice and/or slush material at opening 106 during processing.

Surface 164 of pour-in opening 106 is sloped to direct incoming ingredients to enter mixing vessel 104 in an entry direction, which is the same as the direction of dasher 204 rotation. This prevents the rotating frozen mixture from exiting mixing vessel 104 through pour-in opening 106. In some non-limiting embodiments or aspects, when dasher 204 is rotating in a clockwise direction when viewed from the front of frozen drink maker 100, opening 106 is positioned on the right side of mixing vessel 104. Aperture 162 may be positioned to extend laterally along surface 164 in a direction parallel to the center axis (A) of dasher 204, whereas in other implementations, when dasher 204 is rotating in a counter-clockwise direction when viewed from the front of frozen drink maker 100, opening 106 is positioned on the left side of mixing vessel 104.

FIGS. 27A-27D illustrate a sample pour-in opening 106 in which surface 164 of pour-in opening 106 is shaped to slope downwardly toward a rear of mixing vessel 104. In some such implementations, one or more apertures 162 may be positioned at a bottom portion of surface 164. Shaping surface 164 to include a rearward slope can increase the volume capacity of pour-in opening 106 and reduce spillage. In implementations in which surface 164 of pour-in opening 106 is sloped relative to the center axis (A) of dasher 204, surface 164 may be shaped such that a section of surface 164 closest to a front of mixing vessel 104 is positioned farther away from the center axis (A) of dasher 204 than a section of surface 164 closest to a rear of mixing vessel 104.

Figure 28:
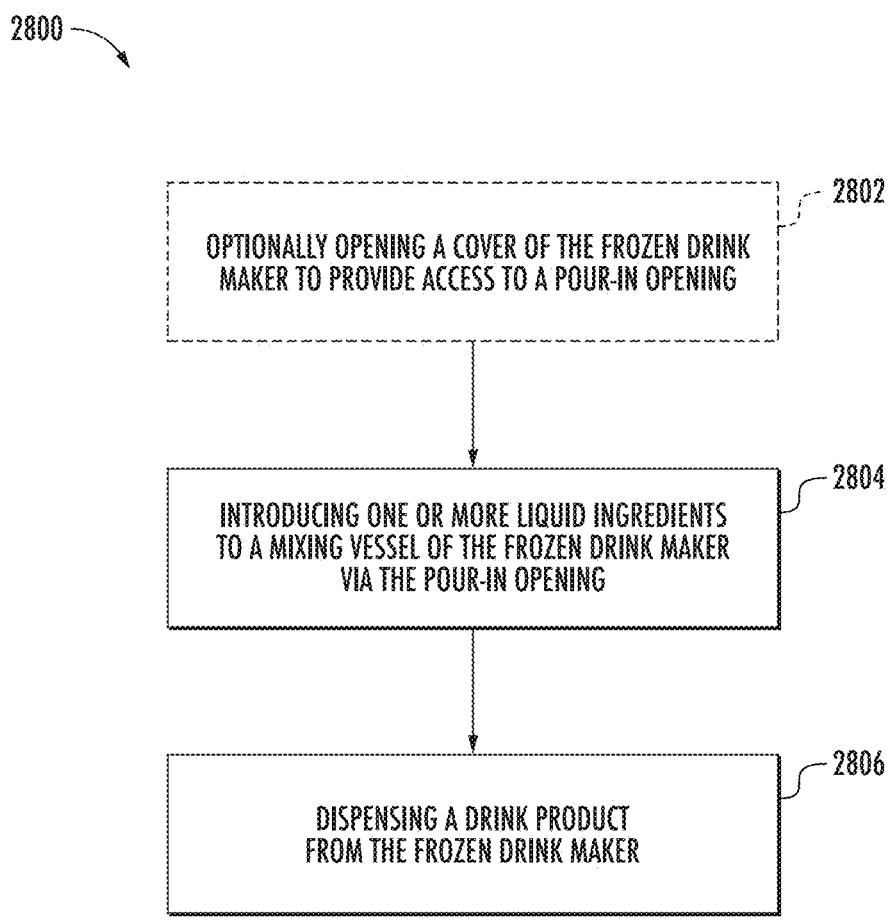
FIG. 28 shows a sample method of using a pour-in opening, according to non-limiting embodiments or aspects.

FIG. 28 illustrates a sample method 2800 of using a pour-in opening 106 for a frozen drink maker. As shown in FIG. 28, method 2800 includes optionally opening a cover of the frozen drink maker to provide access to the pour-in opening (block 2802). Method 2800 also includes introducing one or more ingredients to a mixing vessel of the frozen drink maker via the pour-in opening (block 2804). The one or more ingredients may be added to the mixing vessel while the mixing vessel is actively mixing (e.g., while the dasher is rotating). Method 2800 further includes dispensing a drink product from the frozen drink maker (block 2806). The drink product may be dispensed while the dasher is rotating, if desired.

Figure 29A:
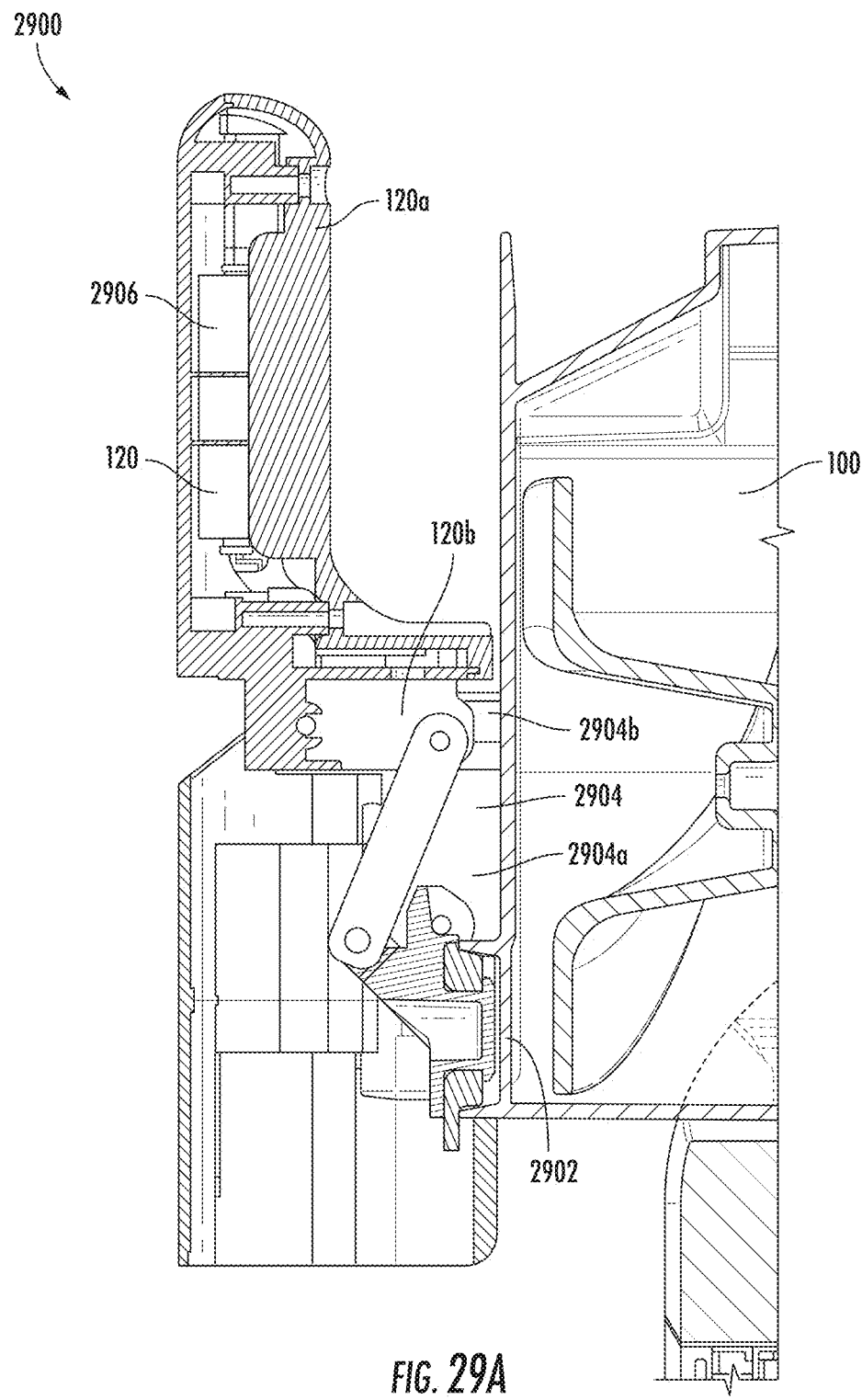
FIGS. 29A-29D show a dispenser assembly for dispensing a drink product from the frozen drink maker, according to non-limiting embodiments or aspects.

FIGS. 29A-29D show a dispenser assembly 2900 for dispensing a drink product from frozen drink maker 100, according to a first illustrative implementation of the disclosure. As shown in FIG. 29A, dispenser assembly 2900 may include dispenser housing 2904 for housing the component parts of dispenser assembly 2900. Housing 2904 may have a first portion 2904a attached to an outer surface of frozen drink maker 100 adjacent to a spout 2902 and a second portion 2904b spaced apart from spout 2902 and extending outward from the outer surface. In some non-limiting embodiments or aspects, housing 2904 may have an inverted L-shape. However, the disclosure contemplates other suitable shapes of housing 2904. Handle 120 of frozen drink maker 100 may have an upper portion 120a in the form of a user-actuatable lever 2906 and a lower portion 120b attached to second portion 2904b of housing 2904.

Figure 29B:
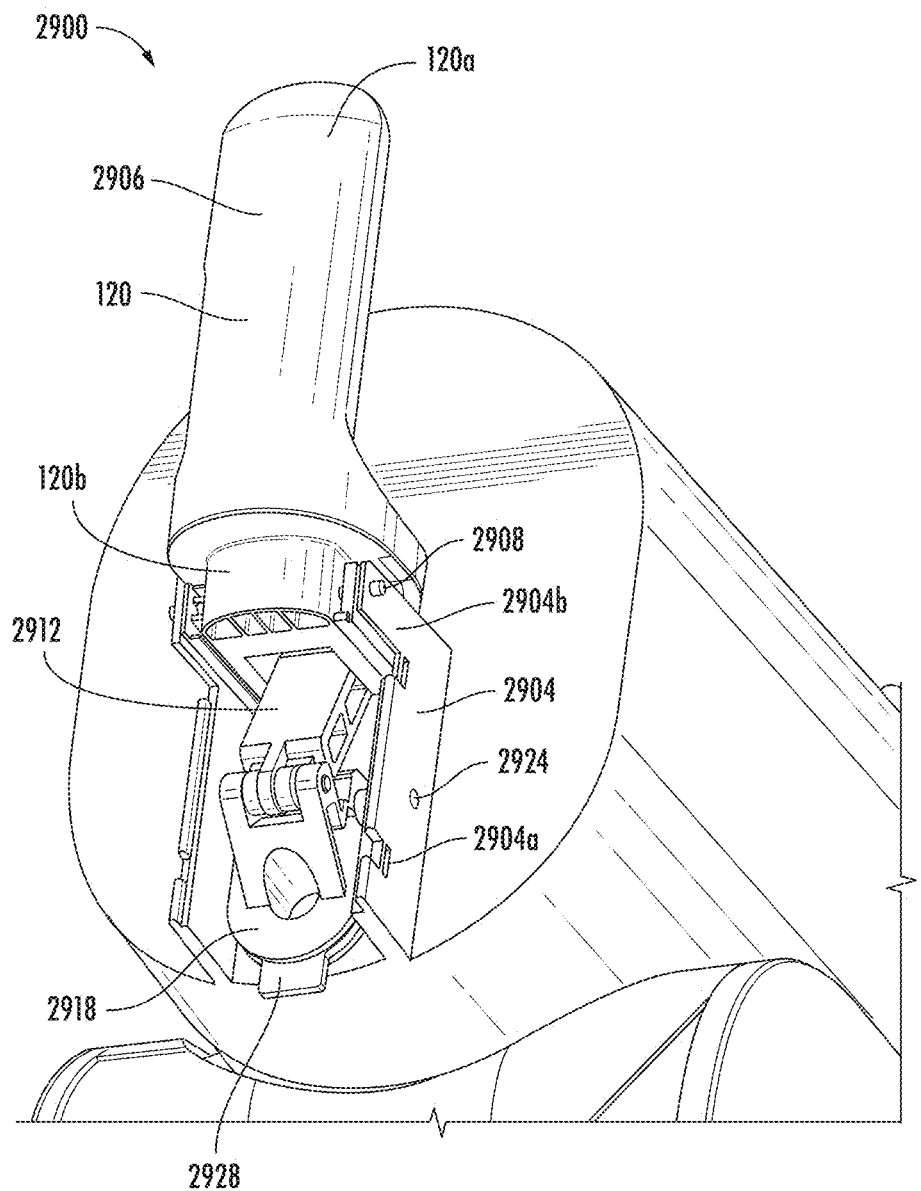
Figure 29C:
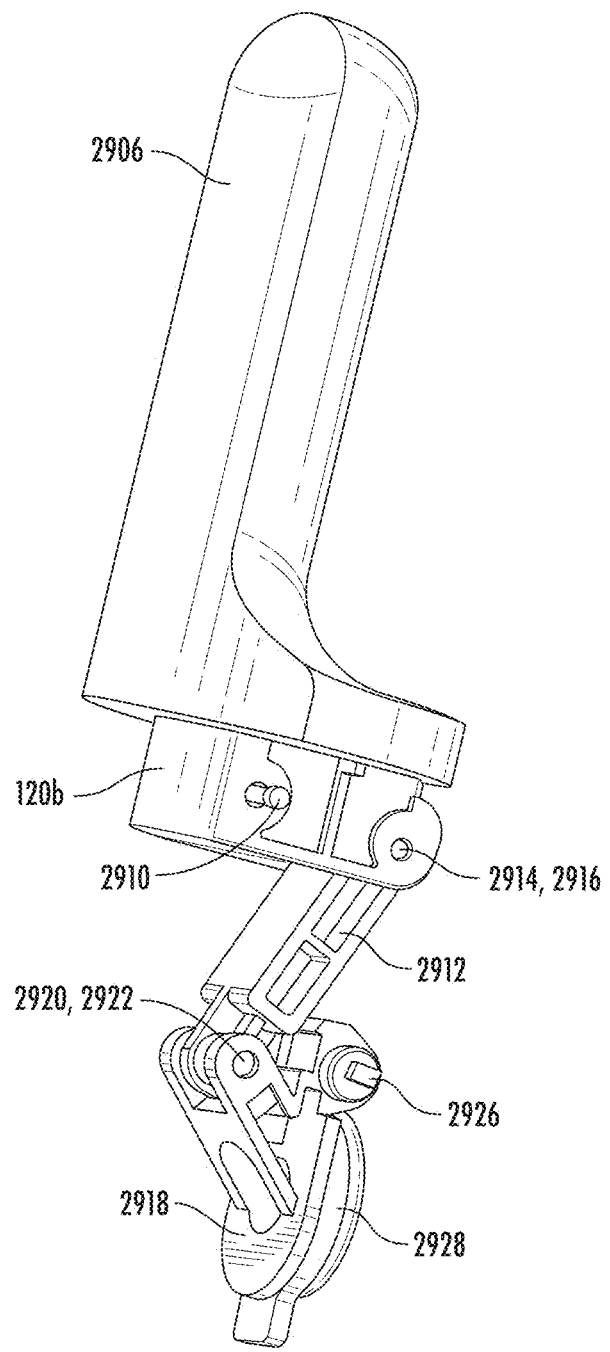
Figure 29D:
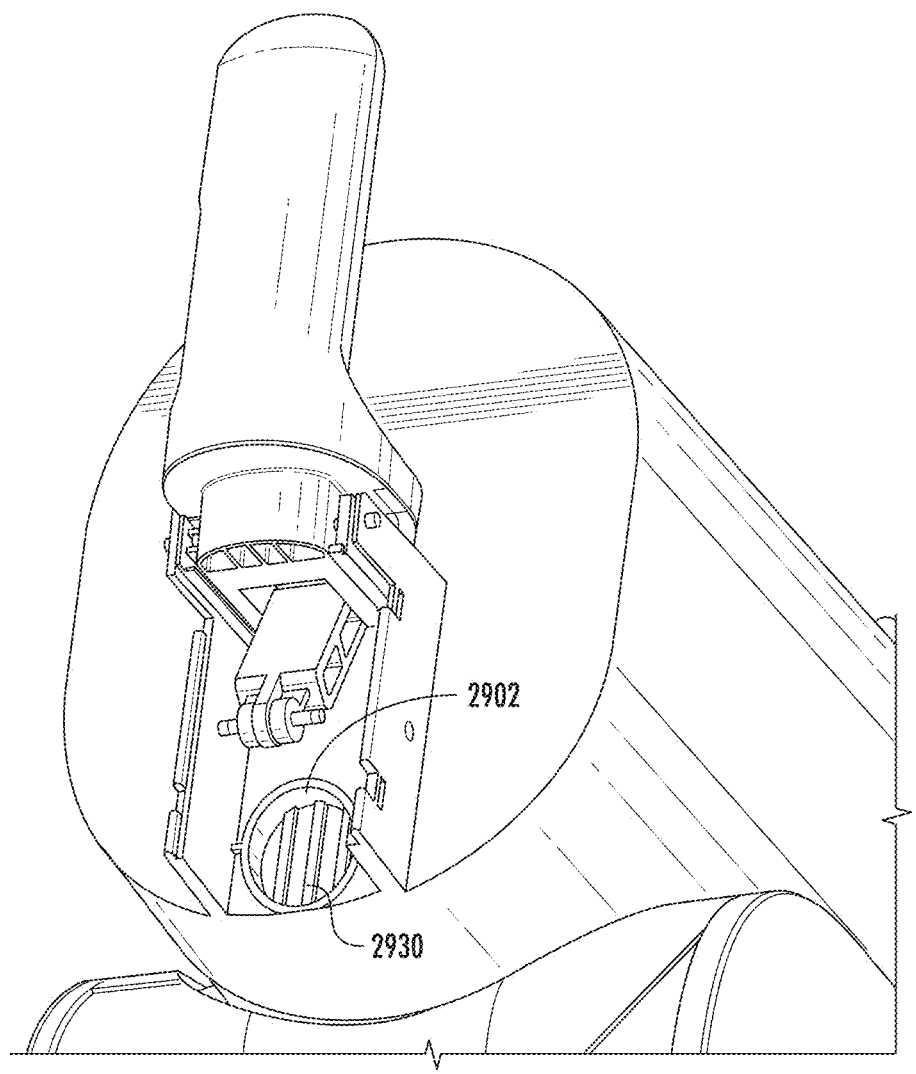

As shown in FIGS. 29B and 29C, lever 2906 may be rotatable relative to second portion 2904b of housing 2904 about a first pivot member 2908. In some non-limiting embodiments or aspects, first pivot member 2908 may be a rod or pin 2910 extending through second portion 2904b of housing 2904 and lower portion 120b of handle 120. However, the disclosure contemplates other suitable types of pivot members 2908. A link member 2912 may operatively couple to lower portion 120b of handle 120. In some non-limiting embodiments or aspects, link member 2912 may be insertable into lower portion 120b of handle 120. Link member 2912 may be rotatable relative to lever 2906 about a second pivot member 2914. In some non-limiting embodiments or aspects, second pivot member 2914 may be a rod or pin 2916 extending through link member 2912 and through lower portion 120b of handle 120. However, the disclosure contemplates other suitable types of pivot members 2914. Bracket member 2918 may operatively couple to link member 2912 and may be attached to first portion 2904a of housing 2904. In some non-limiting embodiments or aspects, link member 2912 may be insertable into a portion of bracket member 2918. Bracket member 2918 may be rotatable relative to link member 2912 about a third pivot member 2920. In some non-limiting embodiments or aspects, third pivot member 2920 may be a rod or pin 2922 extending through bracket member 2918 and link member 2912. However, the disclosure contemplates other suitable types of pivot members 2920. Bracket member 2918 may also be rotatable relative to first portion 2904a of housing 2904 about a fourth pivot member 2924. In some non-limiting embodiments or aspects, fourth pivot member 2924 may be a rod or pin 2926 extending through first portion 2904a of housing 2904 and bracket member 2918. However, the disclosure contemplates other suitable types of pivot members 2924. A seal 2928 may attach to bracket member 2918. Seal 2928 may be configured to seal spout 2902 to prevent inadvertent dispensing of the drink product. In some non-limiting embodiments or aspects, seal 2928 may be a lip seal that covers spout 2902. However, other suitable types of seals 2928 are contemplated by this disclosure. For example, in some non-limiting embodiments or aspects, seal 2928 may be, or may include, a plug that is made out of one or more relatively dense materials having a relatively high durometer and that extends into spout 2902 to seal spout 2902. Spout 2902 may include a safety grate 2930 or other mechanism to prevent the user from inadvertently inserting his or her fingers into spout 2902 (FIG. 29D).

To dispense the drink product, in some non-limiting embodiments or aspects, actuation of lever 2906 by the user may cause link member 2912 to move upward relative to housing 2904. Because bracket member 2918 is attached to both link member 2912 and to housing 2904, a portion of bracket member 2918 may move upward with link member 2912 while the remainder of bracket member 2918 is forced to pivot about fourth pivot member 2924. This in turn may cause seal 2928 to move into an open position. When seal 2928 moves into the open position, seal 2928 may uncover spout 2902 to dispense the drink product. Advantageously, in the open position, seal 2928 may be angled at about 45-60 degrees with respect to spout 2902 to direct the drink product downward toward the beverage cup. Release of lever 2906 by the user may allow the components to return to their unactuated position, allowing seal 2928 to again close spout 2902.

Figure 30A:
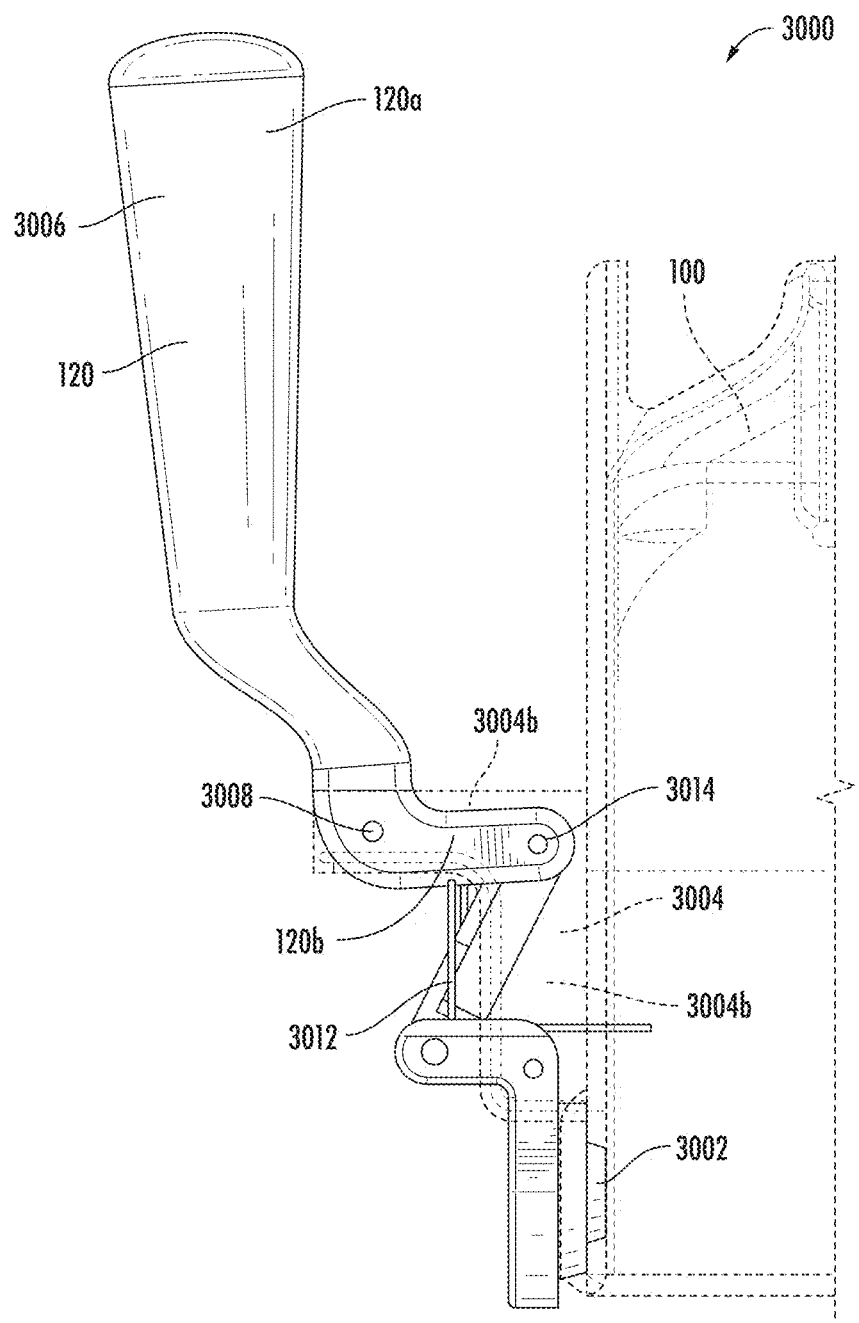
FIGS. 30A and 30B show a dispenser assembly for dispensing a drink product from the frozen drink maker, according to non-limiting embodiments or aspects.
Figure 30B:
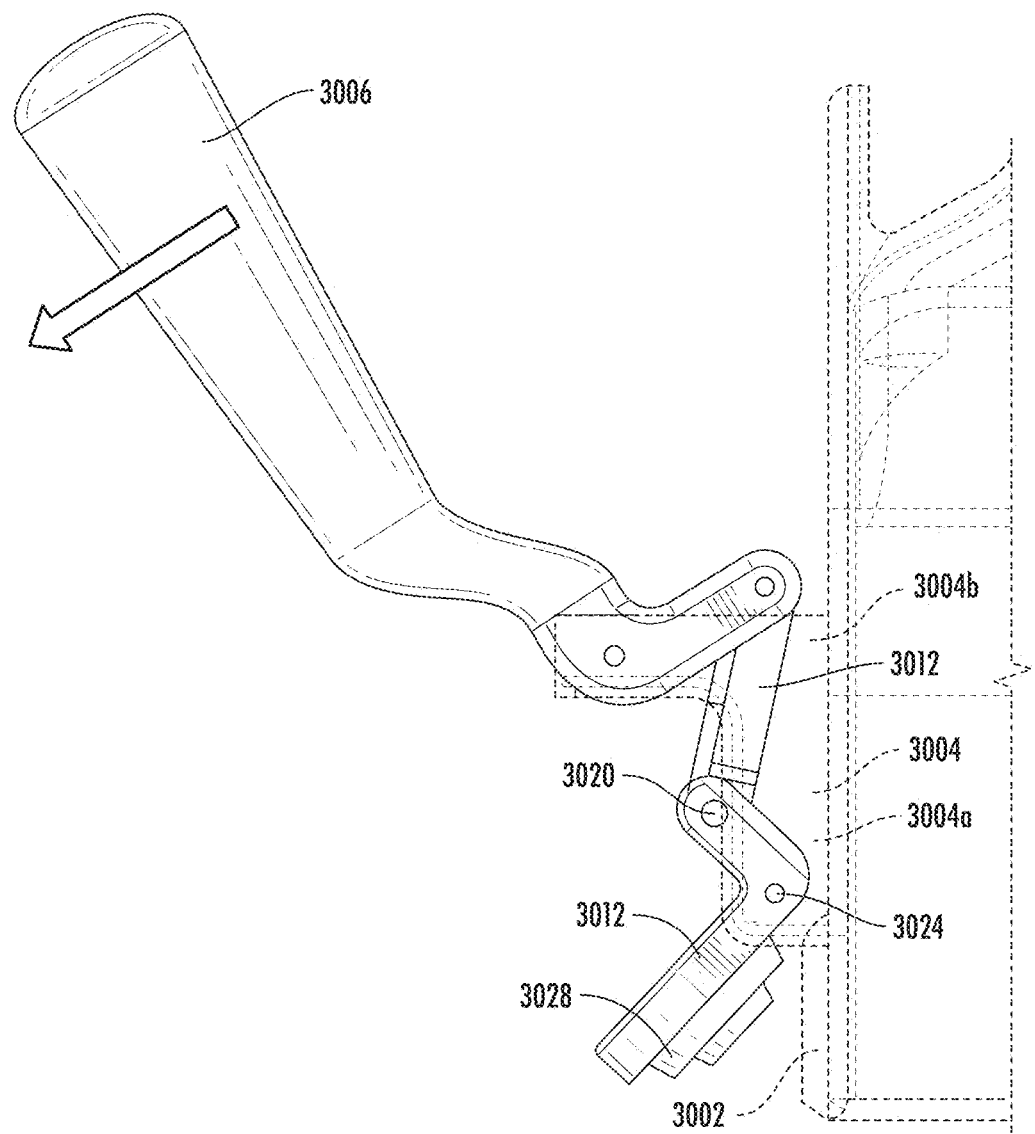

FIGS. 30A and 30B show a dispenser assembly 3000 for dispensing a drink product from frozen drink maker 100, according to a second illustrative implementation of the disclosure. Dispenser assembly 3000 may be substantially similar to dispenser assembly 2900. For example, as shown in FIG. 30A, dispenser assembly 3000 may include a dispenser housing 3004 for housing the component parts of dispenser assembly 3000. Housing 3004 may have a first portion 3004a attached to an outer surface of frozen drink maker 100 adjacent to spout 3002 and a second portion 3004b spaced apart from spout 3002 and extending outward from the outer surface. Handle 120 may have an upper portion 120a in the form of a user-actuatable lever 3006 and a lower portion 120b attached to second portion 3004b of housing 3004. Lever 3006 may be rotatable relative to second portion 3004b of housing 3004 about a first pivot member 3008. Link member 3012 may operatively couple to lower portion 120b of handle 120. Link member 3012 may be rotatable relative to lever 3006 about a second pivot member 3014.

As shown in FIG. 30B, bracket member 3018 may operatively couple to link member 3012 and may be attached to first portion 3004a of housing 3004. In some non-limiting embodiments or aspects, bracket member 3018 may have an inverted L-shape, as shown. However, the disclosure contemplates other suitable shapes of bracket member 3018. Bracket member 3018 may be rotatable relative to link member 3012 about a third pivot member 3020. Bracket member 3018 may also be rotatable relative to first portion 3004a of housing 3004 about a fourth pivot member 3024. Seal 3028 may attach to bracket member 3018. Seal 3028 may be configured to seal spout 3002 in a closed position. In some non-limiting embodiments or aspects, seal 3028 may be a lip seal that covers spout 3002. However, in some non-limiting embodiments or aspects, seal 3028 may be, or may include, a plug that is made out of one or more relatively dense materials having a relatively high durometer and that extends into spout 3002 to seal spout 3002.

To dispense the drink product, in some non-limiting embodiments or aspects, actuation of lever 3006 by the user may cause link member 3012 to move upward relative to housing 3004. Because bracket member 3018 is attached to both link member 3012 and to housing 3004, a portion of bracket member 3018 may move upward with link member 3012 while the remainder of bracket member 3018 is forced to pivot about fourth pivot member 3024. This in turn may cause seal 3028 to move into an open position. When seal 3028 moves into the open position, seal 3028 may uncover spout 3002 to dispense the drink product. Advantageously, in the open position, seal 3028 may be angled at about 45-60 degrees with respect to spout 3002 to direct the drink product downward toward the beverage cup. Release of lever 3006 by the user may allow the components to return to their unactuated position, allowing seal 3028 to again close spout 3002.

Advantageously, unlike other dispenser mechanisms, dispensing assemblies 2900, 3000 of this disclosure do not rely on leverage against the outer surface of frozen drink maker 100 to open seal 2928, 3028. This may reduce wear and tear of the component parts of dispenser assembly 2900, 3000 and on the outer surface of frozen drink maker 100. Furthermore, because seal 2928, 3028 moves both horizontally and vertically with respect to spout 2902, 3002 to unseal spout 2902, 3002, the open position of seal 2928, 3028 may provide less obstruction to the flow of the drink product from spout 2902, 3002.

Figure 31A:
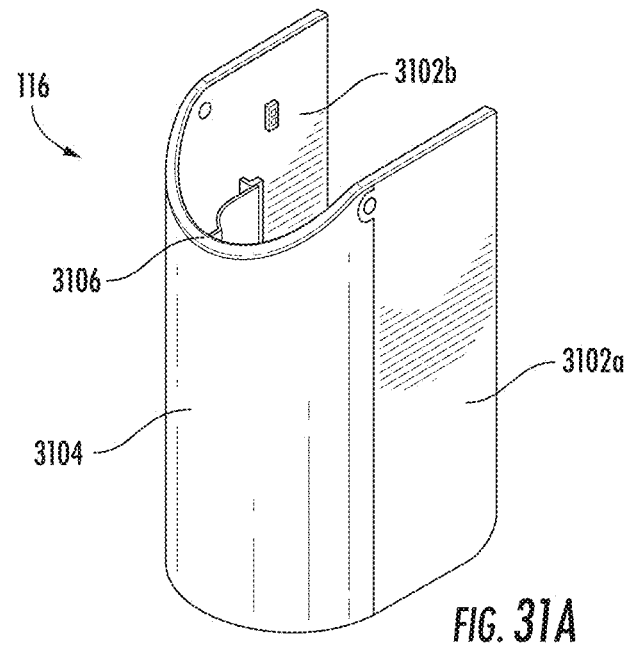
FIGS. 31A and 31B show a shroud for covering the dispenser assembly of FIGS. 29A-29D and FIGS. 30A and 30B, according to non-limiting embodiments or aspects.
Figure 31B:
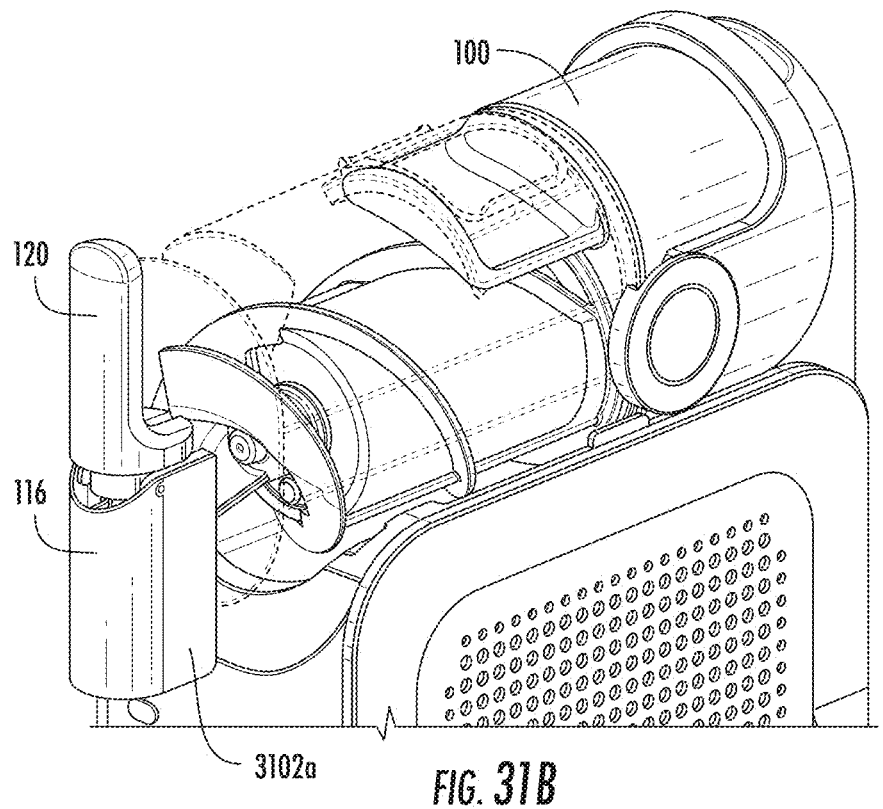

FIGS. 31A and 31B illustrate in greater detail spout cover or shroud 116 for covering a portion of dispenser assembly 2900, 3000, according to an illustrative implementation of the disclosure. As shown in FIG. 31A, shroud 116 may include a first panel section 3102a and a second panel section 3102b extending substantially parallel to one another. Front section 3104 may extend between panel sections 3102a, 3102b. In some non-limiting embodiments or aspects, panel sections 3102a, 3102b may be substantially flat, while front section 3104 may be curved, as shown. In some non-limiting embodiments or aspects, front section 3104 may include an arcuate upper edge 3106 configured such that actuation of handle 120 is not impeded. However, the disclosure contemplates other suitable shapes of upper edge 3106, such as the rectilinear shape shown in FIG. 1. As shown in FIG. 31B, panel sections 3102a, 3102b may be configured to form a removable snap fit with dispenser housing 2904, 3004. A length of shroud 116 may be selected to cover the component parts of dispensing assemblies 2900, 3000 other than handle 120 to improve the aesthetic appearance of frozen drink maker 100. The shroud 116 may also aid in directing the drink product downward toward the beverage cup. Shroud 116 may be made of a dishwasher safe material for easy cleaning.

In some non-limiting embodiments or aspects, at least front section 3104 of shroud 116 may be vertically moveable relative to dispenser assembly 2900, 3000. For example, in some non-limiting embodiments or aspects, front section 3104 may be moveable relative to first panel section 3102*a* and second panel section 3102*b*. In some non-limiting embodiments or aspects, front section 3104 may be hingedly connected to first and second panel sections 3102*a*, 3102*b* or may be vertically slidable relative first and second panel sections 3102*a*, 3102*b*. Such movement may be useful when dispensing a non-frozen, water-based beverage to prevent the beverage from dispensing at too lateral of a trajectory from spout 2902, 3002. Such a lateral trajectory may result in at least a portion of the beverage not dispensing into a receiving vessel located below spout 2902, 3002.

It should be appreciated that the various implementations described herein are not limited to making frozen or semi-frozen drinks, but may be applied to produce a cold and/or cooled drink product that is cooler than a received drink product, but not frozen or semi-frozen. For example, in some non-limiting embodiments or aspects, the same or similar mechanisms and/or techniques may be used as part of a cold drink machine and/or cooled drink maker to produce, maintain and dispense cold drinks.

As discussed with respect to FIG. 4, actions associated with configuring or controlling a frozen drink maker such as frozen drink maker 100 and processes described herein can be performed by one or more programmable processors executing one or more computer programs to control or to perform all or some of the operations described herein. All or part of frozen drink maker 100 systems and processes can be configured or controlled by special purpose logic circuitry, such as, an FPGA and/or an ASIC or embedded microprocessor(s) localized to the instrument hardware.

Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

The disclosure describes a removeable collection tray that may be disposed within the unit underneath the vessel/evaporator. The tray may be configured to collect condensation dripping off the vessel or spills resulting from filling the vessel. The tray may also be used to collect water from cleaning between uses. The tray of this disclosure may be sized to collect up to 16 ounces of liquid. The tray may also be made of a dishwasher safe material for easy cleaning.

This application describes illustrative systems, methods, and devices that provide a removeable condensation tray below vessel to reduce cleaning concerns and increase ease of use.

In some non-limiting embodiments or aspects, a removeable collection tray for a frozen drink maker includes a collection chamber for receiving liquid and a handle. The collection chamber is configured to be removably inserted into a slot in a housing of the frozen drink maker adjacent an evaporator. In some non-limiting embodiments or aspects, the collection chamber is vertically spaced from a bottom side of the housing when inserted into the slot. In some non-limiting embodiments or aspects, the collection chamber includes an evaporator-facing surface. The evaporator-facing surface has a shape corresponding to an outer surface of the evaporator. In some non-limiting embodiments or aspects, the shape is semi-cylindrical. In some non-limiting embodiments or aspects, the handle, the evaporator-facing surface, and three other side walls define the collection chamber. In some non-limiting embodiments or aspects, the collection chamber has a liquid volume capacity of 16 ounces. In some non-limiting embodiments or aspects, the removeable collection tray is made from a dishwasher-safe material. In some non-limiting embodiments or aspects, a user-facing surface of the handle is flush with a user interface of the housing when the collection chamber is fully inserted into the slot. In some non-limiting embodiments or aspects, an underside of the handle has one or more ribs for adding structural integrity between the handle and the collection chamber. In some non-limiting embodiments or aspects, the slot is defined between at least one rail and a top surface of the housing.

In some non-limiting embodiments or aspects, a method of removing a collection tray from a frozen drink maker includes removing a mixing vessel from a housing of the frozen drink maker and, after the removing of the mixing vessel from the housing, removing the collection tray from the housing. In some non-limiting embodiments or aspects, removing the mixing vessel from the housing includes removing the mixing vessel and an attached dispenser from the housing. In some non-limiting embodiments or aspects, removing the collection tray from the housing includes pulling the handle toward the user. In some non-limiting embodiments or aspects, pulling the handle toward the user includes sliding the collection tray along a slot in the housing toward the user. In some non-limiting embodiments or aspects, the method also includes fully disengaging the collection tray from the slot in the housing.

The application, in various implementations, addresses deficiencies associated with controlling slush flow within a mixing vessel of a frozen drink maker. This application describes illustrative systems, methods, and devices that use one or more internal baffles positioned within the mixing vessel to direct slush flow for thorough mixing and to prevent blockage within the mixing vessel. The one or more internal baffles, which control the flow of contents within the mixing vessel, can also reduce waste (e.g., waste caused by slush sticking to the vessel instead of dispensing through the spout).

In a first aspect, a mixing vessel for a frozen drink maker is described and the mixing vessel has at least one internal baffle. The mixing vessel includes a curved sidewall defining a substantially cylindrical vessel chamber therein. The vessel chamber includes a front, a rear, a right side, a left side, and a top. The mixing vessel also includes a corner baffle configured to control slush flow within the vessel chamber. The corner baffle is positioned at the front top of the vessel chamber on either the right side or the left side.

The mixing vessel may be configured to accommodate a dasher that rotates within the vessel chamber about a center axis and the corner baffle may be positioned such that the dasher is directed toward the corner baffle while moving upwardly within the vessel chamber. In these and other implementations, the corner baffle is positioned on the left side of the vessel chamber and the dasher is arranged to rotate in a clockwise direction. In select implementations, a distance from the center axis of the dasher to the top of the vessel chamber is less than 16 inches.

The corner baffle may extend out from the front into the vessel chamber at a relatively constant distance. In some non-limiting embodiments or aspects, the mixing vessel also includes a side baffle extending laterally along the vessel chamber from the front to the rear. The side baffle may include a curved surface that protrudes inwardly relative to a cross-section of the vessel chamber when viewed along a center axis of the vessel chamber. In these and other implementations, the side baffle is positioned on the left side or the right side of the vessel chamber. The side baffle and the corner baffle may both be positioned on either the left side or the right side of the vessel chamber. In some non-limiting embodiments or aspects, the mixing vessel also includes a front baffle positioned at the front of the vessel chamber extending across the top. In these and other implementations, the front baffle forms an angle of between 100°-150° relative the front of the vessel chamber. In various implementations in which the front baffle is present, the mixing vessel also includes a side baffle extending laterally along the vessel chamber from the front to the rear, and the corner baffle has a curved surface that extends from the side baffle to the front baffle. The substantially cylindrical vessel chamber may have an oval-shaped cross-section.

In another aspect, a mixing vessel for a frozen drink maker is described and the mixing vessel has at least three internal baffles. The mixing vessel includes a curved sidewall defining a substantially cylindrical vessel chamber therein. The vessel chamber includes a front, a rear, a right side, a left side, and a top. The mixing vessel includes a corner baffle positioned at the front top of the vessel chamber on either the right side or the left side. The mixing vessel also includes a side baffle extending laterally along the vessel chamber from the front to the rear. The mixing vessel further includes a front baffle positioned at the front of the vessel chamber extending across the top.

In some non-limiting embodiments or aspects, the side baffle and the corner baffle are both positioned on either the left side or the right side of the vessel chamber. In these and other implementations, the mixing vessel is configured to accommodate a dasher that rotates within the vessel chamber about a center axis. The corner baffle and the side baffle are positioned such that the dasher is directed toward the corner baffle and the side baffle while moving upwardly within the vessel chamber. In these and other implementations, the corner baffle and the side baffle are positioned on the left side of the vessel chamber and the dasher is arranged to rotate in a clockwise direction. In select implementations, a distance from the center axis of the dasher to the top of the vessel chamber is less than 16 inches. The corner baffle may extend out from the front into the vessel chamber at a relatively constant distance.

In yet another aspect, a frozen drink maker is described. The frozen drink maker includes a mixing vessel, a housing, a dasher, and a dispenser assembly. The mixing vessel has a front, a rear, and a curved sidewall defining a vessel chamber therein. The housing has an upper housing section abutting the rear of the mixing vessel. The dasher is arranged to rotate within the mixing vessel about a center axis. The dispenser assembly is at the front of the mixing vessel. The mixing vessel includes at least two internal baffles configured to control slush flow within the vessel chamber.

In some non-limiting embodiments or aspects, the mixing vessel includes at least three internal baffles configured to control slush flow within the vessel chamber. In some such implementations, the at least three internal baffles include: (1) a corner baffle positioned at a front top of the vessel chamber on either a right side or a left side, (2) a side baffle extending laterally along the vessel chamber from the front to the rear, and (3) a front baffle positioned at the front of the vessel chamber extending across the top. In these and other implementations, the dasher rotates in a clockwise direction, and the corner baffle and the side baffle are positioned on a left side of the vessel chamber when viewed from a front of the frozen drink maker.

The application, in various implementations, addresses deficiencies associated with controlling temperatures of drink products using recipes in a more adaptive and user-specific manner.

This application describes illustrative systems, methods, and devices that enable a drink maker to automatically control a temperature of a drink product based on a preset recipe target temperature stored in memory, while further allowing a user to adjust the preset temperature via a user input to enable the frozen drink maker to more flexibly achieve desired temperatures and/or textures tailored to the preferences of different users. The application also describes illustrative systems, methods, and devices that enable a drink maker to automatically control a temperature of a drink product based on a preset recipe target temperature stored in memory, while further monitoring a condition of a drive and/or dasher motor, such as current or power, and, if the current or power is too high, increasing the temperature of the drink product to reduce the thickness of the drink product and, thereby, reduce the current and/or power used by the drive and/or dasher motor to prevent damage to the drive motor.

In one aspect, a drink maker includes a mixing vessel arranged to receive a drink product and a dasher, driven by a drive motor, that is arranged to mix the drink product within the mixing vessel. The drink maker also includes a cooling circuit and/or device arranged to cool the drink product within the mixing vessel, a temperature sensor arranged to measure a temperature associated with the drink product and output a temperature signal, and a memory arranged to store a drink object representing a drink type, the drink object specifying a first temperature value corresponding to a first target temperature. A controller, in communication with the memory, is arranged to: i) receive the temperature signal, and ii) control the temperature associated with the drink product by controlling the cooling circuit based on the received temperature signal, the first temperature value, and/or a manual temperature adjustment and/or temperature offset. The frozen drink maker also includes a user interface arranged to receive a user input to adjust the manual temperature adjustment.

The temperature associated with the drink product may include a temperature of the drink product, a temperature of a cooling element used to cool the drink product, and/or a temperature of a refrigerant used to cool the drink product. The controller may adjust the first target temperature by adding the manual temperature adjustment to the first target temperature. The manual temperature adjustment may include positive or negative temperature value. The manual temperature adjustment may include a range of temperatures at, above, and below the first target temperature. The manual temperature adjustment may be adjustable in increments of greater than or equal to 0.1, 0.2, 0.3, 0.4, 0.5, 1, and/or 2 degrees Celsius.

In some non-limiting embodiments or aspects, the memory includes a plurality of recipes, each of the recipes including a temperature value corresponding to a target temperature. The cooling circuit and/or device may include a refrigeration circuit including an evaporator. The evaporator may be part of the closed loop refrigeration circuit and/or system including a condenser and a compressor. The controller may be configured to control the temperature associated with the drink product by activating the compressor to circulate refrigerant through the evaporator to cool the drink product and deactivating the compressor to stop a flow of refrigerant through the evaporator to stop cooling of the drink product. The controller may control the temperature associated with the drink product by comparing the received temperature signal to the first temperature value, adjusted based on the manual temperature adjustment, and, in response, activating or deactivating the cooling circuit to match the received temperature signal to the first temperature value, adjusted by the manual temperature adjustment, and, thereby, adjust the temperature associated with the drink product to about the target temperature adjusted by the manual temperature adjustment. In some non-limiting embodiments or aspects, the cooling circuit includes a thermal energy cooling (TEC) system implementing, for example, the Peltier effect.

In another aspect, a method for making a drink product includes: receiving, into a mixing vessel, the drink product; mixing, using a dasher driven by a drive motor, the drink product within the mixing vessel; cooling, using a cooling circuit, the drink product within the mixing vessel; measuring, via a temperature sensor, a temperature associated with the drink product and outputting a temperature signal; storing, in a memory, a drink object representing a drink type, the drink object specifying a first temperature value corresponding to a first target temperature; receiving, at a controller, the temperature signal; controlling, by the controller, the temperature associated with the drink product by controlling the cooling circuit based on the received temperature signal, the first temperature value, and a manual temperature adjustment; and receiving a user input to adjust the manual temperature adjustment.

In a further aspect, a drink maker includes a mixing vessel arranged to receive a drink product and a dasher, driven by a drive motor, arranged to mix the drink product within the mixing vessel. The drink maker also includes a cooling circuit arranged to cool the drink product within the mixing vessel, a temperature sensor arranged to measure a temperature associated with the drink product and output a temperature signal, a motor condition sensor arranged to measure a motor condition associated with the drive motor and output a motor condition signal, and a memory arranged to store a first temperature value corresponding to a first target temperature and store a motor condition limit. A controller, in communication with the memory, is arranged to: i) receive the temperature signal, ii) receive the motor condition signal, and iii) control the temperature associated with the drink product by controlling the cooling circuit based at least on the received temperature signal, the received motor condition signal, the first temperature value, and the motor condition limit.

In some non-limiting embodiments or aspects, the controller deactivates the cooling circuit when a magnitude (e.g., a current or power level) of the received motor condition signal is equal to or greater than the motor condition limit. The controller may determine a second temperature value corresponding to a second target temperature, where the magnitude of the received motor condition signal is lower than the motor condition limit. The controller may control the temperature associated with the drink product by controlling the cooling circuit based on the second temperature value. In some non-limiting embodiments or aspects, the controller deactivates the cooling circuit until the temperature associated with the drink product is about equal to the second target temperature.

The motor condition may include current, power, torque, speed of rotation, acceleration of rotation, noise, and/or thermal output. The motor condition sensor may include a motor current sensor, motor voltage sensor, motor torque sensor, motor rotation sensor, acoustic sensor, and/or temperature sensor. A user interface may be arranged to receive a user input to adjust a manual temperature adjustment. The controller may control the temperature associated with the drink product by controlling the cooling circuit based on the received temperature signal, the received motor condition signal, the first temperature value, the motor condition limit, and/or the manual temperature adjustment. The controller may adjust the first target temperature by adding the manual temperature adjustment to the first target temperature.

In yet a further aspect, a method for making a drink product includes: receiving, in a mixing vessel, the drink product; mixing, using a dasher driven by a drive motor, the drink product within the mixing vessel; cooling, using a cooling circuit, the drink product within the mixing vessel; measuring, via a temperature sensor, a temperature associated with the drink product and output a temperature signal; measuring, via a motor condition sensor, a motor condition associated with the drive motor and outputting a motor condition signal; storing, in a memory, a first temperature value corresponding to a first target temperature and storing a motor condition limit; receiving, at a controller, the temperature signal and the motor condition signal; and controlling the temperature associated with the drink product by controlling the cooling circuit based on the received temperature signal, the received motor condition signal, the first temperature value, and/or the motor condition limit.

The application, in various implementations, addresses deficiencies associated with cooling components of a drink maker.

This application describes illustrative systems, methods, and devices whereby a dual-use cooling fan concurrently provides cooling air flow to both a drive motor used to drive rotation of a dasher, and a condenser used to cool refrigerant of a refrigeration circuit and/or system of the drink maker.

In one aspect, a drink maker includes a mixing vessel arranged to receive a drink product and a dasher, driven by a drive motor, arranged to mix the drink product within the mixing vessel. A refrigeration circuit is arranged to cool the drink product within the mixing vessel including a condenser. A cooling fan is configured to concurrently cool the drive motor and the condenser. In some non-limiting embodiments or aspects, the cooling fan is driven by the drive motor either directly or via a gear assembly, and therefore is activated when the drive motor is activated.

The cooling fan may provide air flow through the condenser to cool refrigerant flowing through the condenser. The cooling fan may provide air flow along a surface of the drive motor to cool the drive motor. The cooling fan, drive motor, and condenser may be positioned such that air flow generated by the cooling fan passes serially through the condenser and along a surface of the drive motor. A first portion of air flow generated by the cooling fan may cool the condenser and a second portion of air flow generated by the cooling fan may cool the drive motor. In another implementation, air flow generated by the cooling fan passes in parallel through the condenser and along a surface of the drive motor such that a first portion of the air flow passes through the condenser, while a second portion of the air flow passes along a surface of the drive motor. The condenser may include one or more coils wound in a serpentine arrangement. Each of the one or more coils may include a plurality of thermal transfer fins. When the cooling fan provides air flow through the condenser to cool refrigerant flowing through the condenser, the air flow may travel adjacent to and/or around the plurality of coils.

A cooling channel may extend between the cooling fan and the drive motor, where the cooling channel provides cooling air flow between the cooling fan and the drive motor. The cooling channel may be at least partially formed by a duct. A cooling channel may extend between the cooling fan and the condenser, where the cooling channel provides cooling air flow between the cooling fan and the condenser. The cooling channel may be at least partially formed by a duct. The cooling fan may include a centrifugal fan, a cross-flow fan, a tangential fan, a volute fan, a backward curved fan, a forward curved fan, a blower fan, a squirrel-cage fan, and/or an axial fan.

In another aspect, a cooling fan is configured for cooling a drive motor and a condenser within a housing of a drink maker, where the drive motor is configured to drive rotation of a dasher within a mixing vessel of the drink maker and the condenser is configured to cool a refrigerant circulating within a refrigeration system of the drink maker. The cooling fan includes an air inlet configured to receive an air flow from the ambient environment, an impeller configured to generate the air flow, and an air outlet configured to output the air flow through the condenser and along a surface of the drive motor. The cooling fan may include an air channel arranged to direct the air flow through the condenser and along the surface of the drive motor. The air channel may be at least partially formed by an air duct. The cooling fan may include a centrifugal fan, a cross-flow fan, a tangential fan, a volute fan, a backward curved fan, a forward curved fan, a blower fan, a squirrel-cage fan, and/or an axial fan.

In a further aspect, a method for concurrently cooling a condenser and a drive motor within a housing of a drink maker using a cooling fan includes: activating the drive motor that is arranged to drive rotation of a dasher within a mixing vessel of the drink maker; activating a compressor of a refrigeration system of the drink maker; and activating the cooling fan to concurrently generate air flow through the condenser and along a surface of the drive motor. In some non-limiting embodiments or aspects, the cooling fan is coupled to and/or driven to rotate by the drive motor. The method may include receiving a user input to activate the drive motor, the compressor, and the cooling fan. The user input may initiate a recipe and/or computer program, controlled by a controller, that automatically activates the drive motor, the compressor, and the cooling fan.

One of ordinary skill will recognize that the systems, methods, and devices described herein may apply to other types of food products, such as to the making and/or processing of, without limitation, ice cream, frozen yogurt, other creams, and the like. While the present disclosure describes examples of a drink maker processing various frozen and/or semi-frozen drink products, the systems, devices, and methods described herein are not limited to such drink products and are capable of processing and/or making other types of drink products, such as cooled drink products and/or chilled drink products. The terms "mix," "mixed" or "mixing" as used herein are not limited to combining multiple ingredients together, but also include mixing a drink product or liquid having a single or no added ingredients. For example, a drink product may consist of only water that is mixed by a dasher during processing, e.g., portions of the water are churned and/or intermingled as the dasher rotates. This may, for example, advantageously enable a more uniform temperature of the water and/or liquid as a whole within the mixing vessel by intermingling portions of the water and/or liquid having different temperatures.

The application, in various implementations, addresses deficiencies associated with fluid inlets for frozen drink makers. Previous frozen drink makers were typically sized for commercial applications. Commercial frozen drink makers have significant headspace above the slush in the vessel. In a commercial frozen drink maker, ingredients can be roughly poured into an open top of the vessel without concern of losing liquids due to splashing or ingredient expansion generated by impact force.

This application describes illustrative systems, methods, and devices that address shortcomings of how liquids are added to a vessel for a frozen drink maker. In particular, a pour-in opening for a frozen drink maker is described that allows ingredients to be added to the vessel in a controlled manner, thereby minimizing or preventing slush overflow. The disclosed pour-in opening can be used with both commercial frozen drink makers or residential frozen drink makers having a smaller vessel capacity and less available headspace than commercial units. The pour-in opening advantageously avoids external splatter and spillage of ingredients as they are added to the vessel and prevents finger insertion (to protect users from moving componentry within the vessel). The pour-in opening also prevents slush contained within the vessel from being pushed out of the vessel.

In some aspects, a pour-in opening for a frozen drink maker is described. The frozen drink maker has a dasher configured to rotate within a mixing vessel about a center axis. The pour-in opening includes a surface that inclines radially with respect to the center axis of the dasher. The pour-in opening also includes an aperture positioned on the surface in fluid communication with an interior of the mixing vessel. The surface may be sloped to direct fluids entering the mixing vessel to enter in the direction of dasher rotation. In some non-limiting embodiments or aspects, the aperture extends laterally along the surface in a direction parallel to the center axis of the dasher. The aperture may be shaped as a slot. In some non-limiting embodiments or aspects, the surface incline directs ingredients to enter the mixing vessel in an entry direction and the entry direction is the same as a rotation direction of the dasher. In some such implementations, the rotation direction of the dasher is clockwise when viewed from a front of the frozen drink maker. In these and other implementations, the aperture is positioned on a right side of the mixing vessel when viewed from the front of the frozen drink maker. A grate may cover at least a portion of the aperture, if desired. In these and other implementations, there may also be a cover moveable between an open position in which the pour-in opening is accessible to a user and a closed position in which the pour-in opening is not accessible to the user. In select implementations, the pour-in opening may also include a lip extending up from a perimeter of the surface to form a well that feeds into the aperture. The pour-in opening may be located approximate to a rear of the mixing vessel when viewed from a front of the frozen drink maker. In these and other implementations, a rotation of the dasher moves contents of the mixing vessel from the rear of the mixing vessel to a front of the mixing vessel.

In another aspect, a vessel for a frozen drink maker is described. The vessel includes a chamber and a pour-in opening. The chamber is a substantially cylindrical chamber sized to accommodate a dasher configured to rotate within the vessel about a center axis. The pour-in opening is positioned on a top section of the vessel. The pour-in opening includes a surface and an aperture. The surface inclines radially with respect to the center axis of the dasher. The aperture is positioned on the surface in fluid communication with the chamber. In some non-limiting embodiments or aspects, the pour-in opening is positioned at a rear of the vessel. In these and other implementations, the surface of the pour-in opening inclines radially to direct incoming ingredients to enter the vessel in an entry direction, and the entry direction is the same as a rotation direction of the dasher. In select implementations, the rotation direction of the dasher is clockwise and the aperture is positioned on a right side of the vessel when viewed from a front of the vessel. In some non-limiting embodiments or aspects, the vessel also includes a cover positioned over the pour-in opening and the cover is moveable between an open position in which the pour-in opening is accessible to a user and a closed position in which the pour-in opening is not accessible to the user.

In further aspects, a frozen drink maker is described. The frozen drink maker includes a mixing vessel having a substantially cylindrical chamber, a dasher configured to rotate within the mixing vessel about a center axis, and a pour-in opening positioned on a top of the mixing vessel. The pour-in opening has a surface that inclines radially with respect to the center axis of the dasher and an aperture positioned on the surface in fluid communication with the chamber. In some non-limiting embodiments or aspects, the center axis of the dasher extends in a horizontal direction. In these and other implementations, the aperture extends laterally along the surface in a direction parallel to the center axis of the dasher. The surface inclines radially to direct incoming ingredients to enter the mixing vessel in an entry direction, and the entry direction is the same as a rotation direction of the dasher. In select implementations, the rotation direction of the dasher is clockwise when viewed from a front of the frozen drink maker and the aperture is positioned on a right side of the mixing vessel when viewed from the front of the frozen drink maker.

The disclosure describes a low-maintenance dispensing system for a frozen drink maker that uses a lip seal rather than a plunger seal. The dispensing mechanism includes several pivoting linkages that operate to swing the seal up when a user actuates a dispensing lever. In the open position, the seal is angled about 45-60 degrees with respect to the spout, which helps to direct the dispensed drink product downward. The spout opening also includes a safety grate to prevent the user from inadvertently inserting his or her fingers into the spout.

This application describes illustrative systems, methods, and devices that provide a dispenser assembly for dispensing a drink product through a spout of a frozen drink maker.

In some exemplary implementations, a dispenser assembly for a frozen drink maker of this disclosure includes a housing having a first portion attached to an outer surface of the frozen drink maker adjacent to a spout, and a second portion spaced apart from the spout and extending outward from the outer surface. A lever attaches to the second portion of the housing. The lever is rotatable relative to the second portion of the housing about a first pivot member. A seal operatively couples to the lever. The seal is configured to seal the spout in a closed position. Rotation of the lever causes the seal to move into an open position to allow dispensing of a drink product through the spout.

In some non-limiting embodiments or aspects, a link member operatively couples to the lever. The link member is rotatable relative to the lever about a second pivot member. A bracket member operatively couples to the link member and attaches to the first portion of the housing. The bracket member is rotatable relative to the link member about a third pivot member and rotatable relative to the first portion of the housing about a fourth pivot member. The seal is attached to the bracket member.

In some non-limiting embodiments or aspects, the second pivot member is a pin extending through the lever and through the link member. In some non-limiting embodiments or aspects, the third pivot member is a pin extending through the bracket member and through the link member. In some non-limiting embodiments or aspects, the fourth pivot member is a pin extending through the first portion of the housing and through the bracket member. In some non-limiting embodiments or aspects, the seal is angled at about 45-60 degrees with respect to the spout when the seal is in the open position. In some non-limiting embodiments or aspects, the spout includes a grate configured to prevent a user from inserting fingers into the spout. In some non-limiting embodiments or aspects, the first pivot member includes a pin extending through the second portion of the housing and through the lever. In some non-limiting embodiments or aspects, the seal is a lip seal. In some non-limiting embodiments or aspects, the bracket member is L-shaped. In some non-limiting embodiments or aspects, the housing is L-shaped.

In some non-limiting embodiments or aspects, a method of dispensing a drink product through a spout of a frozen drink maker of this disclosure includes rotating a lever about a first pivot member relative to a second portion of a housing of a dispenser assembly. The housing further includes a first portion attached to an outer surface of the frozen drink maker adjacent to the spout and the second portion spaced apart from the spout and extending outward from the outer surface. Rotating the lever causes a seal operatively coupled to the lever to move into an open position to allow dispensing of the drink product through the spout. The seal is configured to seal the spout in a closed position.

In some non-limiting embodiments or aspects, the dispenser assembly further includes a link member operatively coupled to the lever, and rotating the lever causes the link member to rotate relative to the lever about a second pivot member. In some non-limiting embodiments or aspects, the dispenser assembly further includes a bracket member operatively coupled to the link member and attached to the first portion of the housing, and rotating the lever causes the bracket member to rotate relative to the link member about a third pivot member and to rotate relative to the first portion of the housing about a fourth pivot member. In some non-limiting embodiments or aspects, the seal is attached to the bracket member.

The disclosure describes a shroud for attaching to a dispenser assembly of a frozen drink maker. The shroud is configured to direct the drink product downward toward a beverage cup without interfering with the movement of the dispenser lever. The shroud also hides components of the dispenser assembly for a more pleasing aesthetic appearance and is removable for easy cleaning.

This application describes illustrative systems, methods, and devices that provide a shroud for attaching to a dispenser assembly for directing a drink product downward toward a beverage cup.

In some non-limiting embodiments or aspects, a shroud for a dispenser assembly of a frozen drink maker of this disclosure includes a first panel section and a second panel section extending substantially parallel to the first panel section. A front section extends between the first and second panel sections. The first and second panel sections are configured to form a removable snap fit with a dispenser housing of the dispenser assembly.

In some non-limiting embodiments or aspects, the front section is curved. In some non-limiting embodiments or aspects, a vertical position of at least the front section of the shroud is adjustable relative to the dispenser assembly. In some non-limiting embodiments or aspects, the front section defines an upper edge. A shape of the upper edge is configured to allow actuation of a handle of the dispenser assembly. In some non-limiting embodiments or aspects, a shape of the upper edge is arcuate. In some non-limiting embodiments or aspects, a shape of the upper edge is rectilinear. In some non-limiting embodiments or aspects, a length of the shroud is selected to cover component parts of the dispenser assembly. In some non-limiting embodiments or aspects, a length and shape of the shroud is selected to direct a drink product dispensed from a spout of the frozen drink maker downward. In some non-limiting embodiments or aspects, the shroud is made from a dishwasher safe material. In some non-limiting embodiments or aspects, the front section is moveable relative to the first panel section and the second panel section. In some non-limiting embodiments or aspects, the front section is hingedly connected to the first panel section and the second panel section. In some non-limiting embodiments or aspects, the front section is vertically slidable relative to the first panel section and the second panel section. In some non-limiting embodiments or aspects, the first panel section is flat. In some non-limiting embodiments or aspects, the second panel section is flat.

Referring now to FIGS. 32A-32C, shown is a cross-sectional profile view of dispenser assembly 3200, according to some non-limiting embodiments or aspects. For example, FIG. 32A shows a cross-sectional profile view of dispenser assembly 3200 in a rest position, FIG. 32B shows a cross-sectional profile view of dispenser assembly 3200 in a first position, and FIG. 32C shows a cross-sectional profile view of dispenser assembly 3200 in a second position. Each of FIGS. 32A-32C may represent a stage of a multi-stage dispensing operation of dispenser assembly 3200.

With further reference to FIGS. 32A-32C, dispenser assembly 3200 may include an upper member 3222 configured to connect to a lever (e.g., lever 2906) via lever platform 3226. In some-non limiting embodiments or aspects, lever platform 3226 may be formed coextensively with a lower portion of the lever that is pulled by the user. Additionally, or alternatively, lever platform 3226 may be connected to the lever that is pulled by the user. Upper member 3222 may include a bracket, wherein an upper portion of the bracket is lever platform 3226. Upper member 3222 may include a first opening 3224. In some non-limiting embodiments or aspects, first opening 3224 may be configured to engage with (e.g., anchor) a handle, a spring (not shown), and/or the like. Additionally or alternatively, a spring (not shown) may engage with dispenser assembly 3200 to provide a biasing force to return a connected lever to a rest position. In some non-limiting embodiments or aspects, the spring may be a butterfly spring (e.g., centered on pivot member 3210).

In some non-limiting embodiments or aspects, upper member 3222 may include a first pivot member 3220, through which may be received a pin or rod to affix upper member 3222 rotatably about first pivot member 3220. When the user pulls the lever in a first rotational direction (e.g., away from mixing vessel 104), upper member 3222 may rotate about first pivot member 3220. A lower portion of upper member 3222 may be connected to and/or extend into a first link member 3218. First link member 3218 may be connected at a first end to the lever (e.g., via lever platform 3226) and may include a cam at a second end opposite the first end, the cam being defined by a cambered slot 3216 within a wall of first link member 3218.

In some non-limiting embodiments or aspects, dispenser assembly 3200 may include second link member 3212. Second link member 3212 may be connected at a first end of second link member 3212 to bracket member 3206. Bracket member 3206 may be configured to support seal 3202 (e.g., where seal 3202 is mounted on bracket member 3206). A second end of second link member 3212 may be slidably connected to the cam of first link member 3218. For example, a second end of second link member 3212 may include pin 3214, which may be received in cambered slot 3216 of the cam. In some non-limiting embodiments or aspects, cambered slot 3216 may be a V-shaped (e.g., 50-130 degree interior angle, such as in FIG. 39), and/or L-shaped slot (e.g., 80-100 degree interior angle, such as in FIG. 38) including a first slot length (e.g., depicted horizontally in FIG. 32A) and a second slot length (e.g., depicted vertically in FIG. 32A). In some non-limiting embodiments or aspects, the second slot length may be angled between 80 and 100 degrees (e.g., of an interior angle) relative to the orientation of the first slot length. In some non-limiting embodiments or aspects, the second slot length may be angled greater than 80 degrees relative to the orientation of the first slot length, including greater than 120 degrees relative to the orientation of the first slot length, including 130 degrees (see, e.g., FIG. 39). As second link member 3212 is pulled into motion by the action of pin 3214 in cambered slot 3216, second link member 3212 may cause bracket member 3206, and thereby seal 3202, to rotate about second pivot member 3210. Bracket member 3206 may be rotatably fixed at second pivot member 3210 with a rod or pin 3214 secured therein.

In this manner, as the lever is pulled forward, lever platform 3226 is pulled forward, which pulls first link member 3218 downward, which causes pin 3214 to slide along the first slot length of cambered slot 3216 to arrive at the vertex of cambered slot 3216 (e.g., the first position shown in FIG. 32B). This motion from FIG. 32A to FIG. 32B may present a first (e.g., lesser) resistance to the user's pulling, as pin 3214 slides horizontally across the first slot length of cambered slot 3216. As the lever is pulled farther forward, lever platform 3226 is pulled further forward in the same direction, which pulls first link member 3218 farther forward, which causes pin 3214 to slide along the second slot length of cambered slot 3216, arriving at a second position as depicted in FIG. 32C. The motion from FIG. 32B to FIG. 32C may present a second (e.g., greater) resistance to the user's pulling, as pin 3214 slides along a steeper angled surface of the cambered slot 3216. The shape of the cambered slot 3216 combined with a spring (e.g., a butterfly spring) may allow the user to pull at a first strength to move dispenser assembly 3200 from a rest position in FIG. 32A to a first position in FIG. 32B, and then to pull at a second strength to move dispenser assembly 3200 from the first position in FIG. 32B to the second position in FIG. 32C. The user may control the overall opening of a spout through selective control and pulling of the lever, including pulling through each point at and between the rest position, first position, and second position. For example, the user may allow only minimal drink product flow by pulling the lever a distance less than the first distance required to reach the first position. Similarly, the user may pull the lever to a distance past the first position but not to the second position, to allow a more moderate flow of drink product.

In some non-limiting embodiments or aspects, seal 3202 may entirely close spout 3230 of mixing vessel 104 of the drink maker when the lever is in the rest position (shown in FIG. 32A). As shown in FIG. 32A, an entire perimeter of seal 3202 may provide a fluid seal against fluid flow of drink product, preventing leakage from spout 3230. The biasing force of a spring (e.g., connected to first opening 3224, centered on pivot member 3210, centered on pivot member 3220, etc.) may hold seal 3202 firmly against spout 3230.

In some non-limiting embodiments or aspects, the user may apply a force to (e.g., pull) the lever (e.g., attached to lever platform 3226) in a first rotational direction (e.g., away from mixing vessel 104). As the user applies a first force, the user will meet a first resistance, caused by the configuration of the biasing force of the spring and the interconnection of pin 3214 in cambered slot 3216 (e.g., the first slot length thereof). When the user's applied force overcomes the biasing force of the spring, the lever may cause lever platform 3226 to move with the lever, which may cause upper member 3222 and first link member 3218 to tilt, which may cause pin 3214 to move along a first slot length of cambered slot 3216, until pin 3214 comes to rest in a vertex of cambered slot 3216, as shown in FIG. 32B. In some non-limiting embodiments or aspects, the cam (e.g., cambered slot 3216) and/or pin 3214 may be formed of a low-friction, durable material (e.g., polyoxymethylene (POM), polytetrafluoroethylene (PTFE), ultra-high molecular weight polyethylene (UHMWPE), polyetheretherketone (PEEK), polycarbonate (PC), nylon (polyamide), and/or the like).

In some non-limiting embodiments or aspects, when dispenser assembly 3200 has arrived at the configuration of FIG. 32B, the lever and dispenser assembly 3200 may be in a first position, and seal 3202 may be at a first angle. In the first position, a majority of an outer perimeter of seal 3202 may continue to contact and block a majority of liquid flow from spout 3230 of mixing vessel 104, however, a recessed channel 3204 in seal 3202 may permit some liquid flow through recessed channel 3204 of the seal 3202. The first position, therefore, may be particularly well configured for dispensing low-viscosity liquids (e.g., chilled, non-frozen or partially frozen drink product) and/or releasing drink product slowly. Instead of opening wide, allowing drink product to spill uncontrollably from spout 3230, the configuration of the first position promotes clean, controlled dispensing by urging the released drink product from spout 3230 and along recessed channel 3204 of seal 3202. Controlled release from spout 3230 prevents loss of drink product as it travels to a container, such as a beverage container.

In some non-limiting embodiments or aspects, the user may apply a second force to (e.g., pull) the lever (e.g., attached to lever platform 3226) in the first rotational direction (e.g., away from mixing vessel 104). As the user applies a second force (e.g., greater than the first force), the user will meet a second resistance (e.g., greater than the first resistance), caused by the configuration of the biasing force of the spring and the interconnection of pin 3214 in cambered slot 3216 (e.g., the second slot length thereof). When the user's applied force overcomes the biasing force of the spring, the lever may cause lever platform 3226 to move with the lever, which may cause upper member 3222 and first link member 3218 to tilt further, which may cause pin 3214 to move along a second slot length of cambered slot 3216, until pin 3214 comes to rest at an end of cambered slot 3216, as shown in FIG. 32C.

In some non-limiting embodiments or aspects, when dispenser assembly 3200 has arrived at the configuration of FIG. 32C, the lever and dispenser assembly 3200 may be in a second position, and seal 3202 may be at a second angle (e.g., greater than the first angle). In the second position, seal 3202 may be fully retracted from spout 3230 and may release a majority of possible liquid flow from spout 3230 of mixing vessel 104. Drink product may continue to come into contact with seal 3202 as it is released in the second position, however, so the angled retracted and recessed channel 3204 may continue to serve the purpose of guiding the fluid flow downward. Furthermore, a portion of bracket member 3206 may extend below seal 3202, so as to act as a further guiding surface to control fluid flow within and from dispenser assembly 3200. To that end, drink product (e.g., low-viscosity, liquid drink product) may impact against the lower portion of bracket member 3206 and be further redirected downward, such as toward a beverage container.

It will be appreciated that, due to the rendering of a cross-sectional area, only one first link member 3218 or second link member 3212 may be shown, however, in some non-limiting embodiments or aspects, duplicate first link members 3218 or second link members 3212 may be provided, to promote additional strength and stability for the motion between the various positions. In particular, see FIGS. 34A and 34B for renderings of a lower portion of dispenser assembly 3200 that includes two second link members 3212.

Figure 33:
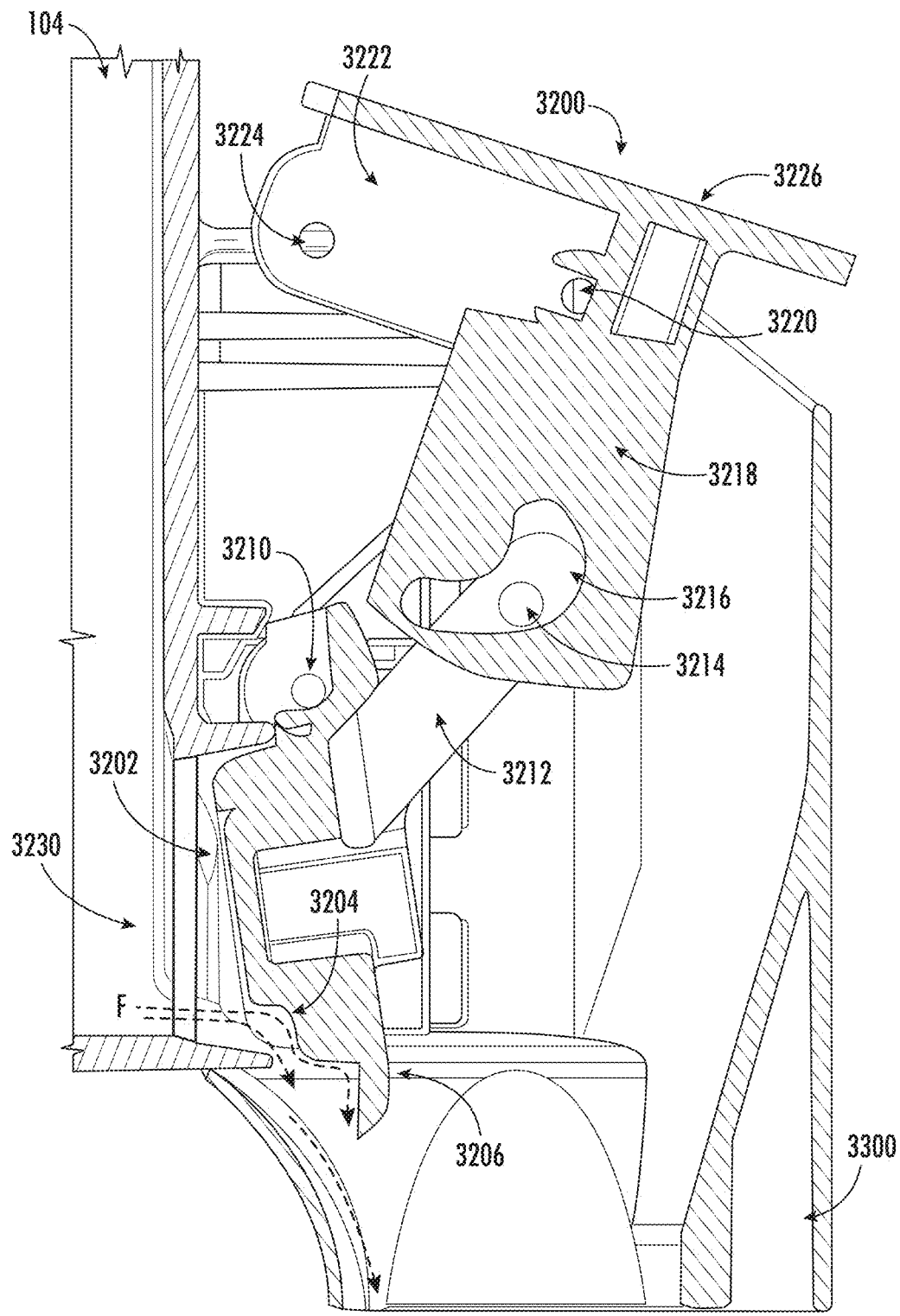
FIG. 33 shows a cross-sectional profile view of a dispenser assembly with a shroud, according to non-limiting embodiments or aspects.

Referring now to FIG. 33, shown is a cross-sectional profile view of dispenser assembly 3200 with shroud 3300, according to some non-limiting embodiments or aspects. As shown in FIG. 33, dispenser assembly 3200 may include an upper member 3222 having a first opening 3224 (e.g., to which a spring or lever may be connected on one end). Upper member 3222 may further include a first pivot member 3220, about which upper member 3222 and first link member 3218 may rotate. An upper surface of upper member 3222 may include lever platform 3226, on which the lever may be formed and/or connected. First link member 3218 may include, on an end distal from first pivot member 3220, a cam, which may be defined by the area surrounding and including cambered slot 3216. In some non-limiting embodiments or aspects, cambered slot 3216 may include a V-shaped and/or L-shaped slot that receives pin 3214, which is connected to a second end of second link member 3212. A first end of second link member 3212 may connect to bracket member 3206. Bracket member 3206 may rotate about second pivot member 3210.

In some non-limiting embodiments or aspects, bracket member 3206 may support seal 3202 (e.g., seal 3202 may be mounted to bracket member 3206, affixed to bracket member 3206, formed coextensively with bracket member 3206, and/or the like). Seal 3202 may include recessed channel 3204, which may control a liquid flow (F) of drink product released from spout 3230, particularly when dispenser assembly 3200 and the lever are in a first position, as shown in FIG. 33. The liquid flow (F) is shown in FIG. 33 as a dashed arrowed line beginning in mixing vessel 104, continuing through spout 3230, along an outer surface of seal 3202 (e.g., through recessed channel 3204), and down into and onto shroud 3300. Also, as shown in FIG. 33, a portion of bracket member 3206 extends below seal 3202, to provide additional control of liquid flow (F) as it leaves spout 3230. As is further shown in FIGS. 36 and 37, shroud 3300 is formed to promote gentle release of drink product by helping to redirect a horizontal liquid flow (F) into a downward liquid flow (F).

Referring now to FIGS. 34A and 34B, shown are perspective views of a lower portion of dispenser assembly 3200, according to some non-limiting embodiments or aspects. For example, FIG. 34A shows a rear, perspective view of a lower portion of dispenser assembly 3200, and FIG. 34B shows a front, perspective view of the lower portion of dispenser assembly 3200. A pair of second link members 3212 is depicted as connecting to an upper panel 3404 of bracket member 3206 at a first end of the pair of second link members 3212. A second end of the pair of second link members 3212 includes a pair of second openings 3211, which may receive pin 3214 (not shown in FIGS. 34A and 34B, but rendered in FIGS. 32A-32C). When in motion, bracket member 3206 (including upper panel 3404) may rotate about second pivot member 3210.

In some non-limiting embodiments or aspects, bracket member 3206 may support seal 3202 (not shown in FIGS. 34A and 34B, but rendered in FIGS. 32A-32C). For example, bracket member 3206 may include mount 3402 on a front side of upper panel 3404 (shown in FIG. 34B). The seal shown in FIG. 35 may be affixed on and/or around mount 3402. A lower portion of bracket member 3206 (below upper panel 3404) may extend below seal 3202 and provide additional guidance for released drink product, reducing splash and unwanted movement in the drink product.

Figure 35:
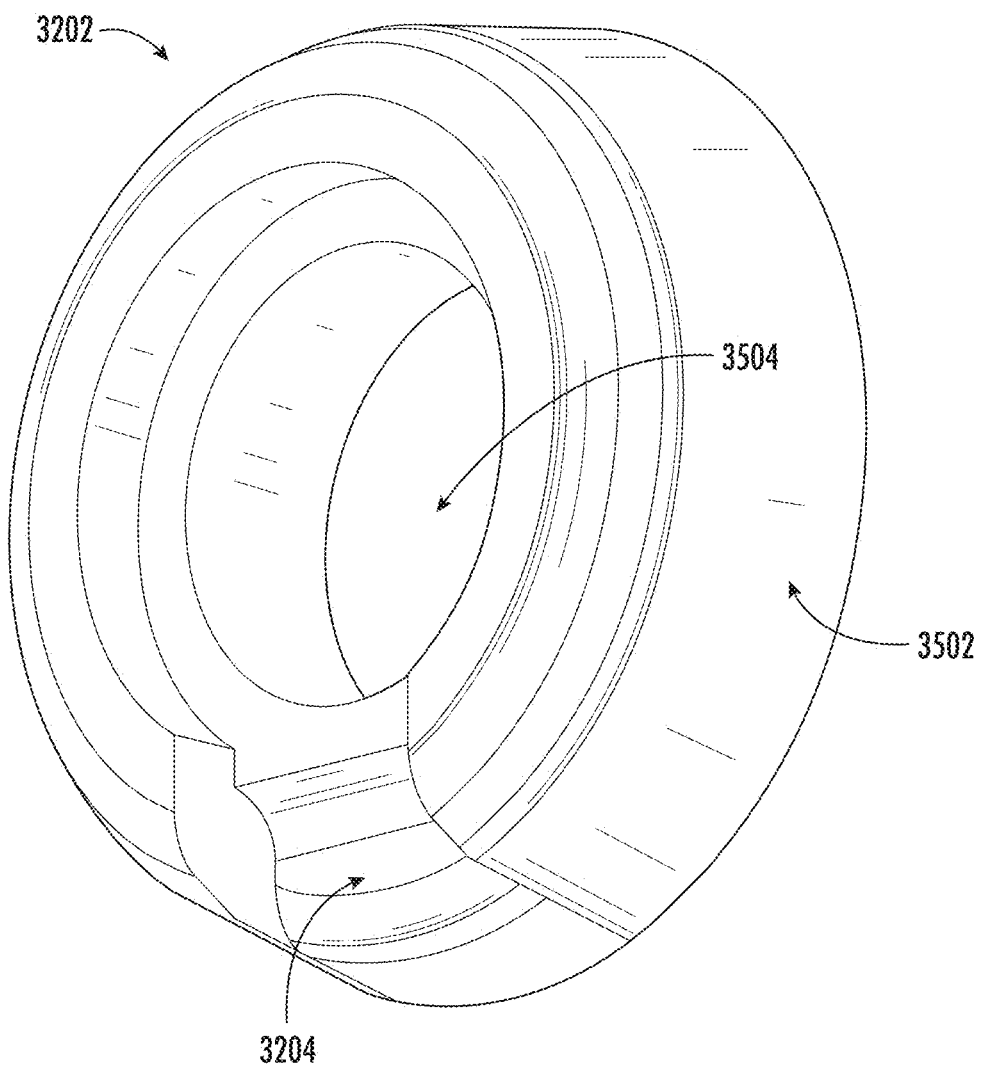
FIG. 35 shows a front, perspective view of a seal of a dispenser assembly, according to non-limiting embodiments or aspects.

Referring now to FIG. 35, shown is a front, perspective view of seal 3202, according to some non-limiting embodiments or aspects. As shown in FIG. 35, seal 3202 may be circular in configuration, which may correspond with a circular spout 3230 in mixing vessel 104. It will be appreciated, however, that other geometries of seal 3202 may be possible and may depend on the shape of spout 3230, since seal 3202 is configured to completely prevent fluid flow from mixing vessel 104 when the seal is in a rest position.

In some non-limiting embodiments or aspects, seal 3202 includes an outer perimeter 3502 that is configured to contact and provide a sealing connection with spout 3230 (shown in FIG. 32A). Seal 3202 may also include recessed channel 3204 (e.g., a groove) to allow variable speed release of drink product based on the angle of seal 3202. For example, when the lever is in a first position (e.g., shown in FIG. 32B), outer perimeter 3502 of seal 3202 may be configured to block a majority of liquid flow from spout 3230, and recessed channel 3204 of seal 3202 may permit some liquid flow through recessed channel 3204. Low-viscosity liquids may require smaller openings for a same rate of flow as higher viscosity liquids (e.g., partly frozen or fully frozen drink product, such as a slush); therefore, recessed channel 3204 also acts as a limiter on flow release in the first position. Seal 3202 may further include a mount opening 3504, which may be configured to fit on and/or around mount 3402 of bracket member 3206 (shown in FIG. 34B).

Figure 36:
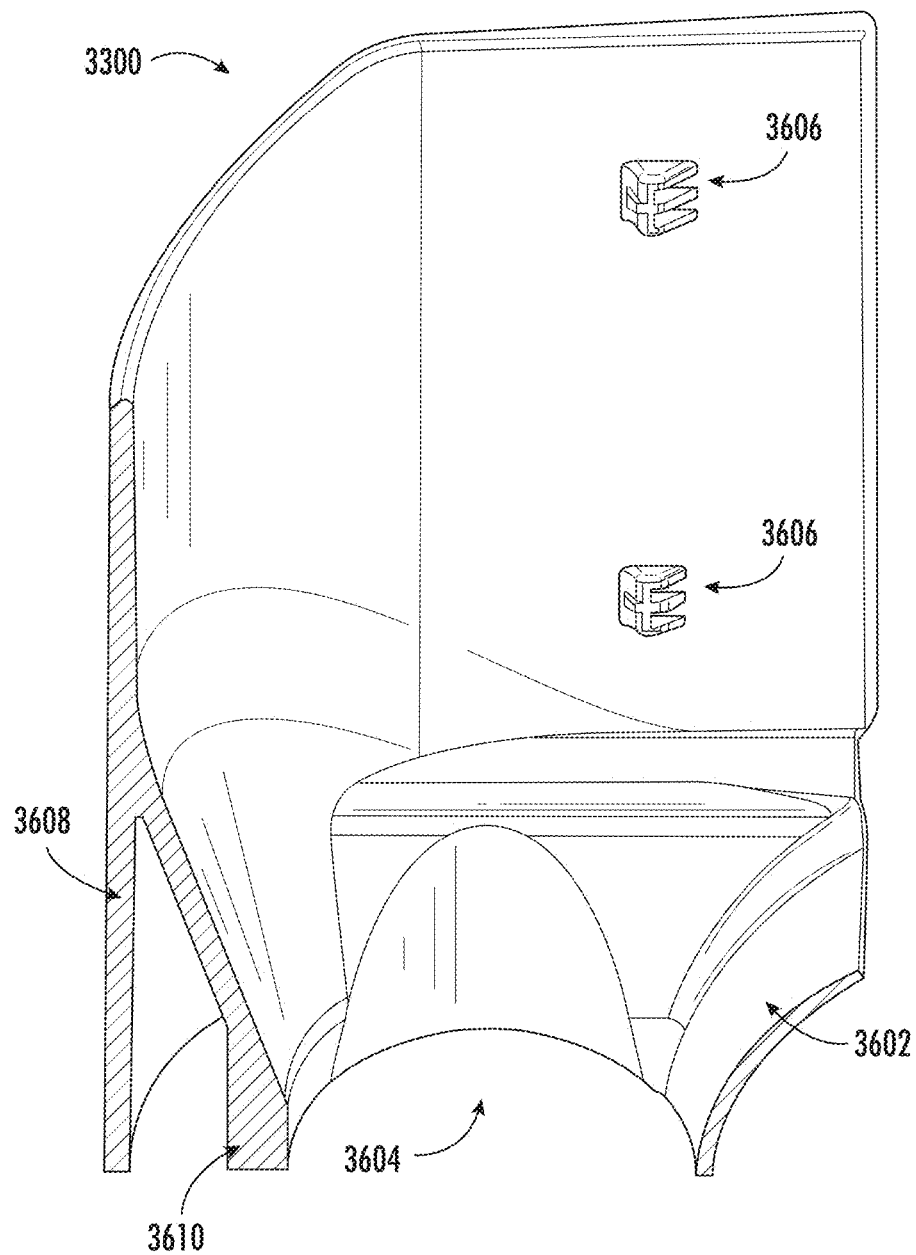
FIG. 36 shows a cross-sectional profile view of a shroud for a dispenser assembly, according to non-limiting embodiments or aspects.
Figure 37:
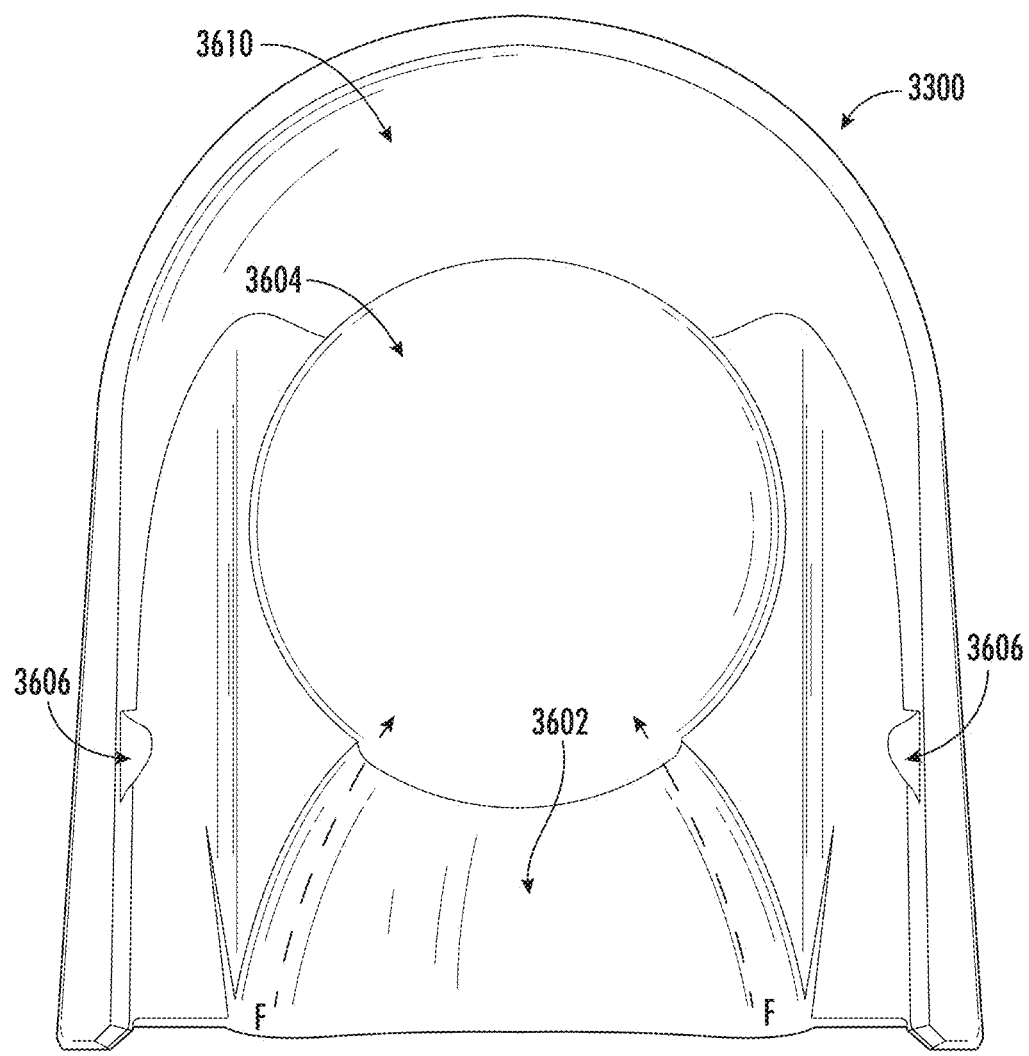
FIG. 37 shows a top view of a shroud for a dispenser assembly, according to non-limiting embodiments or aspects.

Referring now to FIGS. 36 and 37, shown are views of shroud 3300, according to some non-limiting embodiments or aspects. For example, FIG. 36 shows a cross-sectional profile view of shroud 3300, and FIG. 37 shows a top view of shroud 3300. Shroud 3300 may be configured to cover at least part of seal 3202 and spout 3230 (see, e.g., FIG. 33). Shroud 3300 may include a concave recessed channel 3602 (e.g., concave along a horizontal axis relative to an interior of shroud 3300, but convex along a vertical axis relative to an exterior of shroud 3300). Concave recessed channel 3602 may be positioned on an interior surface of shroud 3300. Concave recessed channel 3602 may be configured to guide a liquid flow of drink product out of spout 3230 and downward toward a beverage container.

In some non-limiting embodiments or aspects, concave recessed channel 3602 may be particularly formed to make use of the Coandă effect, which is the tendency of a fluid jet to stay attached to a convex surface. As such, drink product may flow down and along concave recessed channel 3602, toward a bottom opening 3604 of shroud 3300 (shown as liquid flow (F), demarcated by dashed arrowed lines in FIG. 37). A wall 3610 of shroud 3300, opposite concave recessed channel 3602, may slope inward toward concave recessed channel 3602, to further guide fluid flow toward bottom opening 3604. Wall 3610 may pull away from an outer wall 3608 (shown in FIG. 36) of shroud 3300 as it slopes downward along its length, creating a pocket between outer wall 3608 and wall 3610. In this manner, an outer wall of 3608 may be uniform and flat over a vertical surface, while wall 3610 is configured on the inside of shroud 3300 to optimize control of drink product.

In some non-limiting embodiments or aspects, shroud 3300 may include connectors 3606 (e.g., snap-fit connectors) for affixing shroud 3300 around at least a portion of seal 3202 and spout 3230. Shroud 3300 may be removably attached to mixing vessel 104 when the drink maker is in use, and shroud 3300 may be removed from mixing vessel 104, providing easy access to dispenser assembly 3200 internal components when dispenser assembly 3200 is cleaned after use.

Figure 38:
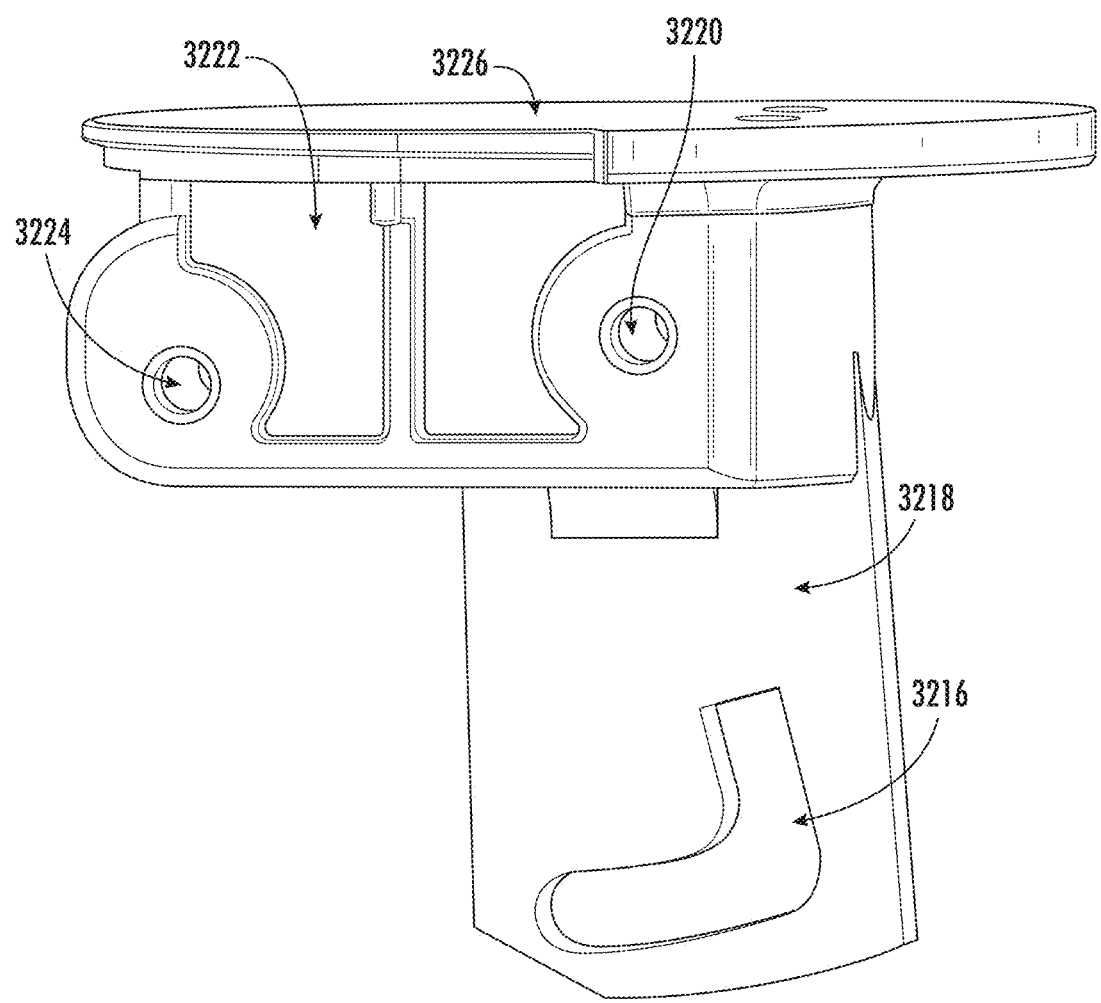
FIG. 38 shows a profile view of an upper portion of a dispenser assembly, according to non-limiting embodiments or aspects.

Referring now to FIG. 38, shown is an upper portion of dispenser assembly 3200, according to some non-limiting embodiments or aspects. As shown in FIG. 38, dispenser assembly 3200 may include upper member 3222, which may include first opening 3224 and first pivot member 3220. First opening 3224 may provide an anchor point (e.g., for a lever, for a spring, etc.). A spring (not shown) may be provided as a butterfly spring and may be centered around a pivot member (e.g., first pivot member 3220, second pivot member 3210), with arms of the butterfly spring pressing against link members (e.g., link member 3218, link member 3212, etc.), to provide a biasing force to return a lever to a rest position. First pivot member 3220 may receive a pin or rod to allow the rotation of upper member 3222 about first pivot member 3220. On an upper surface of upper member 3222 may include lever platform 3226. Extending from upper member 3222 in a downward direction may include first link member 3218, which may form a cam having a cambered slot 3216 on an end distal to upper member 3222. Cambered slot 3216 may receive a pin (not shown), to provide variable paths and resistance as the lever of dispenser assembly 3220 is pulled. In this manner, cambered slot 3216, interacting with a pin, partly allows for a multi-stage dispenser assembly (in combination with the other features described hereinabove).

Figure 39:
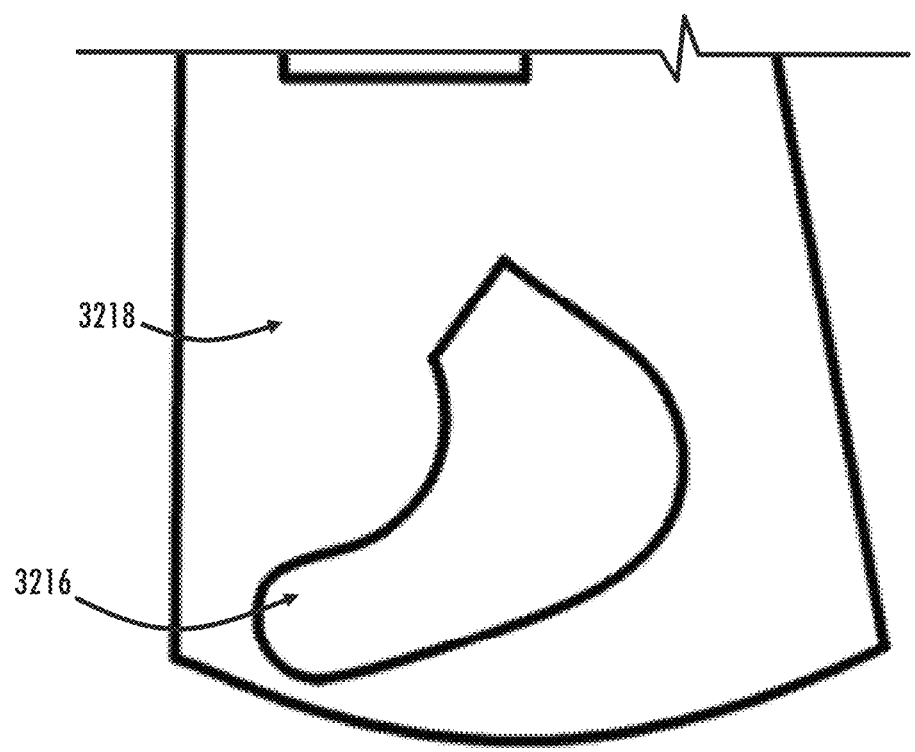
FIG. 39 shows a profile view of a cam of a dispenser assembly, according to non-limiting embodiments or aspects.

Referring now to FIG. 39, shown is a cam of a dispenser assembly 3200, according to some non-limiting embodiments or aspects. As shown, the cam may include cambered slot 3216 within first link member 3218. FIG. 39 shows a V-shaped cambered slot 3216 having an approximate interior angle of 50 degrees, relative between the first slot length (lower on cambered slot 3216) and the second slot length (higher on cambered slot 3216). The interior angle between the first slot length and the second slot length may partly control the difference between the first resistance and the second resistance as the user pulls the lever from the rest position to the first position, and from the first position to the second position, respectively. Cambered slot 3216 may be rounded on interior sides contacting a pin that slides within cambered slot 3216, to promote ease of the pin sliding along cambered slot 3216. When the lever is in the rest position, the pin may be at the lowest and leftmost point of cambered slot 3216. When the lever is in the first position, the pin may be in the farthest right point of cambered slot 3216. When the lever is in the second position, the pin may be in the uppermost point of cambered slot 3216.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A dispenser assembly for a drink maker comprising:
   a lever configured to be pulled by a user a first distance to a first position, the lever further configured to be pulled by the user a second distance to a second position;
   a cam configured to provide a first resistance to pulling the lever when the lever is pulled over the first distance to the first position and provide a second resistance to pulling the lever when the lever is pulled over the second distance to the second position; and
   a seal configured to be moved in response to movement of the lever and the cam, wherein the seal partly opens a spout of the drink maker when the lever is in the first position and fully opens the spout when the lever is in the second position.

2. The dispenser assembly of claim 1, further comprising a first link member connected at a first end of the first link member to the lever, the first link member comprising the cam at a second end of the first link member.

3. The dispenser assembly of claim 1, further comprising:
   a bracket member configured to support the seal; and
   a second link member connected at a first end of the second link member to the bracket member and slidably connected at a second end of the second link member to the cam.

4. The dispenser assembly of claim 3, wherein the bracket member is configured to extend below the seal and further guide a liquid flow of drink product downward toward a beverage container.

5. The dispenser assembly of claim 3, further comprising a pin positioned at the second end of the second link member, wherein the cam comprises a cambered slot configured to receive the pin therein.

6. The dispenser assembly of claim 5, wherein the cambered slot comprises an L-shaped slot comprising a first slot length and a second slot length.

7. The dispenser assembly of claim 6, wherein the second slot length is positioned at an angle greater than or equal to 80 degrees relative to the first slot length.

8. The dispenser assembly of claim 6, wherein the pin is configured to slide within the first slot length of the L-shaped slot of the cam when the lever is pulled over the first distance to the first position, and wherein the pin is configured to slide within the second slot length of the L-shaped slot of the cam when the lever is pulled over the second distance to the second position.

9. The dispenser assembly of claim 1, wherein the seal comprises a recessed channel therein configured to guide a liquid flow of drink product from the spout and downward toward a beverage container.

10. The dispenser assembly of claim 9, wherein when the lever is in the first position, an outer perimeter of the seal blocks a majority of liquid flow from the spout and the recessed channel of the seal permits some liquid flow through the recessed channel of the seal.

11. The dispenser assembly of claim 1, further comprising a shroud configured to cover at least part of the seal and the spout, the shroud comprising a concave recessed channel on an interior surface of the shroud configured to guide a liquid flow of drink product out of the spout and downward toward a beverage container.

12. The dispenser assembly of claim 1, wherein when the user pulls the lever in a first rotational direction over the first distance, the seal is retracted from the spout by a first angle to permit a first rate of flow from the spout.

13. The dispenser assembly of claim 12, wherein when the user pulls the lever in the first rotational direction over the second distance, the seal is further retracted from the spout by a second angle greater than the first angle, to permit a second rate of flow from the spout greater than the first rate of flow.

14. The dispenser assembly of claim 1, further comprising a spring connected to a lower portion of the lever, the spring providing a biasing force for the first resistance and the second resistance.

15. The dispenser assembly of claim 14, wherein, when the user releases the lever from the first position or the second position, the biasing force of the spring returns the lever to a rest position and returns the seal to a sealed position relative to the spout.

16. A drink maker comprising:
    a dispenser assembly comprising:
      a lever configured to be pulled by a user a first distance to a first position, the lever further configured to be pulled by the user a second distance to a second position;
      a cam configured to provide a first resistance to pulling the lever when the lever is pulled over the first distance to the first position and provide a second resistance to pulling the lever when the lever is pulled over the second distance to the second position; and
      a seal configured to be moved in response to movement of the lever and the cam, wherein the seal partly opens a spout of the drink maker when the lever is in the first position and fully opens the spout when the lever is in the second position.

17. The drink maker of claim 16, wherein the dispenser assembly further comprises:
    a bracket member configured to support the seal;
    a second link member connected at a first end of the second link member to the bracket member and slidably connected at a second end of the second link member to the cam; and a pin positioned at the second end of the second link member, wherein the cam comprises a cambered slot configured to receive the pin therein.

18. The drink maker of claim 17, wherein the cambered slot comprises an L-shaped slot comprising a first slot length and a second slot length, wherein the pin is configured to slide within the first slot length of the L-shaped slot of the cam when the lever is pulled over the first distance to the first position, and wherein the pin is configured to slide within the second slot length of the L-shaped slot of the cam when the lever is pulled over the second distance to the second position.

19. The drink maker of claim 16, wherein the seal comprises a recessed channel therein configured to guide a liquid flow of drink product from the spout and downward toward a beverage container.

20. The drink maker of claim 16, further comprising a shroud configured to cover at least part of the seal and the spout, the shroud comprising a concave recessed channel on an interior surface of the shroud configured to guide a liquid flow of drink product out of the spout and downward toward a beverage container.

\* \* \* \* \*